(12) United States Patent
Ohta et al.

(10) Patent No.: US 8,959,261 B2
(45) Date of Patent: Feb. 17, 2015

(54) DATA TRANSFER CONTROL DEVICE, INTEGRATED CIRCUIT OF SAME, DATA TRANSFER CONTROL METHOD OF SAME, DATA TRANSFER COMPLETION NOTIFICATION DEVICE, INTEGRATED CIRCUIT OF SAME, DATA TRANSFER COMPLETION NOTIFICATION METHOD OF SAME, AND DATA TRANSFER CONTROL SYSTEM

(75) Inventors: Yuusaku Ohta, Kanagawa (JP); Masaaki Harada, Kanagawa (JP); Satoru Kuriki, Aichi (JP); Satomi Amano, Gifu (JP); Hideki Taniguchi, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 43 days.

(21) Appl. No.: 13/511,228

(22) PCT Filed: Jan. 25, 2011

(86) PCT No.: PCT/JP2011/000372
§ 371 (c)(1),
(2), (4) Date: May 22, 2012

(87) PCT Pub. No.: WO2011/155096
PCT Pub. Date: Dec. 15, 2011

(65) Prior Publication Data
US 2012/0233372 A1 Sep. 13, 2012

(30) Foreign Application Priority Data
Jun. 11, 2010 (JP) .................................. 2010-134558

(51) Int. Cl.
G06F 3/00 (2006.01)
G06F 5/00 (2006.01)
G06F 13/28 (2006.01)
(52) U.S. Cl.
CPC ..................................... G06F 13/28 (2013.01)

USPC ............................................................ 710/39
(58) Field of Classification Search
USPC ........................................................... 710/39
See application file for complete search history.

(56) References Cited

U.S. PATENT DOCUMENTS

| | | | | |
|---|---|---|---|---|
| 6,631,434 | B1 * | 10/2003 | Johnson et al. ............... | 710/260 |
| 8,065,448 | B2 * | 11/2011 | Kawahara ....................... | 710/22 |
| 2008/0270744 | A1 * | 10/2008 | Hashimoto ................... | 711/217 |
| 2009/0287858 | A1 | 11/2009 | Kawahara | |
| 2010/0118884 | A1 * | 5/2010 | Hendel et al. ................. | 370/412 |

FOREIGN PATENT DOCUMENTS

| | | |
|---|---|---|
| JP | 3-158952 | 7/1991 |
| JP | 4-238527 | 8/1992 |

(Continued)

OTHER PUBLICATIONS

International Search Report issued Apr. 26, 2011 in International (PCT) Application No. PCT/JP2011/000372.

*Primary Examiner* — Chun-Kuan Lee
(74) *Attorney, Agent, or Firm* — Wenderoth, Lind & Ponack, L.L.P.

(57) ABSTRACT

A data transfer control device 1061 includes a read pointer update unit 5004 updating a value of a global read pointer RPg with a value of a local read pointer (first local read pointer) RPl1 held by a local read pointer hold unit 5007 when completion of data transfer is recognized and a position, in an order of reading descriptors, of a descriptor D3010a indicated by the local read pointer RPl1 is earlier than positions of descriptors D3010b and D3010c respectively indicated by local read pointers (second local read pointers) RPl2 and RPl3 held by the other data transfer control devices 1062 and 1063.

9 Claims, 30 Drawing Sheets

(56) References Cited

FOREIGN PATENT DOCUMENTS

| JP | 5-134965 | 6/1993 |
| JP | 2007-249635 | 9/2007 |
| JP | 2008-108066 | 5/2008 |
| JP | 2008-293484 | 12/2008 |
| JP | 2009-277096 | 11/2009 |

* cited by examiner

FIG. 5
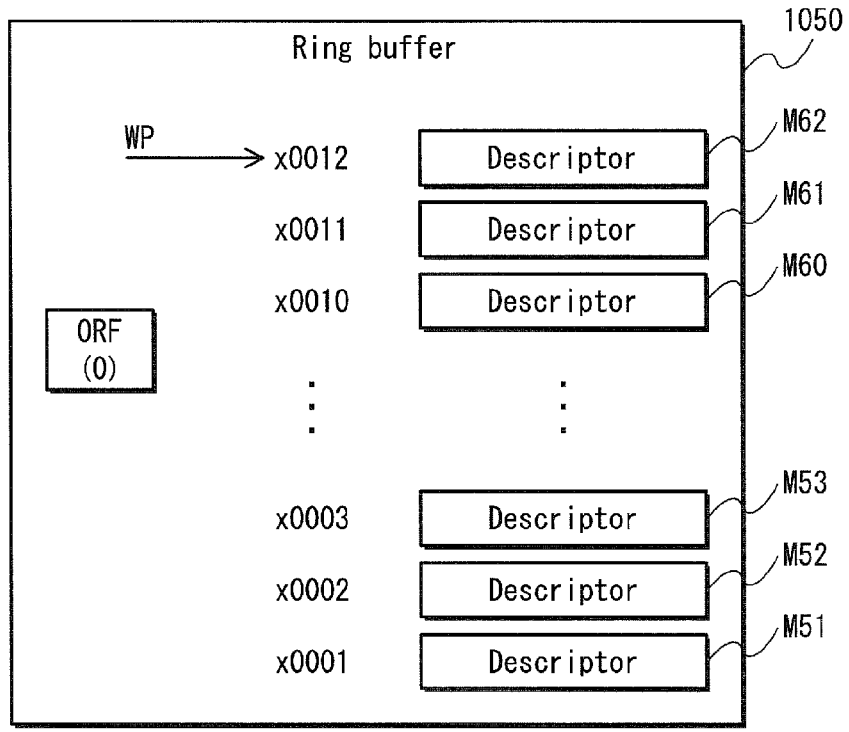
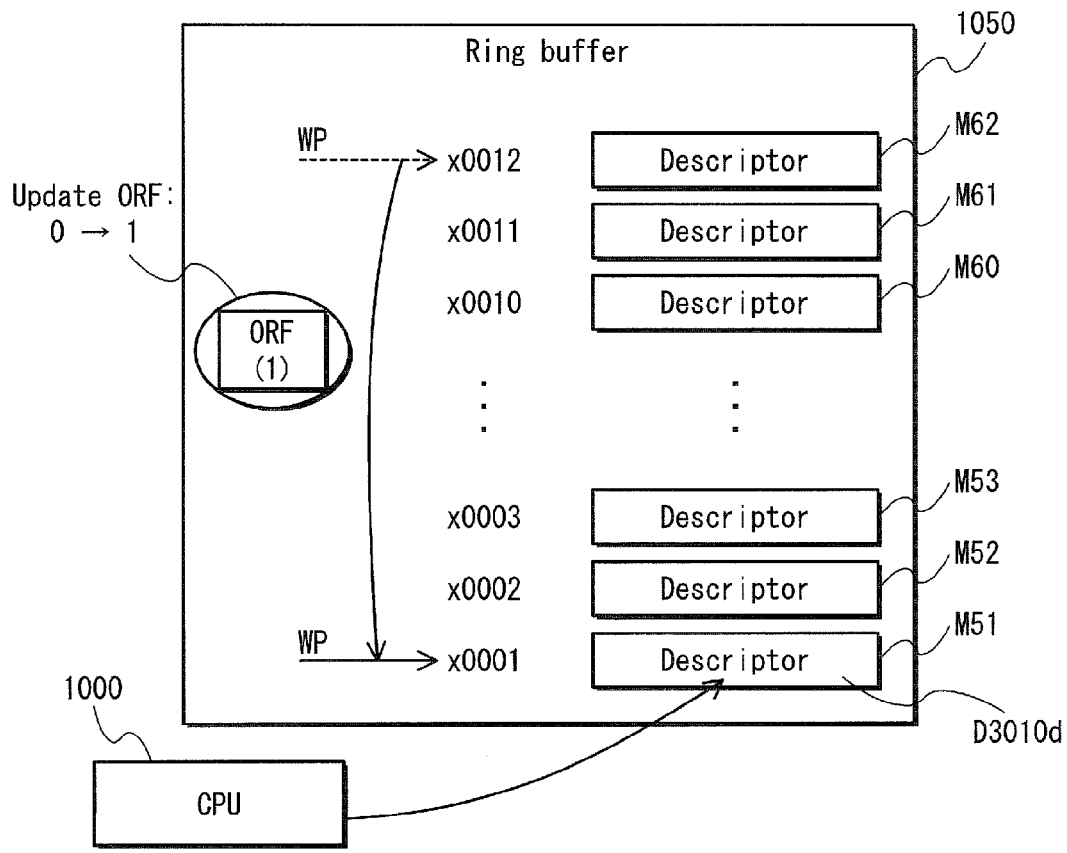

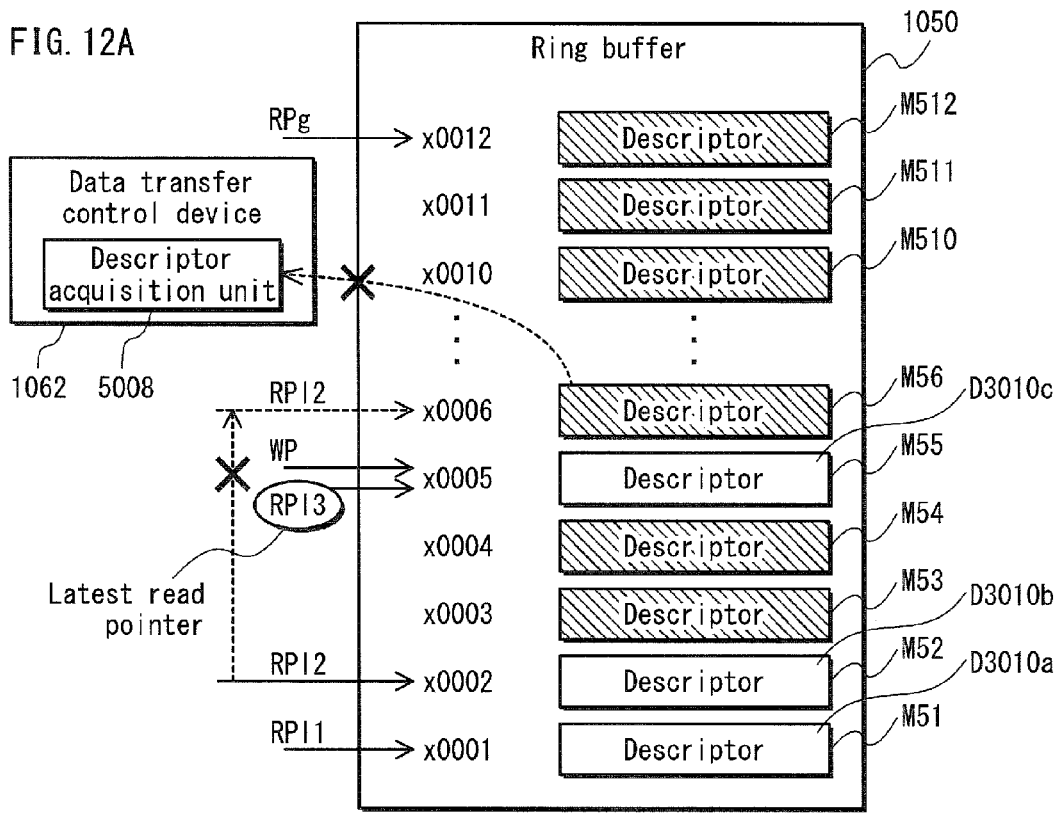
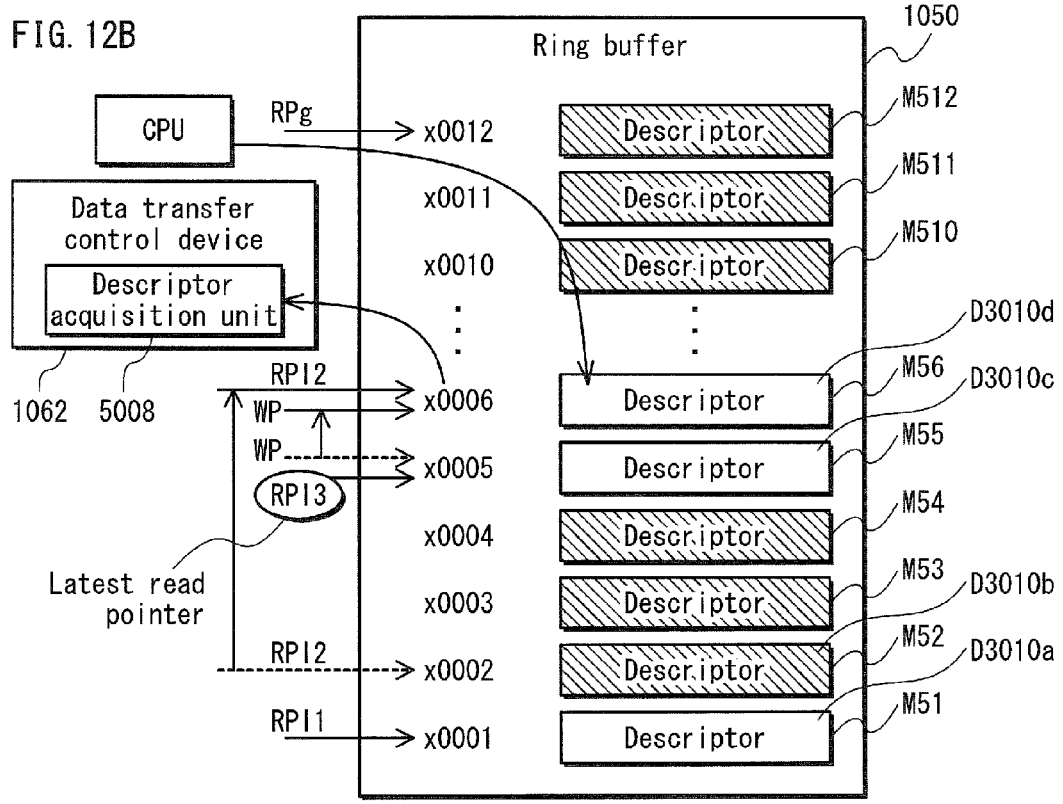

DATA TRANSFER CONTROL DEVICE, INTEGRATED CIRCUIT OF SAME, DATA TRANSFER CONTROL METHOD OF SAME, DATA TRANSFER COMPLETION NOTIFICATION DEVICE, INTEGRATED CIRCUIT OF SAME, DATA TRANSFER COMPLETION NOTIFICATION METHOD OF SAME, AND DATA TRANSFER CONTROL SYSTEM

TECHNICAL FIELD

The present invention relates to control over a plurality of data transfer operations.

BACKGROUND ART

An information processing device that performs DMA (Direct Memory Access) transfer between a main memory and a high-speed IO interface, such as SDXC, USB and SATA, using a plurality of channels in parallel has been provided. Such a device prevents reduction of throughput of the DMA transfer.

As a device performing a plurality of data transfer operations in parallel, a disk array device including a plurality of disk devices alternately performing data transfer at regular time intervals is proposed (see Patent Literature 1).

By applying the technology disclosed in Patent Literature 1 to the DMA transfer, three channels CH1, CH2 and CH3 may alternately perform data transfer at regular time intervals as illustrated in FIG. 26, for example. Such a configuration can eliminate the effect of overhead (DMA set processing, DMA termination processing) and prevent the reduction of the throughput of the DMA transfer.

In the DMA transfer to which the technology disclosed in Patent Literature 1 is applied, however, if a size of data to be transferred differs for each opportunity to perform transfer, latency might occur on any of the DMA channels CH1, CH2 and CH3 after the end of a DMA transfer period, thereby causing the reduction of the throughput.

To address this problem, a configuration in which the three DMA channels CH1, CH2 and CH3 each perform continuous DMA transfer operations independently from one another has been provided.

As such a configuration, for example, there is a configuration in which a DMA controller 1030 reads descriptors (transfer control information pieces) D1, D2, D3 and D4 stored in a buffer 6050 for each of the DMA channels CH1, CH2 and CH3 to perform data transfer, as illustrated in FIG. 28.

Here, the buffer 6050 stores, in storage areas thereof, the descriptors D1, D2, D3, D4 and so on in ascending order of an address of each of the storage areas. The descriptors D1, D2, D3, D4 and so on are read in ascending order of an address of each of the storage areas, in accordance with a value of a read pointer RP. For example, when data transfer performed according to the descriptor D3 is completed, the DMA controller 1030 updates the value of the read pointer RP held on the buffer 6050 with an address (x0004) of a storage area in which the descriptor D4 is stored. The DMA controller 1030 then acquires the descriptor D4 stored in the storage area having the address indicated by the read pointer RP, and starts data transfer performed according to the descriptor D4.

A CPU 1000 confirms whether or not all data pieces have been transferred by referencing the value of the read pointer RP held on the buffer 6050. In an example illustrated in FIG. 29, the CPU 1000 recognizes that DMA transfer performed according to the descriptors D1 to D4 is completed at a time Td when the value of the read pointer is updated with the address of the storage area in which the descriptor D4 is stored.

CITATION LIST

Patent Literature

[Patent Literature 1]
Japanese Patent Application Publication No. 4-238527

SUMMARY OF INVENTION

Technical Problem

In an example illustrated in FIG. 30, however, the CPU 1000 mistakenly recognizes that DMA transfer performed according to the descriptors D1, D2, D3 and D4 is completed at the time Td when the value of the read pointer is updated with the address of the storage area in which the descriptor D4 is stored. In this case, the CPU 1000 can malfunction as it recognizes that DMA transfer performed according to the descriptors D1, D2, D3 and D4 is completed even though DMA transfer performed according to the descriptor D3 is actually not completed, and starts processing.

The present invention has been conceived in view of the above problem. A purpose of the present invention is to significantly improve the throughput of data transfer as well as to prevent a malfunction of a processing device that performs processing using a plurality of data pieces after recognizing completion of transfer of the plurality of data pieces.

Solution to Problem

In order to solve the above-presented problem, one aspect of the present invention is a data transfer control device that reads, from a transfer control information management device holding a plurality of transfer control information pieces to be read in a predetermined order and management information for managing the predetermined order, one of the transfer control information pieces, and controls data transfer performed according to the read transfer control information piece via a corresponding one of data transfer channels, the data transfer control device comprising: a transfer control information read unit reading one of the transfer control information pieces to be read in the predetermined order; a position information hold unit holding position information indicating a position of the read transfer control information piece among the predetermined order; a transfer completion recognition unit recognizing completion of data transfer performed according to the read transfer control information piece; a position information acquisition unit acquiring position information from each of other one or more data transfer control devices; a positional relation determination unit determining a relation between the position indicated by the position information held by the position information hold unit and a position indicated by the acquired position information and a management information update unit updating the management information, when the transfer completion recognition unit recognizes completion of the data transfer and the positional relation determination unit determines that the position indicated by the held position information is earlier than the position indicated by the acquired position information.

Advantageous Effects of Invention

According to the above-mentioned configuration, the data transfer control device includes the management information update unit that updates the management information, when the transfer completion recognition unit recognizes completion of the data transfer and the positional relation determination unit determines that the position indicated by the held position information is earlier than the position indicated by the acquired information. With this configuration, the data transfer control device sequentially performs data transfer operations independently from the other one or more data transfer control devices, and recognizes that the data transfer operations are completed or not completed with reference to the predetermined order based on the management information while preventing an occurrence of latency during the data transfer. Therefore, the throughput of data transfer is significantly improved, and a malfunction of a processing device that performs processing using the plurality of data pieces after recognizing completion of all the data transfer operations is prevented.

In the data transfer control device pertaining to the present invention, the management information may include completed position information indicating a position earlier than the earliest position of all the positions indicated by the held position information and the acquired position information, and the management information update unit may update the completed position information with the held position information, when the positional relation determination unit determines that the position indicated by the held position information is earlier than the position indicated by the acquired position information.

According to the above-mentioned configuration, the management information includes the completed position information indicating the position earlier than the earliest position of all the positions indicated by the held position information and the acquired position information, and the management information update unit updates the completed position information with the held position information. With this configuration, it is possible to prevent a transfer control information piece corresponding to data transfer having not been completed from being included in each of one or more transfer control information pieces whose position is indicated by the completed position information or position information indicating a position earlier than the position indicated by the completed position information. Therefore, it is ensured that data transfer operations have surely been completed from a first data transfer operation to a data transfer operation performed according to the completed position information. Accordingly, a malfunction of a processing device that performs processing based only on the completed position information is prevented.

In the data transfer control device pertaining to the present invention, the management information update unit may not update the completed position information with the held position information, when the positional relation determination unit determines that the position indicated by the held position information is not earlier than the position indicated by the acquired position information.

According to the above-mentioned configuration, it is possible to prevent the completed position information from indicating a position of a transfer control information piece corresponding data transfer having not been completed.

The data transfer control device pertaining to the present invention may further comprise a latest position information extraction unit extracting latest position information indicating the latest position of all the positions indicated by the held position information and the acquired position information, wherein, when the transfer completion recognition unit recognizes completion of the data transfer, the transfer control information read unit may read, from the transfer control information management device, one of the transfer control information pieces to be read after another one of the transfer control information pieces whose position is indicated by the latest position information.

According to the above-mentioned configuration, the data transfer control device includes the latest position information extraction unit extracting latest position information indicating the latest position of all the positions indicated by the held position information and the acquired position information, and, when the transfer completion recognition unit recognizes completion of the data transfer, the transfer control information read unit reads, from the transfer control information management device, one of the transfer control information pieces to be read after another one of the transfer control information pieces whose position is indicated by the latest position information. With this configuration, it is possible to prevent the transfer control information read unit from mistakenly reading a transfer control information piece corresponding to data transfer having already been completed. Therefore, an occurrence of wasteful data transfer is prevented.

In the data transfer control device pertaining to the present invention, the management information may include last position information indicating a position, among the predetermined order, of one of the transfer control information pieces last written to the transfer control information management device, the data transfer control device may further comprise: a last position information acquisition unit acquiring the last position information; and a last position information comparison unit comparing the last position information with the latest position information extracted by the latest position information extraction unit, and when the last position information comparison unit judges that the position indicated by the last position information is equal to the position indicated by the latest position information, the transfer control information read unit may not read, from the transfer control information management device, the one transfer control information piece to be read after the other one transfer control information piece whose position is indicated by the latest position information.

According to the above-mentioned configuration, it is possible to prevent the transfer control information read unit from reading a transfer control information piece even though a new transfer control information piece is not written to the transfer control information management device. Therefore, wasteful processing and erroneous acquisition of a transfer control information piece are prevented.

The data transfer control device pertaining to the present invention may further comprise a last position information update detection unit detecting update of the last position information, and when the positional relation determination unit determines that the position indicated by the latest position information is equal to the position indicated by the last position information and the last position information update detection unit detects update of the last position information, the transfer control information read unit may read, from the transfer control information management device, the one transfer control information piece to be read after the other one transfer control information piece whose position is indicated by the latest position information.

According to the above-mentioned configuration, when the positional relation determination unit determines that the position indicated by the latest position information is equal to the position indicated by the last position information and the last position information update detection unit detects update of the last position information, the transfer control information read unit reads, from the transfer control information management device, the one transfer control information piece to be read after the other one transfer control information piece whose position is indicated by the latest position information. Since the transfer control information read unit reads a new transfer control information piece as soon as the new transfer control information piece is written, data transfer efficiency is improved.

In the data transfer control device pertaining to the present invention, the held position information may be a local read pointer indicating an address of a storage area in which the read transfer control information piece is stored, the acquired position information may be a local read pointer indicating an address of a storage area in which one of the transfer control information pieces read by each of the other one or more data transfer control devices is stored, and the management information may further include: a write pointer indicating an address of a storage area in which one of the transfer control information pieces last written to the transfer control information management device is stored; and a global read pointer indicating an address of a storage area storing therein one of the transfer control information pieces whose position is earlier than the earliest position of all the positions indicated by the local read pointer held by the position information hold unit and the local read pointer held by each of the other one or more data transfer control devices.

According to the above-mentioned configuration, the positional relation determination unit determines a relation between positions of the transfer control information pieces in accordance with a value of the local read pointer held by the data transfer control device and a value of the local read pointer held by each of the other one or more data transfer control devices.

In the data transfer control device pertaining to the present invention, the transfer control information management device may include a ring buffer, and the management information may further include an overlap flag that is set, when a value of the write pointer is updated, to an enable state if a value of the write pointer before update is larger than a value of the write pointer after update, and, when a value of the global read pointer is updated, to a disable state if a value of the global read pointer before update is larger than a value of the global read pointer after update.

In the data transfer control device pertaining to the present invention, the positional relation determination unit may compare the value of the write pointer, a value of the local read pointer held by the position information hold unit and a value of the local read pointer held by each of the other one or more data transfer control devices to determine a relation between a position of one of the transfer information pieces stored in a storage area having an address indicated by the local read pointer held by the position information hold unit and a position of another one of the transfer information pieces stored in a storage area having an address indicated by the local read pointer held by each of the other one or more data transfer control devices.

According to the above-mentioned configuration, a ring buffer can be used as the transfer control information management device. Also, it is possible to appropriately determine a relation between positions indicated by the local read pointer held by the data transfer control device and the local read pointer held by each of the other one or more data transfer control devices.

In the data transfer control device pertaining to the present invention, when updating a value of the global read pointer, the management information update unit may set the overlap flag to the disable state if the value of the global read pointer before update is larger than the value of the global read pointer after update.

According to the above-mentioned configuration, a ring buffer can be used as the transfer control information management device. Also, it is possible to appropriately update the value of the global read pointer held on the ring buffer.

In the data transfer control device pertaining to the present invention, the transfer control information management device may include a buffer composed of a plurality of storage areas which have consecutive addresses and in which the transfer control information pieces are stored in ascending order of an address of each storage area.

According to the above-mentioned configuration, a configuration of the transfer control information management device can be simplified.

In the data transfer control device pertaining to the present invention, when a value of the local read pointer held by the position information hold unit is smaller than a value of the local read pointer held by each of the other one or more data transfer control devices, the positional relation determination unit may determine that a position of one of the transfer information pieces stored in a storage area having an address indicated by the local read pointer held by the position information hold unit is earlier than a position of another one of the transfer information pieces stored in a storage area having an address indicated by the local read pointer held by each of the other one or more data transfer control devices.

According to the above-mentioned configuration, processing performed by the positional relation determination unit can be simplified.

In the data transfer control device pertaining to the present invention, when the positional relation determination unit determines that a position of one of the transfer information pieces stored in a storage area having an address indicated by the local read pointer held by the position information hold unit is earlier than a position of another one of the transfer information pieces stored in a storage area having an address indicated by the local read pointer held by each of the other one or more data transfer control devices, the management information update unit may update a value of the global read pointer with a value of the local read pointer held by the position information hold unit.

According to the above-mentioned configuration, it is possible to appropriately update the value of the global read pointer held on a buffer.

The data transfer control device pertaining to the present invention may further comprise: a latest position information extraction unit extracting a latest read pointer indicating the latest address of all the addresses indicated by the local read pointer held by the position information hold unit and the local read pointer held by each of the other one or more data transfer control devices; and a threshold comparison unit comparing a value of the latest read pointer with a predetermined threshold, wherein when the threshold comparison unit judges that the value of the latest read pointer is equal to the predetermined threshold, the transfer control information read unit may not read one of the transfer control information pieces to be read after another one of the transfer control information pieces stored in a storage area having the address indicated by the latest read pointer.

According to the above-mentioned configuration, data transfer is stopped when an address indicated by the latest read pointer reaches the predetermined threshold, and thus there is no need to wait for reading of one or more transfer control information pieces until the address indicated by the latest read pointer becomes equal to an address indicated by the write pointer.

In the data transfer control device pertaining to the present invention, the predetermined threshold may be obtained by adding a predetermined constant value to a value of the global read pointer.

According to the above-mentioned configuration, data transfer is stopped each time transfer control information pieces whose number is equal to the predetermined threshold are read.

In the data transfer control device pertaining to the present invention, the predetermined threshold may be obtained by subtracting a predetermined constant value from a value of the write pointer.

According to the above-mentioned configuration, data transfer is stopped when the number of transfer control information pieces corresponding to data transfer having not been completed reaches the predetermined threshold.

In the data transfer control device pertaining to the present invention, each of the transfer control information pieces may include at least a transfer destination address and a size of data to be transferred.

According to the above-mentioned configuration, since data transfer is performed by specifying the transfer destination address, it is possible to specify a transfer destination in more detail.

The data transfer control device pertaining to the present invention may further comprise a transfer control information acquisition completion notification unit sending a signal indicating completion of acquisition of the one transfer control information piece when the transfer control information read unit completes acquisition of the one transfer control information piece.

According to the above-mentioned configuration, since data transfer is performed after it is confirmed that the transfer control information read unit completes the acquisition of the transfer control information piece, a malfunction is prevented.

In the data transfer control device pertaining to the present invention, the transfer completion recognition unit may recognize that the data transfer is normally or abnormally completed, and the transfer control information read unit may read another one of the transfer control information pieces when the transfer completion recognition unit recognizes that the data transfer is normally completed, and may not read another one of the transfer control information pieces when the transfer completion recognition unit recognizes that the data transfer is abnormally completed.

According to the above-mentioned configuration, it is possible to respond to a situation in which data transfer is abnormally completed and it becomes necessary to perform data transfer according to the transfer control information piece again.

The data transfer control device pertaining to the present invention may be a data transfer control device that reads, from a transfer control information management device holding a plurality of transfer control information pieces to be read in a predetermined order and management information for managing the predetermined order, one of the transfer control information pieces, and controls data transfer performed according to the read transfer control information piece via a corresponding one of data transfer channels, the data transfer control device comprising: a transfer control information read unit reading one of the transfer control information pieces to be read in the predetermined order; a position information hold unit holding position information indicating a position of the read transfer control information piece among the predetermined order; a transfer completion recognition unit recognizing completion of data transfer performed according to the read transfer control information piece; a flag hold unit holding a data transfer completion flag indicating whether the data transfer performed according to the read transfer control information piece is completed or not; and a flag update unit updating the data transfer completion flag when the transfer completion recognition unit recognizes completion of the data transfer.

According to the above-mentioned configuration, the data transfer control device includes the flag hold unit holding the data transfer completion flag indicating whether the data transfer performed according to the read transfer control information piece is completed or not, and the flag update unit updating the data transfer completion flag when the transfer completion recognition unit recognizes completion of the data transfer. With this configuration, by checking the data transfer completion flag, it is possible to learn of data transfer having already been completed.

Another aspect of the present invention is a data transfer completion notification device that is connected to each of a plurality of data transfer control devices controlling data transfer performed in parallel via respective data transfer channels according to respective transfer control information pieces, and notifies at least one of the data transfer control devices of completion of data transfer controlled by the at least one data transfer control device, the data transfer completion notification device comprising: a transfer completion detection unit detecting completion of at least one data transfer operation; and a transfer completion notification unit sending, when the transfer completion detection unit detects completion of the at least one data transfer operation, a transfer completion notification signal to a corresponding one of the data transfer control devices in accordance with a predetermined timing.

According to the above-mentioned configuration, when the transfer completion detection unit detects completion of the at least one data transfer operation, the transfer completion notification signal is sent to the corresponding one of the data transfer control devices in accordance with the predetermined timing. With this configuration, the timing in accordance with which the transfer completion notification signal is sent is appropriately set so that the plurality of data transfer control devices exclusively acquire the transfer control information pieces. Therefore, it is possible to prevent the plurality of data transfer control devices from competing with each other to acquire the same transfer control information piece.

In the data transfer completion notification device pertaining to the present invention, priorities may be set in advance among the data transfer channels, and the data transfer completion notification device may further comprise a priority judgment unit causing the transfer completion notification unit to send the transfer completion notification signal to only one of the data transfer control devices corresponding to one of the data transfer channels having the highest priority, when the transfer completion detection unit simultaneously detects completion of a plurality of data transfer operations.

According to the above-mentioned configuration, priorities are set in advance among the data transfer channels, and the data transfer completion notification device further includes the priority judgment unit causing the transfer completion notification unit to send the transfer completion notification signal to only one of the data transfer control devices corresponding to one of the data transfer channels having the highest priority, when the transfer completion detection unit simultaneously detects completion of the plurality of data transfer operations. Since the plurality of data transfer control devices exclusively acquire the transfer control information pieces, it is possible to prevent the plurality of data transfer control devices from competing with each other to acquire the same transfer control information piece.

The data transfer completion notification device pertaining to the present invention may further comprise a transfer control information acquisition completion recognition unit recognizing that each of the data transfer control devices completes acquisition of one of the transfer control information pieces, wherein until the transfer control information acquisition completion recognition unit recognizes that one of the data transfer control devices completes acquisition of one of the transfer control information pieces, the transfer completion notification unit may not send the transfer completion notification signal to each of the other one or more data transfer control devices.

According to the above-mentioned configuration, it is possible to prevent one of the data transfer control devices from acquiring a transfer control information piece while another data transfer control device is acquiring a transfer control information piece. Therefore, it is possible to more surely prevent the plurality of data transfer control devices from competing with each other to acquire the transfer control information piece.

In the data transfer completion notification device pertaining to the present invention, the transfer completion detection unit may include a completion result detection subunit detecting whether the data transfer is normally or abnormally completed, and sending a completion result notification signal to a corresponding one of the data transfer control devices.

According to the above-mentioned configuration, data transfer is performed again when the data transfer is abnormally completed.

In the data transfer completion notification device pertaining to the present invention, the completion result detection subunit may detect that the data transfer is abnormally completed when a checksum error of transferred data occurs.

According to the above-mentioned configuration, it is possible to detect abnormal completion of the data transfer in a simple way.

Another aspect of the present invention is a data transfer control integrated circuit that reads, from a transfer control information management device holding a plurality of transfer control information pieces to be read in a predetermined order and management information for managing the predetermined order, one of the transfer control information pieces, and controls data transfer performed according to the read transfer control information piece via a corresponding one of data transfer channels, the data transfer control integrated circuit comprising: a transfer control information read unit reading one of the transfer control information pieces to be read in the predetermined order; a position information hold unit holding position information indicating a position of the read transfer control information piece among the predetermined order; a transfer completion recognition unit recognizing completion of data transfer performed according to the read transfer control information piece; a position information acquisition unit acquiring position information from each of other one or more data transfer control integrated circuits; a positional relation determination unit determining a relation between the position indicated by the position information held by the position information hold unit and a position indicated by the acquired position information; and a management information update unit updating the management information, when the transfer completion recognition unit recognizes completion of the data transfer and the positional relation determination unit determines that the position indicated by the held position information is earlier than the position indicated by the acquired position information.

According to the above-mentioned configuration, it is possible to achieve miniaturization.

Yet another aspect of the present invention is a data transfer control method for reading, from a transfer control information management device holding a plurality of transfer control information pieces to be read in a predetermined order and management information for managing the predetermined order, one of the transfer control information pieces, and controlling data transfer performed according to the read transfer control information piece via a corresponding one of data transfer channels, the data transfer control method comprising: a transfer control information read step of reading one of the transfer control information pieces to be read in the predetermined order; a position information hold step of holding position information indicating a position of the read transfer control information piece among the predetermined order; a transfer completion recognition step of recognizing completion of data transfer performed according to the read transfer control information piece; a position information acquisition step of acquiring position information from each of other one or more data transfer control devices; a positional relation determination step of determining a relation between the position indicated by the position information held by the position information hold step and a position indicated by the acquired position information; and a management information update step of updating the management information, when the transfer completion recognition step recognizes completion of the data transfer and the positional relation determination step determines that the position indicated by the held position information is earlier than the position indicated by the acquired position information.

According to the above-mentioned configuration, the data transfer control device sequentially performs data transfer operations independently from the other one or more data transfer control devices, and recognizes that the data transfer operations are completed or not completed with reference to the predetermined order based on the management information while preventing an occurrence of latency during the data transfer. Therefore, the throughput of data transfer is significantly improved, and a malfunction of a processing device that performs processing using the plurality of data pieces after recognizing completion of all the data transfer operations is prevented.

Yet another aspect of the present invention is a data transfer completion notification integrated circuit that is connected to each of a plurality of data transfer control devices controlling data transfer performed in parallel via respective data transfer channels according to respective transfer control information pieces, and notifies at least one of the data transfer control devices of completion of data transfer controlled by the at least one data transfer control device, the data transfer completion notification integrated circuit comprising: a transfer completion detection unit detecting completion of at least one data transfer operation; and a transfer completion notification unit sending, when the transfer completion detection unit detects completion of the at least one data transfer operation, a transfer completion notification signal to a corresponding one of the data transfer control devices.

According to the above-mentioned configuration, it is possible to achieve miniaturization.

Yet another aspect of the present invention is a data transfer completion notification method used in a data transfer completion notification device that is connected to each of a plurality of data transfer control devices controlling data transfer performed in parallel via respective data transfer channels according to respective transfer control information pieces, and notifies at least one of the data transfer control devices of completion of data transfer controlled by the at least one data transfer control device, the data transfer completion notification method comprising: a transfer completion detection step of detecting completion of at least one data transfer operation; and a transfer completion notification step of sending, when the transfer completion detection step detects completion of the at least one data transfer operation, a transfer completion notification signal to a corresponding one of the data transfer control devices.

According to the above-mentioned configuration, the timing in accordance with which the transfer completion notification signal is sent is appropriately set so that the plurality of data transfer control devices exclusively acquire the transfer control information pieces. Therefore, it is possible to prevent the plurality of data transfer control devices from competing with each other to acquire the same transfer control information piece.

Yet another aspect of the present invention is a data transfer control system composed of (i) a data transfer control device that reads, from a transfer control information management device holding a plurality of transfer control information pieces to be read in a predetermined order and management information for managing the predetermined order, one of the transfer control information pieces, and controls data transfer performed according to the read transfer control information piece via a corresponding one of data transfer channels, and (ii) a data transfer completion notification device that is connected to each of a plurality of data transfer control devices controlling data transfer performed in parallel via respective data transfer channels according to respective transfer control information pieces, and notifies at least one of the data transfer control devices of completion of data transfer controlled by the at least one data transfer control device, wherein the data transfer control device comprising: a transfer control information read unit reading one of the transfer control information pieces to be read in the predetermined order; a position information hold unit holding position information indicating a position of the read transfer control information piece among the predetermined order; a transfer completion recognition unit recognizing completion of data transfer performed according to the read transfer control information piece; a position information acquisition unit acquiring position information from each of other one or more data transfer control devices; a positional relation determination unit determining a relation between the position indicated by the position information held by the position information hold unit and a position indicated by the acquired position information; and a management information update unit updating the management information, when the transfer completion recognition unit recognizes completion of the data transfer and the positional relation determination unit determines that the position indicated by the held position information is earlier than the position indicated by the acquired position information, and the data transfer completion notification device comprising: a transfer completion detection unit detecting completion of at least one data transfer operation; and a transfer completion notification unit sending, when the transfer completion detection unit detects completion of the at least one data transfer operation, a transfer completion notification signal to a corresponding one of the data transfer control devices.

According to the above-mentioned configuration, the data transfer control device sequentially performs data transfer operations independently from the other one or more data transfer control devices, and recognizes that the data transfer operations are completed or not completed with reference to the predetermined order based on the management information while preventing an occurrence of latency during the data transfer. Therefore, the throughput of data transfer is significantly improved, and a malfunction of a processing device that performs processing using the plurality of data pieces after recognizing completion of all the data transfer operations is prevented. In addition, the timing in accordance with which the transfer completion notification signal is sent is appropriately set so that the plurality of data transfer control devices exclusively acquire the transfer control information pieces. Therefore, it is possible to prevent the plurality of data transfer control devices from competing with each other to acquire the same transfer control information piece.

BRIEF DESCRIPTION OF DRAWINGS

FIG. 5 illustrates operations of a write pointer and an overlap flag pertaining to Embodiment 1.

FIGS. 12A and 12B illustrate an operation of a descriptor acquisition unit pertaining to Embodiment 1.

DESCRIPTION OF EMBODIMENTS

Embodiment 1

<1> Data

Figure 1:
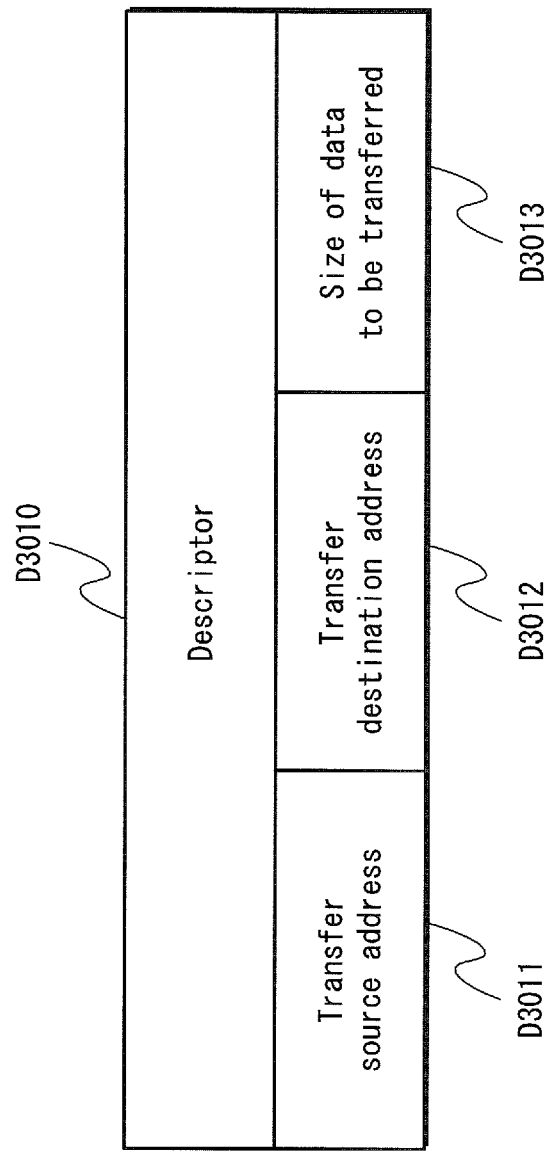
FIG. 1 is a conceptual diagram of a descriptor used by a data transfer control device pertaining to Embodiment 1.

Data transfer control devices 1061, 1062 and 1063 pertaining to the present embodiment use descriptors D3010 as transfer control information pieces. As illustrated in FIG. 1, each of the descriptors D3010 is composed of a transfer source address D3011, a transfer destination address D3012 and a size of data to be transferred D3013. As each of the transfer source address D3011 and the transfer destination address D3012, an address on an IO buffer 1074 (described later) or a main memory 1010 (described later) is set. As the size of data to be transferred D3013, size information indicated in bytes is set.

<2> Configuration

<2-1> Overall Configuration of System

Figure 2:
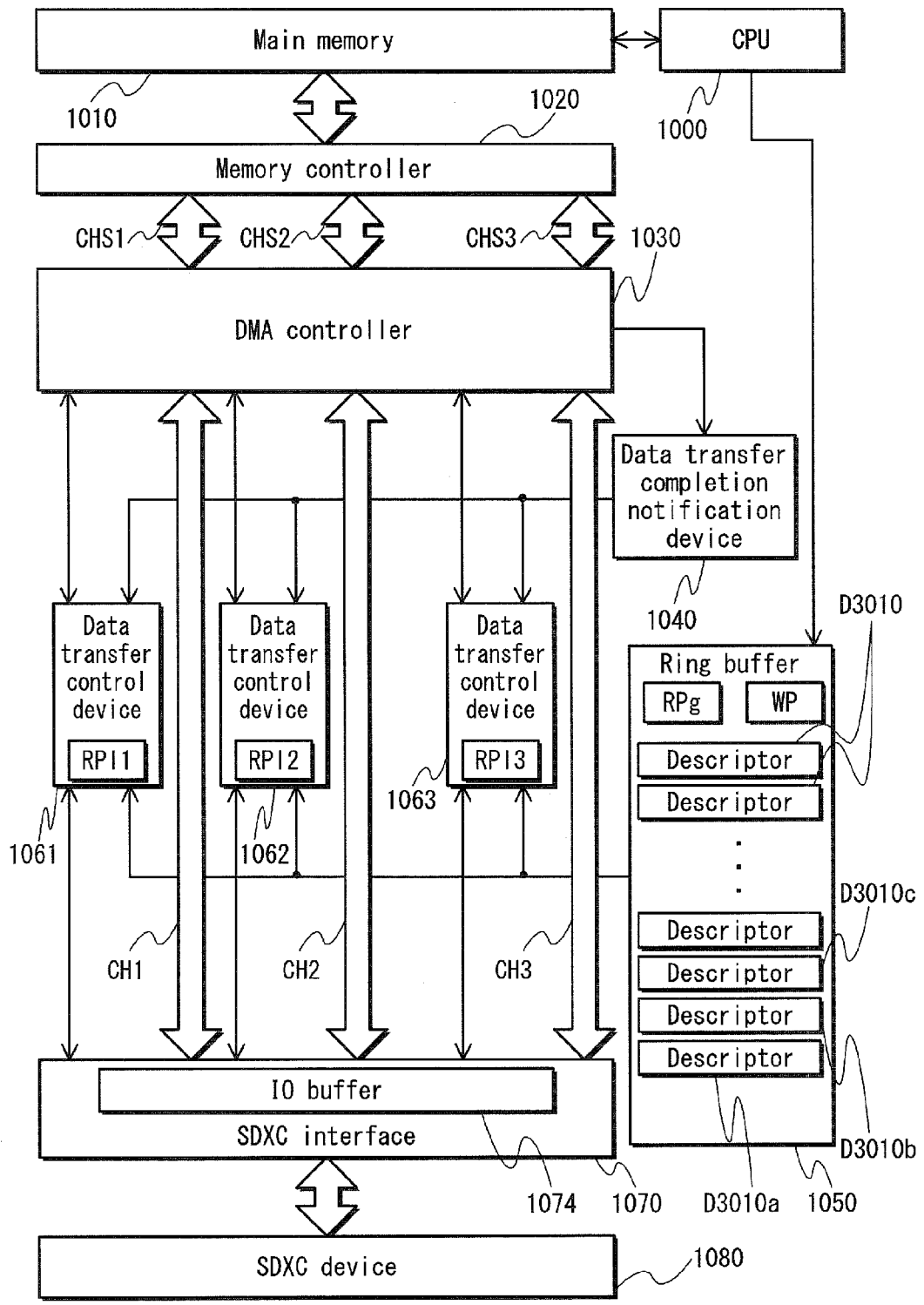
FIG. 2 is a block diagram of an information processing system pertaining to Embodiment 1.

FIG. 2 is a block diagram of an information processing system including the data transfer control devices 1061, 1062 and 1063 pertaining to the present embodiment.

As illustrated in FIG. 2, the information processing system includes: an SDXC interface 1070 to which a device compatible with SDXC (hereinafter, referred to as an SDXC device) 1080 is connected; a main memory 1010; a CPU 1000; a DMA (Direct Memory Access) controller 1030 controlling DMA transfer; a memory controller 1020; a plurality of (three in an example illustrated in FIG. 2) data transfer control devices 1061, 1062 and 1063; a data transfer completion notification device 1040; and a ring buffer 1050 holding descriptors used by the data transfer control devices 1061, 1062 and 1063.

The three data transfer control devices 1061, 1062 and 1063 and the data transfer completion notification device 1040 constitute a data transfer control system 106.

The SDXC interface 1070 includes an IO buffer 1074 for temporarily storing therein data input from the SDXC device 1080 or data output to the SDXC device 1080. The SDXC interface 1070 is configured to transfer data pieces stored in the IO buffer 1074 to the DMA controller 1030 in parallel via three logical channels CH1, CH2 and CH3. Note that examples of the SDXC device 1080 are a communication device such as a WLAN and removable media such as an SD memory card.

The DMA controller 1030 has functions of transferring data from the IO buffer to the memory controller 1020 via the logical channels CH1, CH2 and CH3 and transferring data from the memory controller 1020 to the IO buffer 1074 via the logical channels CH1, CH2 and CH3.

The DMA controller 1030 detects completion of data transfer for each of the logical channels CH1, CH2 and CH3, and sends a transfer completion notification signal notifying the data transfer completion notification device 1040 of the completion of data transfer. The transfer completion notification signal includes a normal completion notification signal for notifying the data transfer completion notification device 1040 that data transfer is normally completed, and an abnormal completion notification signal for notifying the data transfer completion notification device 1040 that data transfer is abnormally completed. The DMA controller 1030 includes a checksum computation unit (not illustrated) computing a checksum of transferred data for each of the logical channels CH1, CH2 and CH3. When the result of computation performed by the checksum computation unit does not match a checksum expectation value included in the transferred data (when a checksum error occurs), the DMA controller 1030 includes the abnormal completion notification signal in a data transfer completion signal.

The memory controller 1020 writes, to the main memory 1010, a plurality of data pieces transferred in parallel from the DMA controller 1030 via three logical channels CHS1, CHS2 and CHS3. The memory controller 1020 also reads a plurality of data pieces from the main memory 1010, and transfers the read data pieces to the DMA controller 1030 in parallel via the logical channels CHS1, CHS2 and CHS3.

When recognizing, from a value of a global read pointer RPg (described later), that all data pieces necessary for processing have been transferred to the main memory 1010, the CPU 1000 accesses the main memory 1010 to perform the processing. The CPU 1000 also has functions of generating the descriptors D3010 used to control data transfer, and storing the generated descriptors D3010 in the ring buffer 1050.

<2-2> Configuration of Ring Buffer

The ring buffer 1050 is embodied by a memory such as a DRAM (Dynamic Random Access Memory) and a SRAM (Static RAM). The ring buffer 1050 stores therein a plurality of descriptors D3010 to be read by the three data transfer control devices 1061, 1062 and 1063. As illustrated in FIG. 2, the ring buffer 1050 is capable of storing therein up to 12 descriptors D3010. Note that the ring buffer 1050 corresponds to a transfer control information management device.

The descriptors D3010 are read and stored in a FIFO manner

In the present embodiment, the CPU 1000 stores the descriptors D3010 in storage areas of the ring buffer 1050 in ascending order of an address of each of storage areas, beginning with a storage area M51 having the smallest address to storage areas M52, M53 and so on having larger addresses. The descriptors D3010 are read in ascending order of an address of each of the storage areas, beginning with a descriptor D3010a stored in the storage area M51 having the smallest address.

In the present embodiment, when an address indicated by a write pointer WP (described later) is larger than any addresses indicated by local read pointers RPl1, RPl2 and RPl3 (described later), or when the address indicated by the write pointer WP is smaller than any addresses indicated by the local read pointers RPl1, RPl2 and RPl3, a position of one of the descriptors D3010 stored in a storage area having the smallest address of all the addresses indicated by the local read pointers RPl1, RPl2 and RPl3 is the earliest in an order of reading the descriptors D3010.

In contrast, when only the address indicated by the local read pointer RPl1 is larger than the address indicated by the write pointer WP and the addresses indicated by other local read pointers RPl2 and RPl3 are smaller than the address indicated by the write pointer WP, a position of one of the descriptors D3010 stored in a storage area having the address indicated by the local read pointer RPl1 is the earliest in the order of reading the descriptors D3010.

That is to say, when there are one or more local read pointers indicating addresses larger than the address indicated by the write pointer, a position of one of the descriptors D3010 stored in a storage area having the smallest address of all the addresses indicated by the one or more local read pointers is the earliest in the order of reading the descriptors D3010, and when there is no local read pointer indicating an address larger than the address indicated by the write pointer, a position of one of the descriptors D3010 stored in a storage area having the smallest address of all addresses indicated by the local read pointers is the earliest in the order of reading the descriptors D3010.

Figure 3A:
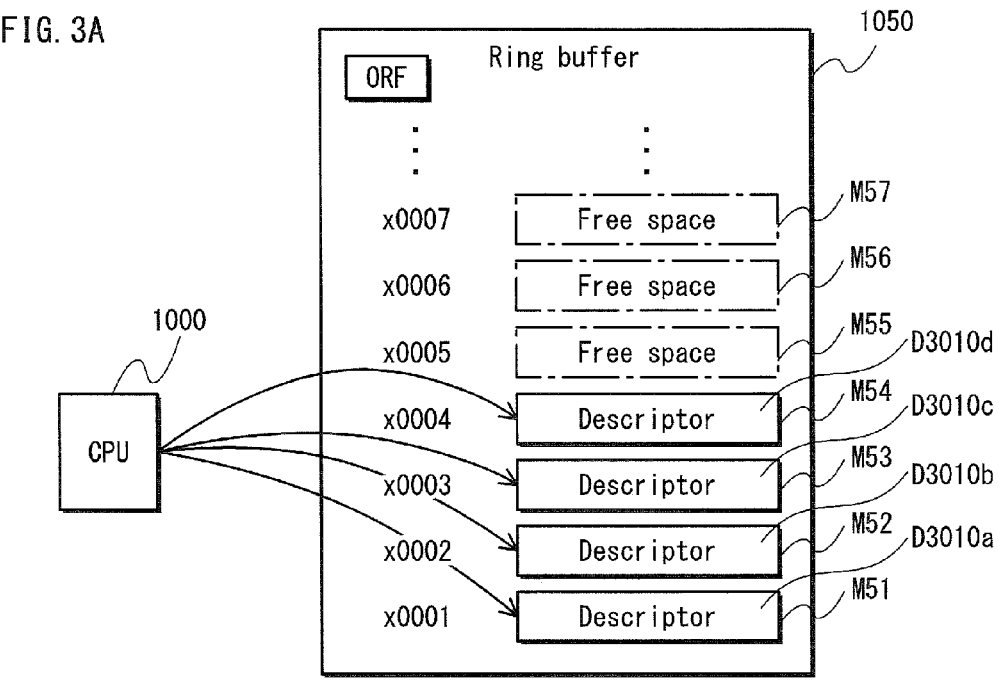
FIGS. 3A and 3B illustrate an operation of a ring buffer pertaining to Embodiment 1.
Figure 3B:
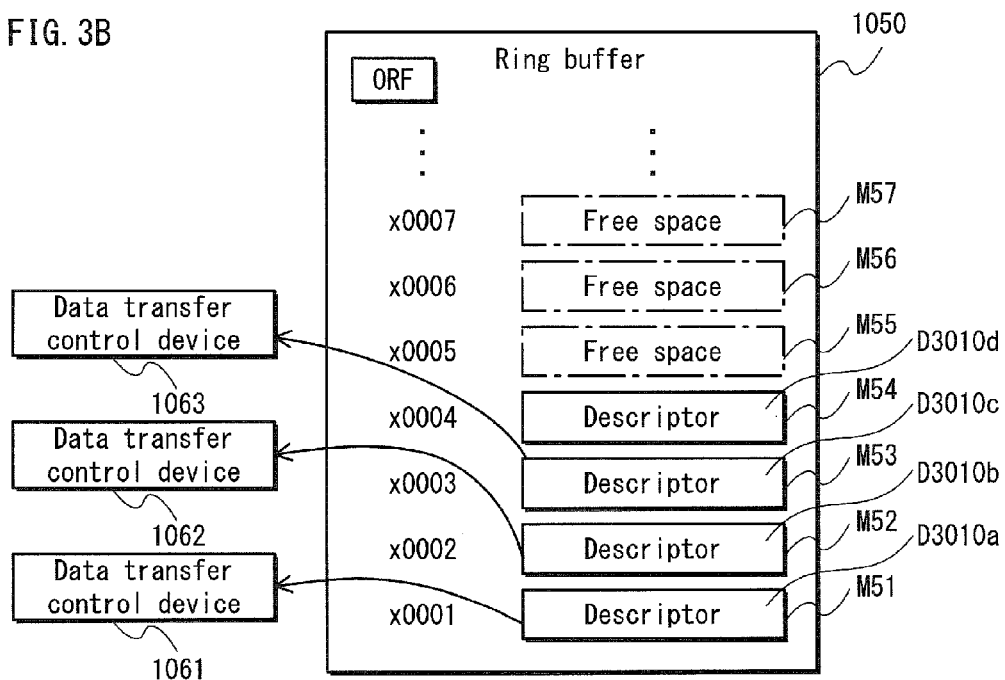

In an example illustrated in FIG. 3A, the CPU 1000 stores a descriptor D3010a in the storage area M51 having the smallest address "x0001" first. The CPU 1000 then respectively stores descriptors D3010b, D3010c and D3010d in a storage area M52 having an address "x0002", a storage area M53 having an address "x0003" and a storage area M54 having an address "x0004" in this order. On the other hand, as illustrated in FIG. 3B, the data transfer control devices 1061, 1062 and 1063 each read these descriptors in order, beginning with the descriptor D3010a having been stored first.

<2-2-1> Management Information

The ring buffer 1050 holds, as management information, the write pointer WP, the global read pointer RPg and an overlap flag ORF. The write pointer WP, the global read pointer RP and the overlap flag ORF are each embodied by a variable on a memory and a register.

Figure 4:
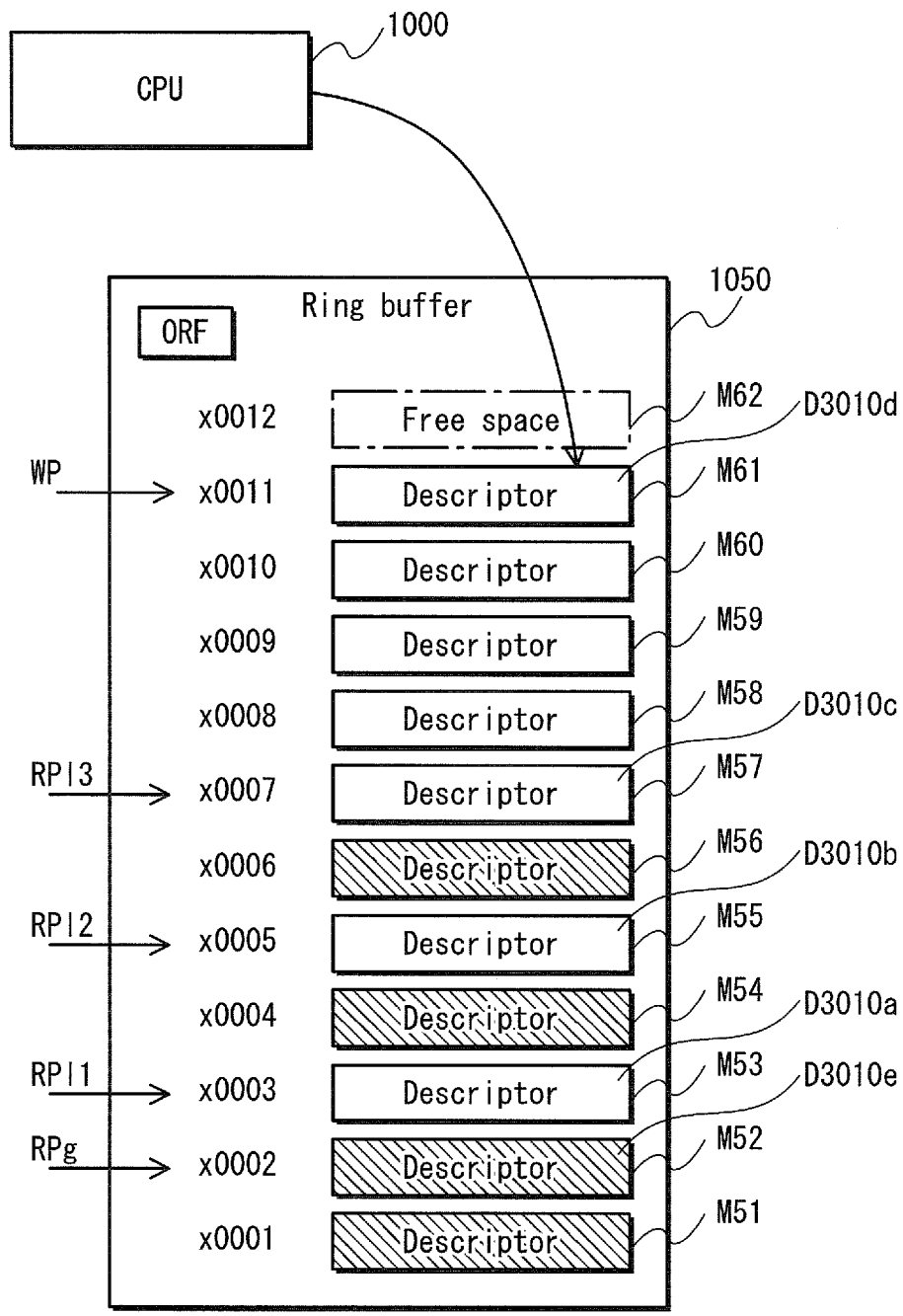
FIG. 4 illustrates management information held on a ring buffer pertaining to Embodiment 1.

The write pointer WP is updated when one of the descriptors D3010 is newly stored in the ring buffer 1050. As illustrated in FIG. 4, when a new descriptor D3010d is stored in a storage area M61, a value of the write pointer WP is updated with a value "x0011", which is an address of a storage area M62. The storage area M62, which has a larger address than the value indicated by the write pointer WP, is a free space. Note that the write pointer WP corresponds to last position information.

As illustrated in FIG. 4, the global read pointer RPg indicates an address of the storage area M52 storing therein a descriptor D3010e whose position is earlier than a position of the descriptor D3010a stored in a storage area having the smallest address (the address indicated by the local read pointer RPl1 in FIG. 4) of all the addresses indicated by the local read pointers RPl1, RPl2 and RPl3 (described later).

The global read pointer RPg indicates one or more of a plurality of data transfer operations having surely been completed. When the global read pointer RPg indicates the address of the storage area M52 in which the descriptor D3010e is stored, data transfer performed according to one or more of the descriptors D3010 whose positions are earlier than the position of the descriptor D3010e has been completed.

As illustrated in FIG. 5, when the new descriptor D3010d is stored in the storage area M51 and the value of the write pointer WP is updated accordingly, the overlap flag ORF is set to "1 (enable state)" if the value of the write pointer WP before update ("x0012" in FIG. 5) is larger than the value of the write pointer WP after update ("x0001" in FIG. 5).

Figure 6:
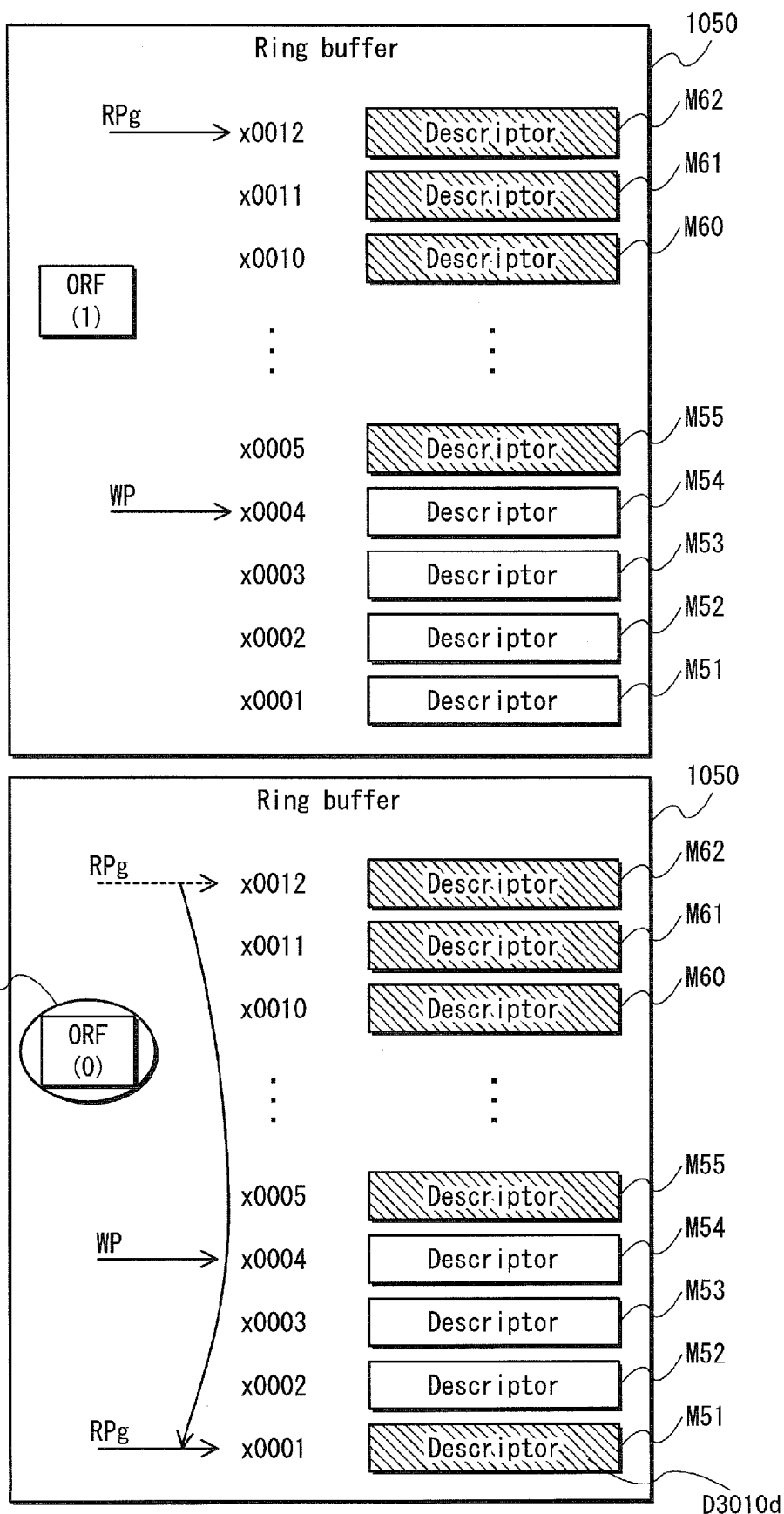
FIG. 6 illustrates operations of a global read pointer and the overlap flag pertaining to Embodiment 1.

On the other hand, as illustrated in FIG. 6, when the value of the global read pointer RPg is updated by any of the data transfer control devices 1061, 1062 and 1063, the overlap flag ORF is set to "0 (disable state)" if the value of the read pointer before update ("x0012" in FIG. 6) is larger than the value of the read pointer after update ("x0001" in FIG. 6).

<2-3> Configuration of Data Transfer Control Device

The data transfer control device 1061 controls data transfer performed between the SDXC interface 1070 and the DMA controller 1030 via the logical channel CH1. Configurations of the data transfer control devices 1062 and 1063 are each similar to the configuration of the data transfer control device 1061. Therefore, the description thereof is omitted.

Figure 7:
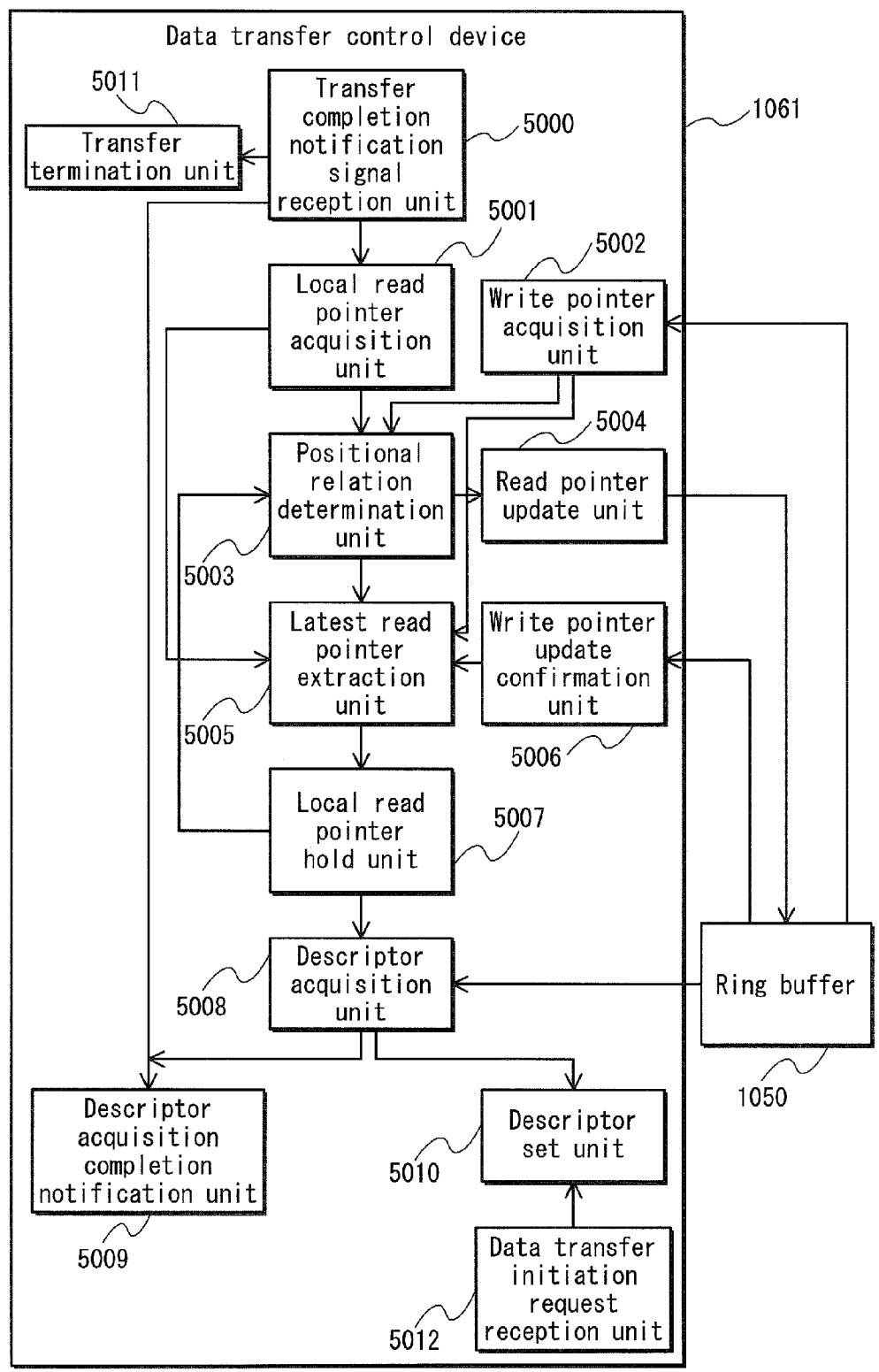
FIG. 7 is a block diagram of the data transfer control device pertaining to Embodiment 1.

As illustrated in FIG. 7, the data transfer control device 1061 includes: a descriptor acquisition unit 5008; a local read pointer hold unit 5007; a transfer completion notification signal reception unit 5000; a local read pointer acquisition unit 5001; a positional relation determination unit 5003; a read pointer update unit 5004; a latest read pointer extraction unit 5005; a write pointer acquisition unit 5002; a write pointer update confirmation unit 5006; and a descriptor acquisition completion notification unit 5009. The data transfer control devices 1061, 1062 and 1063 each include: a transfer termination unit 5011; a descriptor set unit 5010; and a data transfer initiation request reception unit 5012.

<2-3-1> Write Pointer Acquisition Unit

The write pointer acquisition unit 5002 acquires the value of the write pointer WP from the ring buffer 1050. Note that the write pointer acquisition unit 5002 corresponds to a last position information acquisition unit.

<2-3-2> Local Read Pointer Hold Unit

Figure 8A:
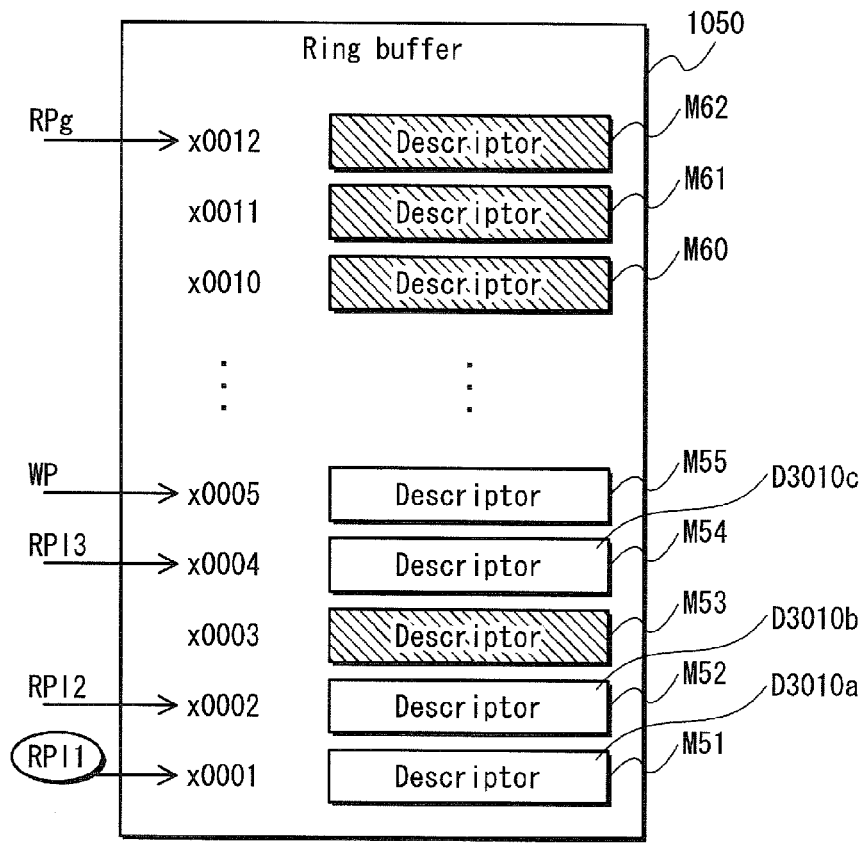
FIGS. 8A and 8B illustrate an operation of a positional relation determination unit pertaining to Embodiment 1.
Figure 8B:
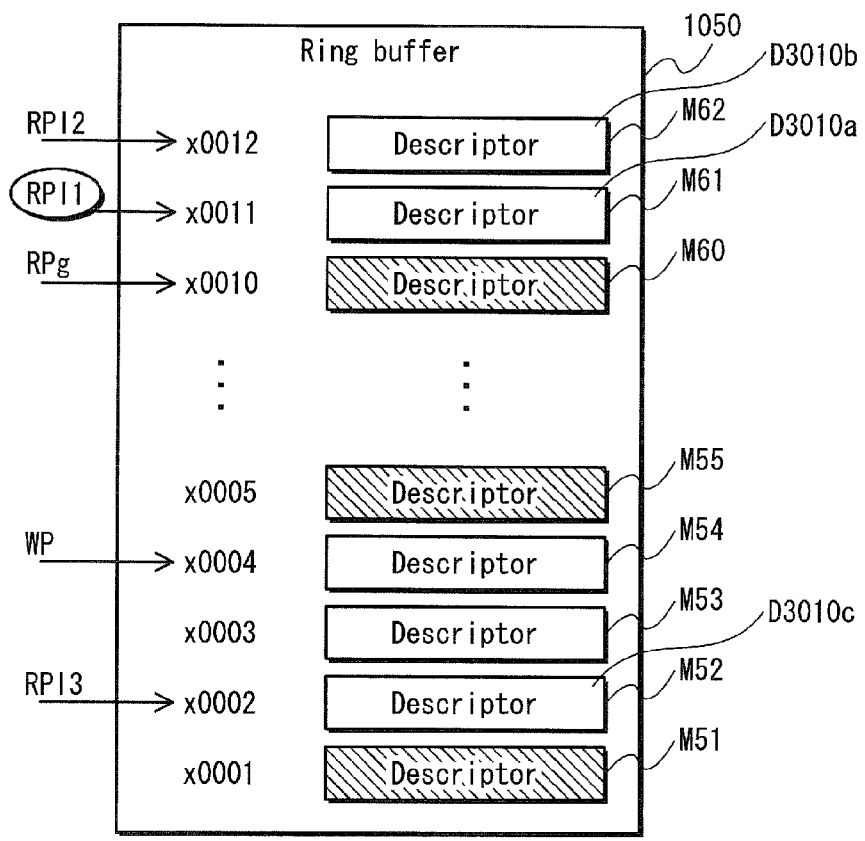

As illustrated in FIGS. 8A and 8B, the local read pointer hold unit 5007 holds the local read pointer (first local read pointer) RPl1 indicating the storage area M51 (M57) in which the descriptor D3010a used by the data transfer control device 1061 including the local read pointer hold unit 5007 is stored. Note that the local read pointer hold unit 5007 corresponds to a position information hold unit.

<2-3-3> Transfer Completion Notification Signal Reception Unit transfer completion notification signal reception unit 5000 recognizes that data transfer performed according to the descriptor D3010a is completed, upon receiving the transfer completion notification signal sent from the data transfer completion notification device 1040. Note that the transfer completion notification signal reception unit 5000 corresponds to a transfer completion recognition unit.

The transfer completion notification signal reception unit 5000 is further configured to recognize that data transfer is normally or abnormally completed, based on the normal completion signal or the abnormal completion signal included in the transfer completion notification signal.

When the abnormal completion signal is included in the received data transfer completion notification signal, the transfer completion notification signal reception unit 5000 outputs the abnormal completion signal to the descriptor acquisition completion notification unit 5009 and the transfer termination unit 5011. On the other hand, when the normal completion signal is included in the received data transfer completion notification signal, the transfer completion notification signal reception unit 5000 outputs the normal completion signal to the descriptor acquisition completion notification unit 5009, the transfer termination unit 5011 and the local read pointer acquisition unit 5001.

<2-3-4> Local Read Pointer Acquisition Unit

The local read pointer acquisition unit 5001 acquires the values of the local read pointers (second local read pointers) RPl2 and RPl3 respectively held by the other data transfer control devices 1062 and 1063. The local read pointers RPl2 and RPl3 respectively indicate the storage areas M52 and M53 in which the descriptors D3010b and D3010c used by the other data transfer control devices 1062 and 1063 are respectively stored. Note that the local read pointer acquisition unit 5001 corresponds to a position information acquisition unit.

When receiving the normal completion signal from the transfer completion notification signal reception unit 5000, the local read pointer acquisition unit 5001 acquires the values of the local read pointers RPl2 and RPl3 from the other data transfer control devices 1062 and 1063, respectively.

<2-3-5> Positional Relation Determination Unit

The positional relation determination unit 5003 compares the value of the local read pointer RPl1 and the values of the local read pointers RPl2 and RPl3 to determine a relation among positions of the descriptors D3010a, D3010b and D3010c in an order of reading the descriptors D3010a, D3010b and D3010c. Note that the positional relation determination unit 5003 corresponds to a positional relation determination unit.

The positional relation determination unit 5003 also functions as a last position information comparison unit comparing the value of the write pointer WP with a value of a latest read pointer extracted by the latest read pointer extraction unit 5005 (described in detail later).

The positional relation determination unit 5003 first compares the value of the write pointer WP and the values of the local read pointers RPl1, RPl2 and RPl3, and then determines, based on the values of the local read pointers RPl1, RPl2 and RPl3, a relation among positions of the descriptor D3010a stored in a storage area having an address indicated by the local read pointer RPl1 and the descriptors D3010b and D3010c stored in storage areas having addresses respectively indicated by the local read pointers RPl2 and RPl3 in the order of reading the descriptors D3010a, D3010b and D3010c.

When there are one or more of the local read pointers RPl1, RPl2 and RPl3 each indicating an address larger than the address indicated by the write pointer WP after comparison between the value of the write pointer WP and the values of local read pointers RPl1, RPl2 and RPl3, the positional relation determination unit 5003 determines that a position of a descriptor stored in a storage area having the smallest address of all the addresses indicated by the local read pointers RPl1, RPl2 and RPl3 and being larger than the address indicated by the write pointer WP is the earliest in the order.

On the other hand, there is no local read pointer indicating an address larger than the address indicated by the write pointer WP, the positional relation determination unit 5003 determines that a position of one of the descriptors D3010 stored in a storage area having the smallest address of all the addresses indicated by the local read pointers RPl1, RPl2 and RPl3 is the earliest in the order.

For example, assume that the ring buffer 1050 has storage areas M51, M52 to M62 capable of storing therein up to 12 descriptors D3010, as illustrated in FIG. 8A. In this case, assuming that the values of the write pointer WP and the local read pointers RPl1, RPl2 and RPl3 are respectively "x0005", "x0001", "x0002" and "x0004", the positional relation determination unit 5003 determines that a position of the descriptor D3010a stored in a storage area having the smallest address "x0001" of all the addresses indicated by the local read pointers RPl1, RPl2 and RPl3 is the earliest in the order, as the values of the local read pointers RPl1, RPl2 and RPl3 are each smaller than the value of the write pointer WP.

On the other hand, as illustrated in FIG. 8B, assuming that the values of the write pointer WP and the local read pointers RPl1, RPl2 and RPl3 are respectively "x0004", "x0011", "x0012" and "x0002", the positional relation determination unit 5003 determines that a position of the descriptor D3010a stored in a storage area having the smallest address "x0011" of all the addresses indicated by the local read pointers RPl1 and RPl2 is the earliest in the order, as the values of the local read pointers RPl1 and RPl2 are each larger than the value of the write pointer WP and the value of the local read pointer RPl3 is smaller than the value of the write pointer WP.

<2-3-6> Read Pointer Update Unit

When the transfer completion notification signal reception unit 5000 recognizes that data transfer performed according to the descriptor D3010a is completed, and a position of the descriptor D3010a indicated by the local read pointer RPl1 is determined to be earlier than positions of the descriptors D3010b and D3010c respectively indicated by the local read pointers RPl2 and RPl3 respectively held by the data transfer control devices 1062 and 1063, the read pointer update unit 5004 updates the value of the global read pointer RPg with the value of the local read pointer RPl1.

Figure 9:
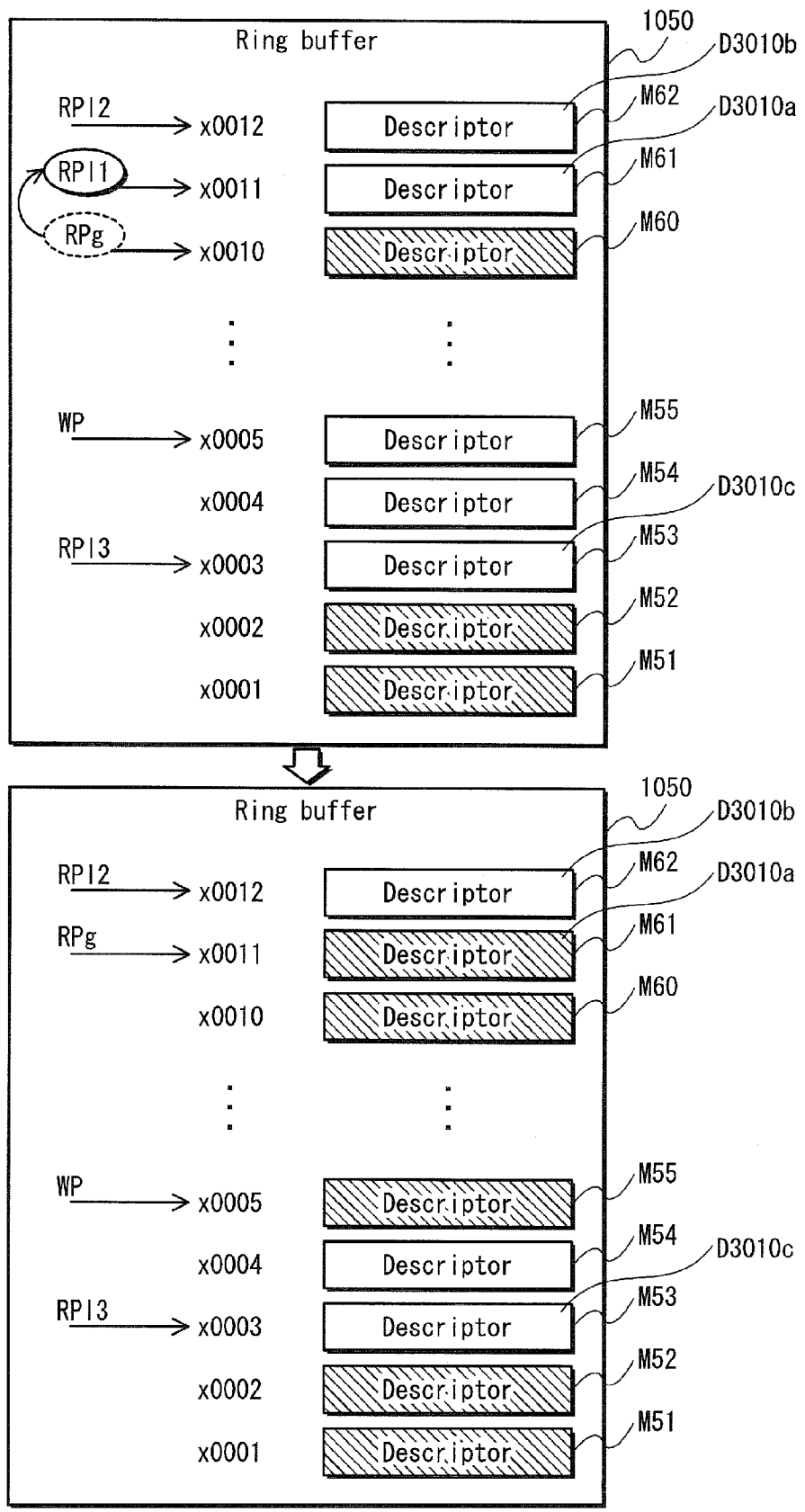
FIG. 9 illustrates operations of a local read pointer and the global read pointer pertaining to Embodiment 1.

This is explained below with use of FIG. 9. Assume that the values of the write pointer WP and the local read pointers RPl1, RPl2 and RPl3 are respectively "x0005", "x00011", "x0012" and "x0003". In this case, a difference between the values of the write pointer WP and the local read pointer RPl1 is "6", a difference between the values of the write pointer WP and the local read pointer RPl2 is "5", and a difference between the values of the write pointer WP and the local read pointer RPl3 is "2".

The positional relation determination unit 5003 determines that a position of the descriptor D3010a indicated by the local read pointer RPl1 is earlier than positions of the descriptors D3010b and D3010c respectively indicated by the local read pointers RPl2 and RPl3.

In this case, when completion of data transfer performed according to the descriptor D3010a is recognized, the read pointer update unit 5004 updates the value "x0010" of the global read pointer RPg with the value "x0011" of the local read pointer RPl1.

On the other hand, when the transfer completion notification signal reception unit 5000 recognizes that the data transfer performed according to the descriptor D3010a is completed, and the positional relation determination unit 5003 determines that the position of the descriptor D3010a held by the data transfer control device 1061 is not earlier than the positions of the descriptors D3010b and D3010c respectively held by the other data transfer control devices 1062 and 1063, the read pointer update unit 5004 does not update the value of the global read pointer RPg with the value of the local read pointer RPl1.

Figure 10:
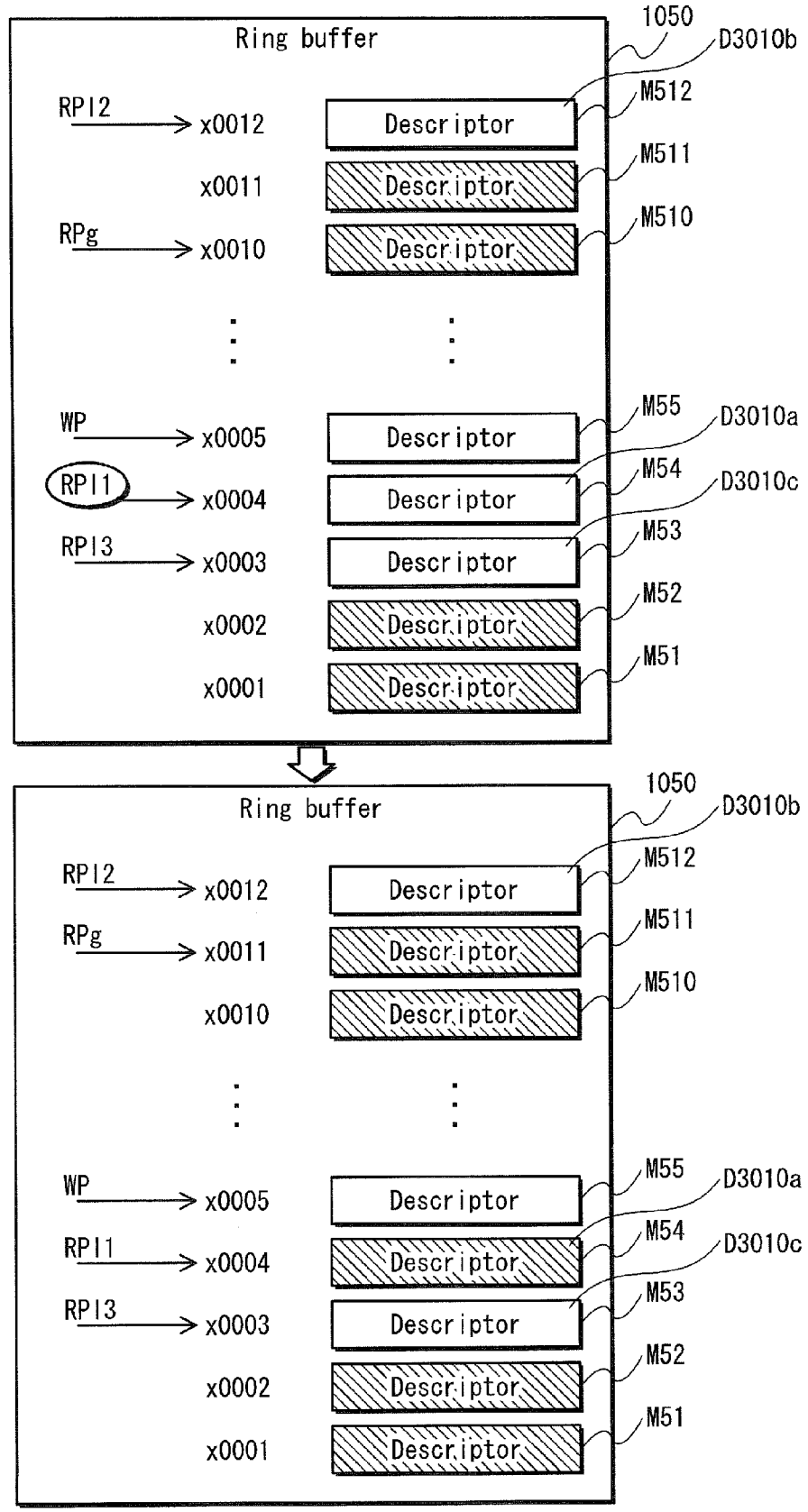
FIG. 10 illustrates operations of the local read pointer and the global read pointer pertaining to Embodiment 1.

This is explained below with use of FIG. 10. Assume that the values of the write pointer WP and the local read pointers RPl1, RPl2 and RPl3 are respectively "x0005", "x0004", "x0012" and "x0003". In this case, a difference between the values of the write pointer WP and the local read pointer RPl1 is "1", a difference between the values of the write pointer WP and the local read pointer RPl2 is "5", and a difference between the values of the write pointer WP and the local read pointer RPl3 is "2".

In this case, the read pointer update unit 5004 does not update the value "x0011" of the global read pointer RPg with the value "x0004" of the local read pointer RPl1 as the positional relation determination unit 5003 determines that the position of the descriptor D3010a indicated by the local read pointer RPl1 is not earlier than the positions of the descriptors D3010b and D3010c respectively indicated by the local read pointers RPl2 and RPl3.

When updating the value of the global read pointer RPg, the read pointer update unit 5004 sets the overlap flag ORF to "0 (disable state)" if the value "x0012" of the global read pointer before update is larger than the value "x0001" of the global read pointer after update as illustrated in FIG. 6.

<2-3-7> Latest Read Pointer Extraction Unit

The latest read pointer extraction unit 5005 includes a local read pointer comparison unit (not illustrated) that compares the value of the local read pointer RPl1 held by the local read pointer hold unit 5007 and the values of the local read pointers RPl2 and RPl3 acquired by the local read pointer acquisition unit 5001 from the other data transfer control devices 1062 and 1063, respectively. After comparing the values of the local read pointers RPl1, RPl2 and RPl3, the latest read pointer extraction unit 5005 extracts, as a latest read pointer, one of the local read pointers RPl1, RPl2 and RPl3 indicating a value whose difference from the value of the write pointer WP is the smallest.

Figure 11A:
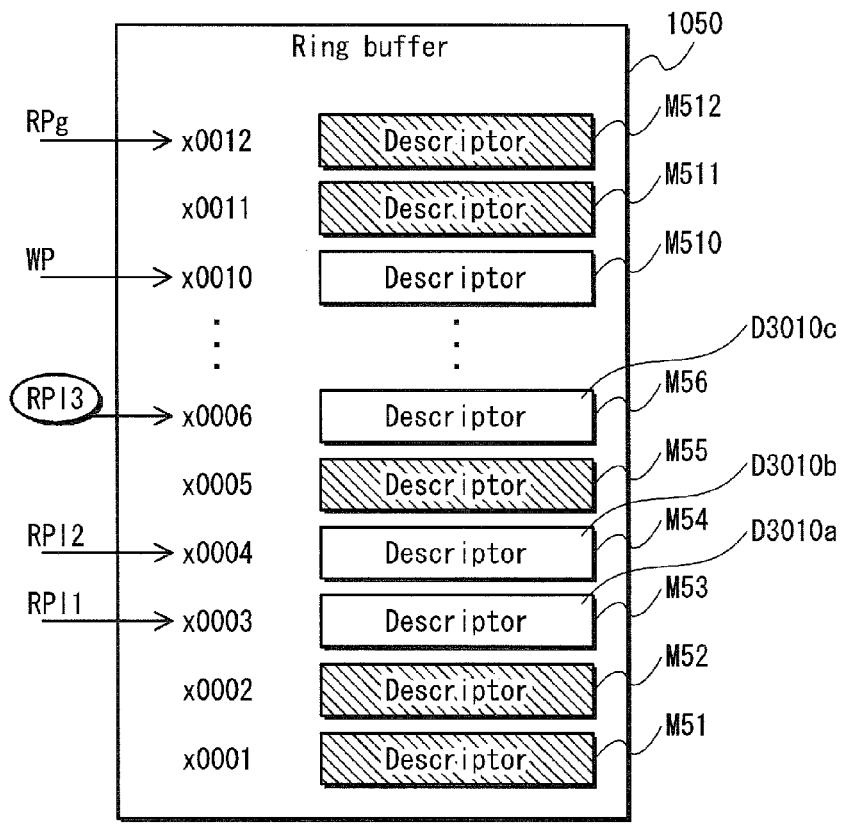
FIGS. 11A and 11B illustrate an operation of a latest read pointer extraction unit pertaining to Embodiment 1.

This is explained below with use of FIG. 11A. Assume that the values of the write pointer WP and the local read pointers RPl1, RPl2 and RPl3 are respectively "x0010", "x0003", "x0004" and "x0006". In this case, a difference between the values of the write pointer WP and the local read pointer RPl1 is "7", a difference between the values of the write pointer WP and the local read pointer RPl2 is "6", and a difference between the values of the write pointer WP and the local read pointer RPl3 is "4".

In this case, the local read pointer comparison unit determines that a relative difference between the values of the local read pointer RPl3 and the write pointer WP is the smallest, and thus the latest read pointer extraction unit 5005 extracts the local read pointer RPl3 as the latest read pointer.

Figure 11B:
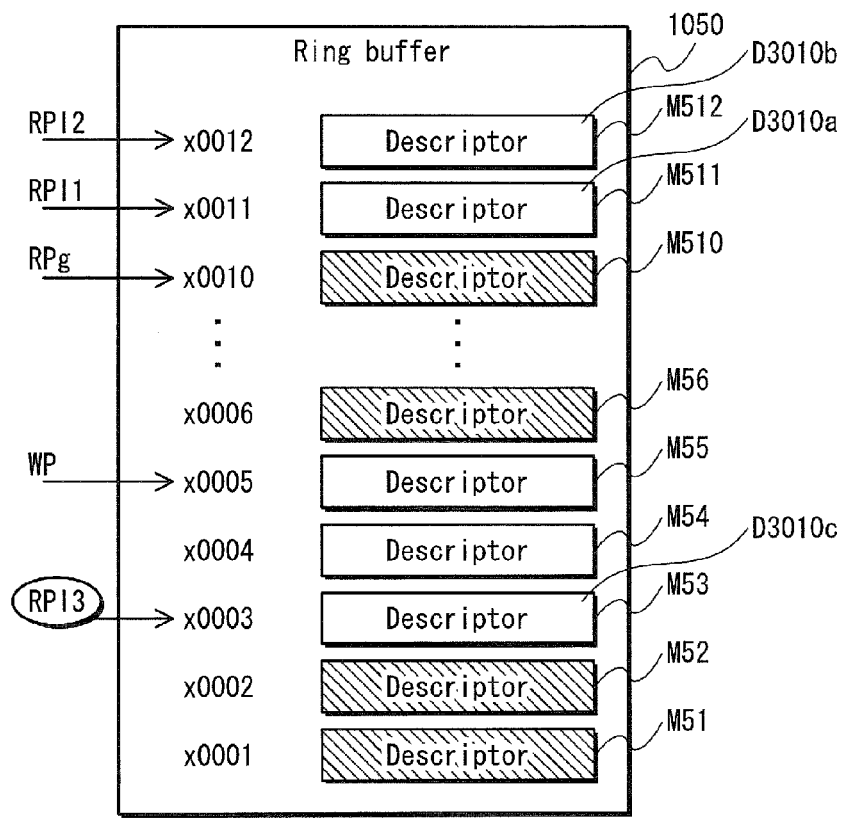

This is explained below with use of FIG. 11B. Assume that the values of the write pointer WP and the local read pointers RPl1, RPl2 and RPl3 are respectively "x0005", "x0011", "x0012" and "x0003". In this case, a difference between the values of the write pointer WP and the local read pointer RPl1 is "6", a difference between the values of the write pointer WP and the local read pointer RPl2 is "5", and a difference between the values of the write pointer WP and the local read pointer RPl3 is "2".

In this case, the local read pointer comparison unit determines that a relative difference between the values of the local read pointer RPl3 and the write pointer WP is the smallest, and thus the latest read pointer extraction unit 5005 extracts the local read pointer RPl3 as the latest read pointer.

<2-3-8> Write Pointer Update Confirmation Unit

The write pointer update confirmation unit 5006 detects update of the value of the write pointer WP performed when one of the descriptors D3010 is newly stored in the ring buffer 1050. Note that the write pointer update confirmation unit 5006 corresponds to a last position information update detection unit.

<2-3-9> Descriptor Acquisition Unit

The descriptor acquisition unit 5008 performs, in accordance with the value of the local read pointer RPl1 held by the local read pointer hold unit 5007, processing to acquire the descriptor D3010a stored in a storage area having an address indicated by the local read pointer RPl1 on the ring buffer 1050 (see FIG. 7). Upon completing the acquisition of the descriptor D3010a, the descriptor acquisition unit 5008 outputs a descriptor acquisition completion signal to the descriptor acquisition completion notification unit 5009. Note that the descriptor acquisition unit 5008 corresponds to a transfer control information read unit.

When the transfer completion notification signal reception unit 5000 recognizes that data transfer is normally completed, the descriptor acquisition unit 5008 performs processing to newly acquire a third descriptor D3010. When the transfer completion notification signal reception unit 5000 recognizes that data transfer is abnormally completed, the descriptor acquisition unit 5008 does not perform processing to newly acquire the third descriptor D3010.

Furthermore, when the positional relation determination unit 5003 determines that the value of the write pointer WP is equal to the value of the latest read pointer, and the overlap flag ORF is set to "0 (disable state)", the descriptor acquisition unit 5008 does not perform processing to newly acquire one of the descriptors D3010.

This is explained below with use of FIG. 12A. When completion of data transfer performed according to the descriptor D3010b is recognized, and the value of the write pointer WP is determined to be equal to the value of the latest read pointer, the latest read pointer extraction unit 5005 does not update the value of the local read pointer RPl2 held by the local read pointer hold unit 5007 so that the descriptor acquisition unit 5008 does not perform processing to acquire one of the descriptors D3010. In the above-mentioned manner, the descriptor acquisition unit 5008 is prevented from acquiring one or more of the descriptors D3010 corresponding to data transfer having already been completed.

As illustrated in FIG. 12B, when the CPU 1000 stores a new descriptor D3010e after the value of the write pointer WP is determined to be equal to the value of the latest read pointer, and the write pointer update confirmation unit 5006 detects update of the value of the write pointer WP, the descriptor acquisition unit 5008 is allowed to perform processing to acquire the new descriptor D3010e to be read, from the ring buffer 1050, after the descriptor D3010c stored in a storage area M55 indicated by the local read pointer RPl3 as the latest read pointer.

<2-3-10> Descriptor Acquisition Completion Notification Unit

The descriptor acquisition completion notification unit 5009 constitutes a transfer control information acquisition completion notification unit that sends a descriptor acquisition completion notification signal as a transfer control information acquisition completion signal when the descriptor acquisition unit 5008 completes acquisition of the descriptor D3010a and inputs the descriptor acquisition completion signal, and the value of the local read pointer RPl1 held by the local read pointer hold unit 5007 is updated.

<2-3-11> Transfer Termination Unit

The transfer termination unit 5011 performs termination processing of data transfer performed between the DMA controller 1030 and the SDXC interface 1070 via the logical channels CH1, CH2 and CH3. For example, the transfer termination unit 5011 performs processing to write a defined value indicating completion of data transfer to one of control registers held by the DMA controller 1030 corresponding to one of the logical channels CH1, CH2 and CH3 via which data transfer to be controlled has been performed, and transfer completion interruption processing with respect to the CPU.

<2-3-12> Descriptor Set Unit

Upon receiving an initiation request signal from the data transfer initiation request reception unit 5012, the descriptor set unit 5010 provides the DMA controller 1030 and the SDXC interface 1070 with settings of data transfer based on information indicated by one of the descriptors D3010 acquired by the descriptor acquisition unit 5008 to cause the DMA controller 1030 to initiate data transfer.

<2-3-13> Data Transfer Initiation Request Reception Unit

Upon receiving the data transfer initiation request signal sent from the DMA controller 1030 or the SDXC interface 1070, the data transfer initiation request reception unit 5012 outputs the initiation request signal to the descriptor set unit 5010.

<2-4> Configuration of Data Transfer Completion Notification Device

Figure 13:
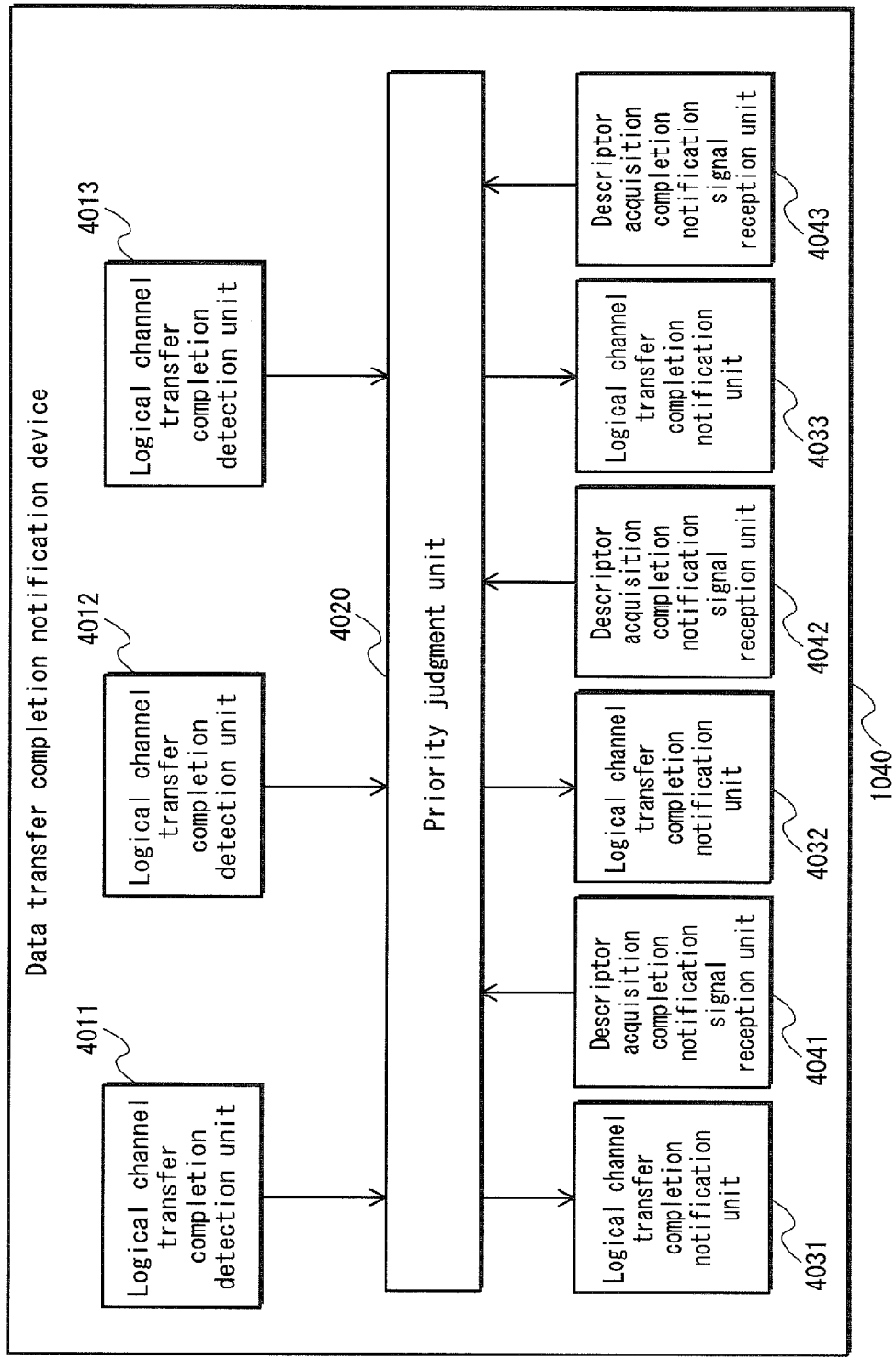
FIG. 13 is a block diagram of a data transfer completion notification device pertaining to Embodiment 1.

As illustrated in FIG. 13, the data transfer completion notification device 1040 is connected to each of the three data transfer control devices 1061, 1062 and 1063 respectively control data transfer performed in parallel via the three logical channels CH1, CH2 and CH3 according to respective descriptors D3010. Upon receiving notification of completion of data transfer from the DMA controller 1030, the data transfer completion notification device 1040 notifies the data transfer control devices 1061, 1062 and 1063 of the completion of data transfer.

As illustrated in FIG. 13, the data transfer completion notification device 1040 includes: three logical channel transfer completion detection units 4011, 4012 and 4013; three logical channel transfer completion notification units 4031, 4032 and 4033; a priority judgment unit 4020; and descriptor acquisition completion notification signal reception units 4041, 4042 and 4043.

Here, the logical channel transfer completion detection unit 4011, the logical channel transfer completion notification unit 4031 and the descriptor acquisition completion notification signal reception unit 4041 relate to control over data transfer performed via the logical channel CH1. The logical channel transfer completion detection unit 4012, the logical channel transfer completion notification unit 4032 and the descriptor acquisition completion notification signal reception unit 4042 relate to control over data transfer performed via the logical channel CH2. The logical channel transfer completion detection unit 4013, the logical channel transfer completion notification unit 4033 and the descriptor acquisition completion notification signal reception unit 4043 relate to control over data transfer performed via the logical channel CH3.

<2-4-1> Logical Channel Transfer Completion Notification Unit

The logical channel transfer completion notification unit 4031 constitutes a transfer completion notification unit that sends, when the logical channel transfer completion detection unit 4011 receives notification of completion of data transfer from the DMA controller 1030, the transfer completion notification signal to the data transfer control device 1061 corresponding to the logical channel transfer completion notification unit 4031. The logical channel transfer completion notification unit 4032 sends, when the logical channel transfer completion detection unit 4012 receives notification of completion of data transfer from the DMA controller 1030, the transfer completion notification signal to the data transfer control device 1062 corresponding to the logical channel transfer completion notification unit 4032. The logical channel transfer completion notification unit 4033 sends, when the logical channel transfer completion detection unit 4013 receives notification of completion of data transfer from the DMA controller 1030, the transfer completion notification signal to the data transfer control device 1063 corresponding to the logical channel transfer completion notification unit 4033.

<2-4-2> Descriptor Acquisition Completion Notification Signal Reception Unit

The descriptor acquisition completion notification signal reception unit 4041 constitutes a transfer control information acquisition completion recognition unit that recognizes completion of acquisition of one of the descriptors D3010 upon receiving the descriptor acquisition completion notification signal from the data transfer control device 1061. The descriptor acquisition completion notification signal reception unit 4042 recognizes completion of acquisition of one of the descriptors D3010 upon receiving the descriptor acquisition completion notification signal from the data transfer control device 1062. The descriptor acquisition completion notification signal reception unit 4043 recognizes completion of acquisition of one of the descriptors D3010 upon receiving the descriptor acquisition completion notification signal from the data transfer control device 1063.

<2-4-3> Logical Channel Transfer Completion Detection Unit

The logical channel transfer completion detection units 4011, 4012 and 4013 each constitute a transfer completion detection unit that detects completion of at least one data transfer operation by receiving, from the DMA controller 1030, at least one of data transfer completion notification signals sent for the logical channels CH1, CH2 and CH3. Upon receiving the data transfer completion notification signal, the logical channel transfer completion detection units 4011, 4012 and 4013 each output the received data transfer completion notification signal to the priority judgment unit 4020.

The logical channel transfer completion detection units 4011, 4012 and 4013 each include a completion result detection subunit (not illustrated) that detects whether the data transfer is normally or abnormally completed, and causes a corresponding one of the logical channel transfer completion notification units 4031, 4032 and 4033 to send a completion result notification signal to a corresponding one of the data transfer control devices 1061, 1062 and 1063.

Here, the completion result detection subunit detects that the data transfer is abnormally completed when a checksum error of transferred data occurs.

<2-4-4> Priority Judgment Unit

When two or more of the three logical channel completion detection units 4011, 4012 and 4013 simultaneously detect completion of data transfer, the priority judgment unit 4020 causes one of the logical channel transfer completion notification units 4031, 4032 and 4033 to send the transfer completion notification signal to one of the data transfer control devices 1061, 1062 and 1063 corresponding to one of the logical channels CH1, CH2 and CH3 having the highest priority.

Here, the priority judgment unit 4020 holds in advance information on priorities set among the logical channels CH1, CH2 and CH3. When data transfer completion notification signals relating to two or more logical channels are simultaneously input to the priority judgment unit 4020, the priority judgment unit 4020 causes only the logical channel transfer completion notification unit 4031 corresponding to the logical channel having the highest priority (e.g. logical channel CH1) to output the transfer completion notification signal in accordance with the information on priorities. The priority judgment unit 4020 confirms whether the data transfer completion detection signal has been input from each of the logical channel transfer completion detection units 4011, 4012 and 4013 in order, beginning with the logical channel CH1 having the highest priority. When confirming that the data transfer completion detection signal has been input, the priority judgment unit 4020 sends the data transfer completion detection signal to a corresponding one of the logical channel transfer completion notification units (e.g. logical channel transfer completion notification unit 4031).

The priority judgment unit 4020 is configured such that, for example, after the data transfer completion notification signal is output to the logical channel transfer completion notification unit 4031, the data transfer completion notification signal is not allowed to be sent to the other logical channel transfer completion notification units 4032 and 4033 unless the descriptor acquisition completion notification signal is received from the descriptor acquisition completion notification signal reception unit 4041.

<3> Operations

The following describes operations of the data transfer control devices and the data transfer completion notification device included in the information processing system pertaining to the present embodiment, which characterize the present embodiment.

<3-1> Overall Operations

Figure 14:
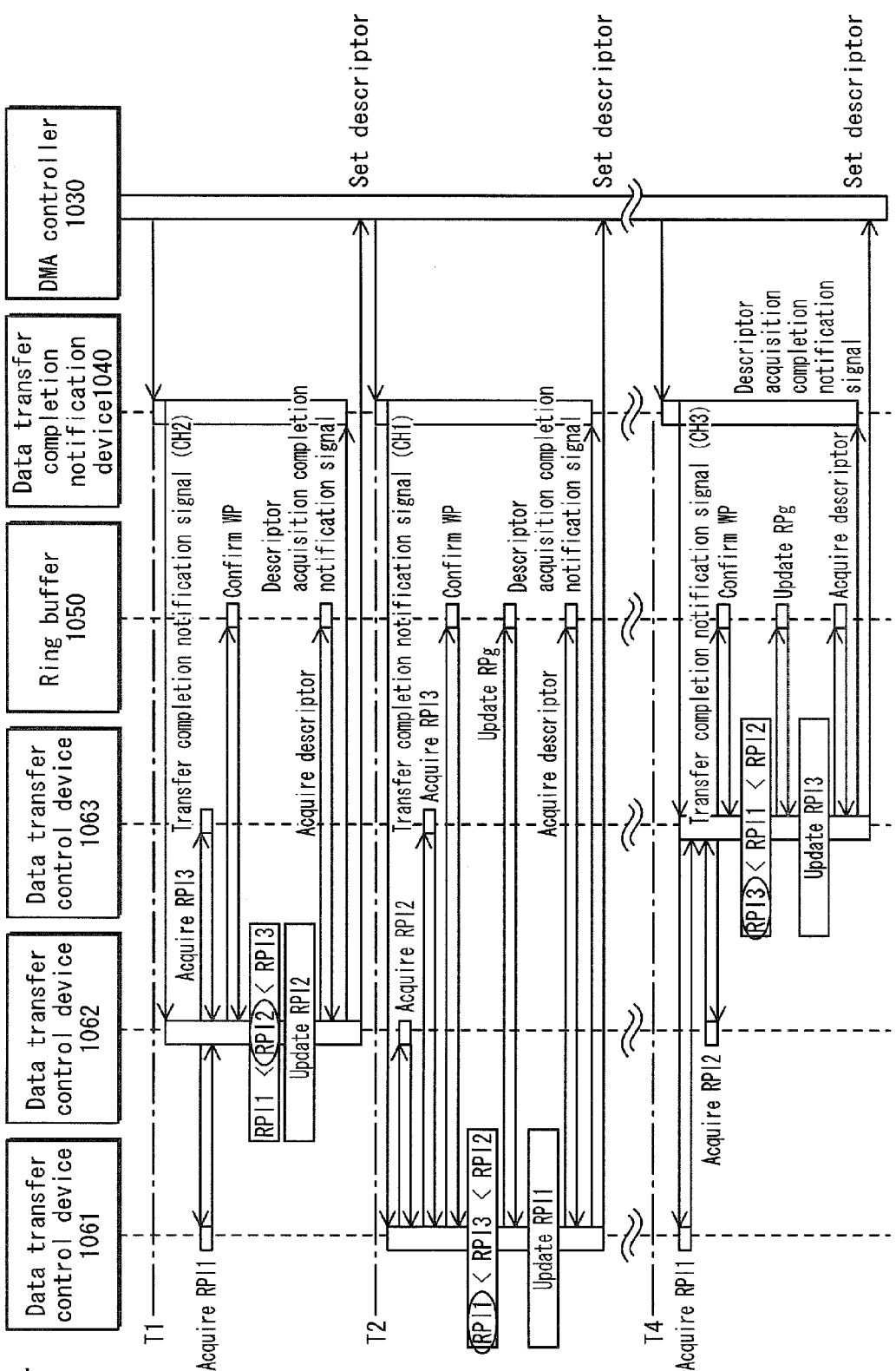
FIG. 14 is a sequence diagram illustrating an operation of the information processing system pertaining to Embodiment 1.
Figure 15:
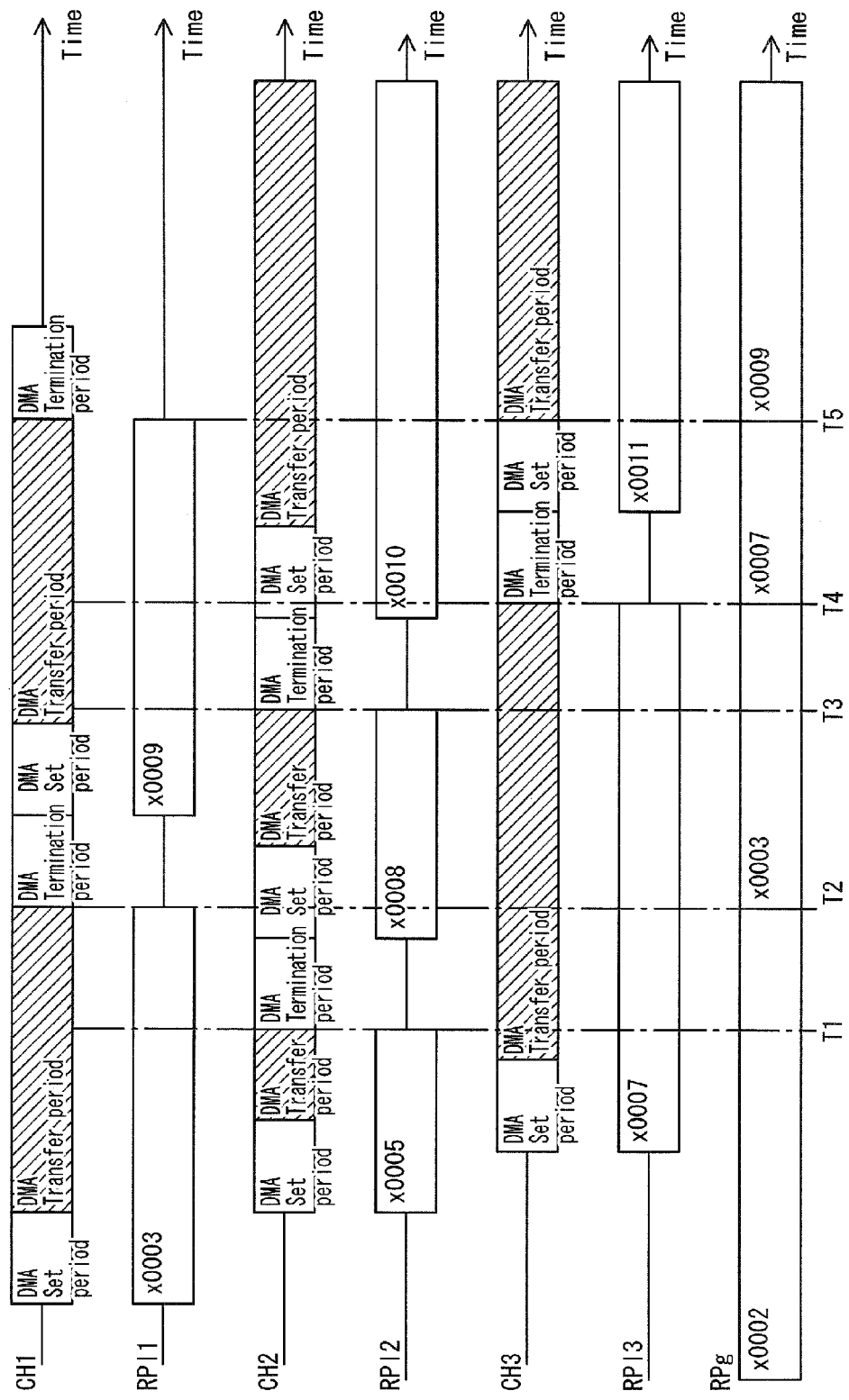
FIG. 15 is a timing diagram illustrating the management information held on the ring buffer pertaining to Embodiment 1.
Figure 16:
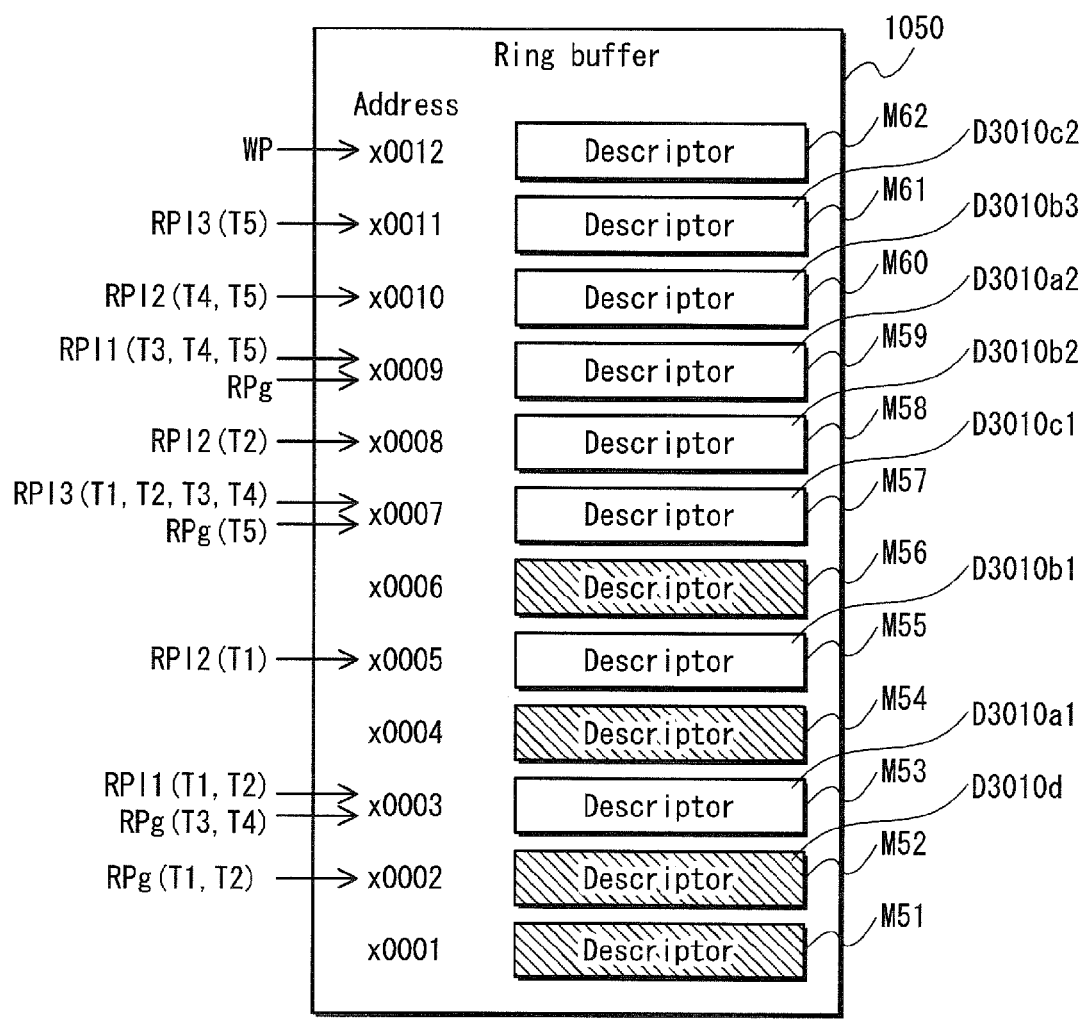
FIG. 16 shows a change of the management information held on the ring buffer pertaining to Embodiment 1.

FIG. 14 is a sequence diagram illustrating operations of the DMA controller 1030, the data transfer completion notification device 1040, the ring buffer 1050 and the three data transfer control devices 1061, 1062 and 1063. FIG. 15 is a timing diagram illustrating temporal changes of a state of each of the channels CH1, CH2 and CH3, the values of the local read pointers RPl1, RPl2 and RPl3 respectively held by the data transfer control devices 1061, 1062 and 1063, and the value of the global read pointer RPg, when the operations are performed according to the sequence diagram of FIG. 14. FIG. 16 illustrates a state of the ring buffer 1050. Descriptions are made below, with reference to FIGS. 14, 15 and 16.

When the DMA controller 1030 notifies the data transfer completion notification device 1040 of completion of data transfer performed via the channel CH2 at a time T1, the data transfer completion notification device 1040 sends the transfer completion notification signal to the data transfer control device 1062.

Upon receiving the transfer completion notification signal, the data transfer control device 1062 acquires the values of the local read pointers RPl1 and RPl3 from the data transfer control devices 1061 and 1063, respectively.

The positional relation determination unit included in the data transfer control device 1062 determines a relation among positions of the descriptors D3010a1, D3010b1 and D3010c1 respectively indicated by the local read pointers RPl1, RPl2 and RPl3 in an order of reading the descriptors D3010a1, D3010b1 and D3010c1. As illustrated in FIGS. 15 and 16, at the time T1, the value of the local read pointer RPl2 is not the smallest of all the values of the local read pointers RPl1, RPl2 and RPl3. Therefore, the read pointer update unit included in the data transfer control device 1062 does not update the value of the global read pointer RPg.

Next, when the positional relation determination unit compares the value of the latest read pointer with the value of the write pointer WP and confirms that the value of the latest read pointer is not equal to the value of the write pointer WP, the latest read pointer extraction unit updates the value of the local read pointer RPl2 held by the local read pointer hold unit with an address "x0008", which is an address next to an address "x0007" indicated by the local read pointer RPl3 as the latest read pointer. The descriptor acquisition unit then performs processing to acquire a descriptor D3010b2 stored in a storage area M58 in accordance with the value indicated by the local read pointer RPl2.

On the other hand, when the positional relation determination unit compares the value of the latest read pointer with the value of the write pointer WP and confirms that the value of the latest read pointer is equal to the value of the write pointer WP, the latest read pointer extraction unit 5005 does not update the value of the local read pointer RPl2 held by the local read pointer hold unit. Therefore, the descriptor acquisition unit does not perform processing to acquire the descriptor. In this case, after update of the value of the write pointer WP is confirmed, the descriptor acquisition unit performs processing to acquire the descriptor.

When the descriptor acquisition unit completes acquisition of the descriptor D3010b2, the descriptor acquisition completion notification unit sends the descriptor acquisition completion notification signal to the data transfer completion notification device 1040.

Next, the descriptor set unit sets the DMA controller 1030 based on the acquired descriptor D3010b2.

When the DMA controller 1030 notifies the data transfer completion notification device 1040 of completion of data transfer performed via the channel CH1 at a time T2, the data transfer completion notification device 1040 sends the transfer completion notification signal to the data transfer control device 1061.

Upon receiving the transfer completion notification signal, the data transfer control device 1061 acquires a value "x0008" of the local read pointer RPl2 and a value "x0007" of the local read pointer RPl3 from the data transfer control devices 1062 and 1063, respectively.

The positional relation determination unit 5003 determines a relation among positions of the descriptors D3010a1, D3010b2 and D3010c1 respectively indicated by the local read pointers RPl1, RPl2 and RPl3 in an order of reading the descriptors D3010a1, D3010b2 and D3010c1. As illustrated in FIGS. 15 and 16, at the time T2, the value of the local read pointer RPl1 is smaller than any values of the local read pointers RPl2 and RPl3. Therefore, the value of the global read pointer RPg is updated with a value "x0003" of the local read pointer RPl1.

Next, when the positional relation determination unit 5003 compares the value of the latest read pointer with the value of the write pointer WP and confirms that the value of the latest read pointer is not equal to the value of the write pointer WP, the latest read pointer extraction unit 5005 updates the value of the local read pointer RPl1 held by the local read pointer hold unit 5007 with an address "x0009", which is an address next to the address "x0008" indicated by the local read pointer RPl2 as the latest read pointer. The descriptor acquisition unit 5008 then performs processing to acquire a descriptor D3010a2 stored in a storage area M59 in accordance with the value indicated by the local read pointer RPl1.

On the other hand, when the positional relation determination unit 5003 compares the value of the latest read pointer with the value of the write pointer WP and confirms that the value of the latest read pointer is equal to the value of the write pointer WP, the latest read pointer extraction unit 5005 does not update the value of the local read pointer RPl1 held by the local read pointer hold unit 5007. Therefore, the descriptor acquisition unit 5008 does not perform processing to acquire the descriptor. In this case, after update of the value of the write pointer WP is confirmed, the descriptor acquisition unit 5008 performs processing to acquire the descriptor.

After the descriptor acquisition unit 5008 completes the acquisition of the descriptor D3010a2, the descriptor acquisition completion notification unit 5009 sends the descriptor acquisition completion notification signal to the data transfer completion notification device 1040.

Next, the descriptor set unit 5010 sets the DMA controller 1030 based on the acquired descriptor D3010a2.

When the DMA controller 1030 notifies the data transfer completion notification device 1040 of completion of data transfer performed via the channel CH3 at a time T4, the data transfer completion notification device 1040 sends the transfer completion notification signal to the data transfer control device 1063.

Upon receiving the transfer completion notification signal, the data transfer control device 1063 acquires a value "x0009" of the local read pointer RPl1 and a value "x0010" of the local read pointer RPl2 respectively from the data transfer control devices 1061 and 1062.

The positional relation determination unit included in the data transfer control device 1063 determines a relation among positions of the descriptors D3010$a$2, D3010$b$3 and D3010$c$1 respectively indicated by the local read pointers RPl1, RPl2 and RPl3 in an order of reading the descriptors D3010$a$2, D3010$b$3 and D3010$c$1. As illustrated in FIGS. 15 and 16, at the time T4, the value of the local read pointer RPl3 is smaller than any values of the local read pointers RPl1 and RPl2. Therefore, the value of the global read pointer RPg is updated with a value "x0007" of the local read pointer RPl3.

Next, when the positional relation determination unit compares the value of the latest read pointer with the value of the write pointer WP and confirms that the value of the latest read pointer is not equal to the value of the write pointer WP, the latest read pointer extraction unit updates the value of the local read pointer RPl3 held by the local read pointer hold unit with an address "x0011", which is an address next to the address "x0010" indicated by the local read pointer RPl2 as the latest read pointer. The descriptor acquisition unit then performs processing to acquire a descriptor D3010$c$2 stored in a storage area M61 in accordance with the value indicated by the local read pointer RPl3.

On the other hand, when the positional relation determination unit compares the value of the latest read pointer with the value of the write pointer WP and confirms that the value of the latest read pointer is equal to the value of the write pointer WP, the latest read pointer extraction unit does not update the value of the local read pointer RPl3 held by the local read pointer hold unit. Therefore, the descriptor acquisition unit does not perform processing to acquire the descriptor. In this case, after update of the value of the write pointer WP is confirmed, the descriptor acquisition unit performs processing to acquire the descriptor.

After the descriptor acquisition unit completes the acquisition of the descriptor D3010$c$2, the descriptor acquisition completion notification unit sends the descriptor acquisition completion notification signal to the data transfer completion notification device 1040.

Next, the descriptor set unit sets the DMA controller 1030 based on the acquired descriptor D3010$c$2.

<3-2> Operation of Data Transfer Control Device

Figure 17:
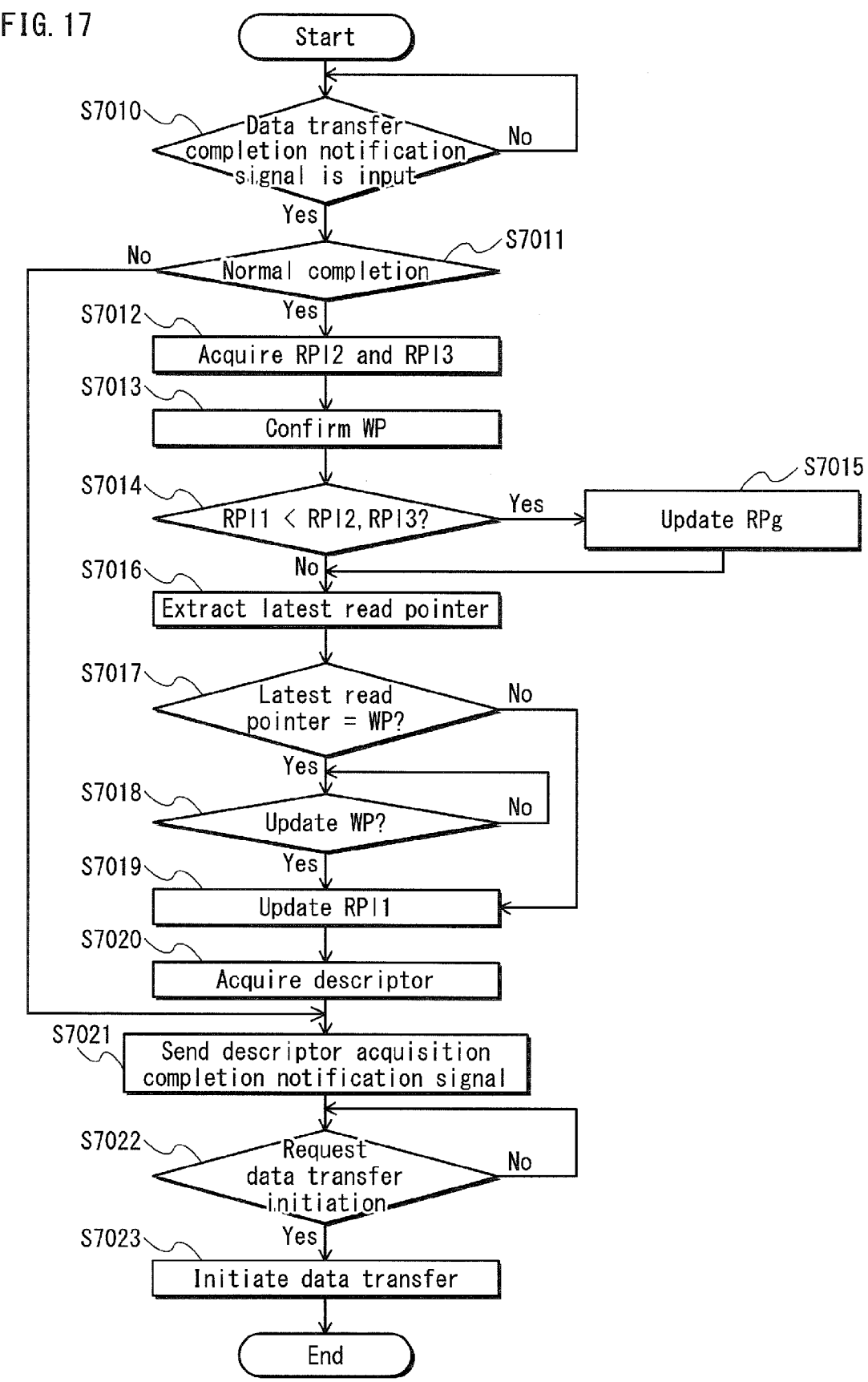
FIG. 17 is a flow chart relating to an operation of the data transfer control device pertaining to Embodiment 1.

The following describes details of an operation of the data transfer control device 1061 pertaining to the present embodiment, with reference to FIG. 17.

First, judgment is made to confirm whether the transfer completion notification signal reception unit 5000 has received the transfer completion notification signal sent from the data transfer completion notification device 1040 (step S7010). When the transfer completion notification signal is judged to have not been input, processing transitions to a stage immediately before the step S7010. On the other hand, when the transfer completion notification signal reception unit 5000 is judged to have received the transfer completion notification signal in the step S7010, processing transitions to a step S7011.

Next, the transfer completion notification signal reception unit 5000 judges whether the transfer completion notification signal includes the normal completion signal or the abnormal completion signal (step S7011). When judging that the abnormal completion signal is included (data transfer is abnormally completed), the transfer completion notification signal reception unit 5000 causes the descriptor acquisition completion notification unit 5009 to send the descriptor acquisition completion notification signal notifying completion of acquisition of one of the descriptors D3010 corresponding to data transfer pertaining to the abnormal completion signal in order to perform the data transfer pertaining to the abnormal completion signal again (step S7021).

On the other hand, when the transfer completion notification signal reception unit 5000 judges that the normal completion signal is included (data transfer is normally completed) in the step S7011, the local read pointer acquisition unit 5001 acquires the values of the local read pointers RPl2 and RPl3 from the other data transfer control devices 1062 and 1063, respectively (step S7012), and the write pointer acquisition unit 5002 confirms the value of the write pointer WP (step S7013).

Here, after the judgment is made to confirm whether data transfer is normally or abnormally completed in the step S7011, the transfer termination unit 5011 performs termination processing of data transfer performed via the corresponding logical channel CH1, according to the results of the judgment.

The positional relation determination unit 5003 then compares differences between the value of the write pointer WP and the values of the local read pointers RPl1, RPl2 and RPl3 to determine whether a position of one of the descriptors D3010 indicated by the local read pointer RPl1 is earlier than positions of the descriptors D3010 indicated by the local read pointers RPl2 and RPl3 (step S7014).

When the positional relation determination unit 5003 determines that the position of the one of the descriptors D3010 indicated by the local read pointer RPl1 is not earlier than the positions of the descriptors D3010 indicated by the local read pointers RPl2 and RPl3 (step S7014: No), processing transitions to a step S7016.

On the other hand, when the positional relation determination unit 5003 determines that the position of the one of the descriptors D3010 indicated by the local read pointer RPl1 is earlier than the positions of the descriptors D3010 indicated by the local read pointers RPl2 and RPl3 (step S7014: Yes), the value of the global read pointer RPg is updated with the value of the local read pointer RPl1 (step S7015), and processing transitions to the step S7016.

In the step S7016, the latest read pointer extraction unit 5005 extracts, as the latest read pointer, one of the local read pointers RPl1, RPl2 and RPl3 indicating an address of a storage area in which one of the descriptors D3010 last read from the ring buffer 1050 has been stored (step S7016).

The positional relation determination unit 5003 then determines whether the value of the write pointer WP is equal to the value of the latest read pointer (the determination here is made also with reference to a state of the overlap flag ORF) (step S7017). When the positional relation determination unit 5003 determines that the value of the write pointer WP is not equal to the value of the latest read pointer (step S7014: No), the latest read pointer extraction unit 5005 notifies the local read pointer hold unit 5007 of an address next to the address indicated by the latest read pointer.

Upon being notified of the address next to the address indicated by the latest read pointer, the local read pointer hold unit 5007 updates the value of the local read pointer RPl1 with the notified address (step S7019).

On the other hand, when the positional relation determination unit 5003 determines that the value of the write pointer WP is equal to the value of the latest read pointer in the step S7017 (step S7017: Yes), the write pointer update confirmation unit 5006 judges whether the value of the write pointer WP is updated (step S7018). When the write pointer update confirmation unit 5006 judges that the value of the write pointer WP is not updated (step S7018: No), processing transitions to a stage before the step S7018.

On the other hand, when the write pointer update confirmation unit 5006 judges that the value of the write pointer WP is updated (step S7018: Yes), the latest read pointer extraction unit 5005 notifies the local read pointer hold unit 5007 of an address next to the address indicated by the latest read pointer.

Upon being notified of the address next to the address indicated by the latest read pointer, the local read pointer hold unit 5007 updates the value of the local read pointer RPl1 with the notified address (step S7019).

The descriptor acquisition unit 5008 newly acquires one of the descriptors D3010 in accordance with the value of the local read pointer RPl1 held by the local read pointer hold unit 5007 (step S7020). The descriptor acquisition completion notification unit 5009 then sends, to the data transfer completion notification device 1040, the descriptor acquisition completion notification signal notifying completion of the acquisition of the one of the descriptors (step S7021).

Next, judgment is made to confirm whether the data transfer initiation request reception unit 5012 has received the data transfer initiation request signal sent from the DMA controller 1030 or the SDXC interface 1070 (step S7022). When the data transfer initiation request signal is judged to have not been received (step S7022: No), processing transitions to a stage immediately before the step S7022.

On the other hand, when the data transfer initiation request reception unit 5012 is judged to have received the data transfer initiation request signal (step S7022: Yes), the descriptor set unit 5010 initiates data transfer performed via the corresponding logical channel CH1 by writing a defined value for initiating DMA transfer to the control registers held by the DMA controller 1030 and the SDXC interface 1070 in accordance with one of the descriptors D3010 acquired by the descriptor acquisition unit 5008. Processing is then resumed from the step S7010.

<3-3> Operation of Data Transfer Completion Notification Device

Figure 18:
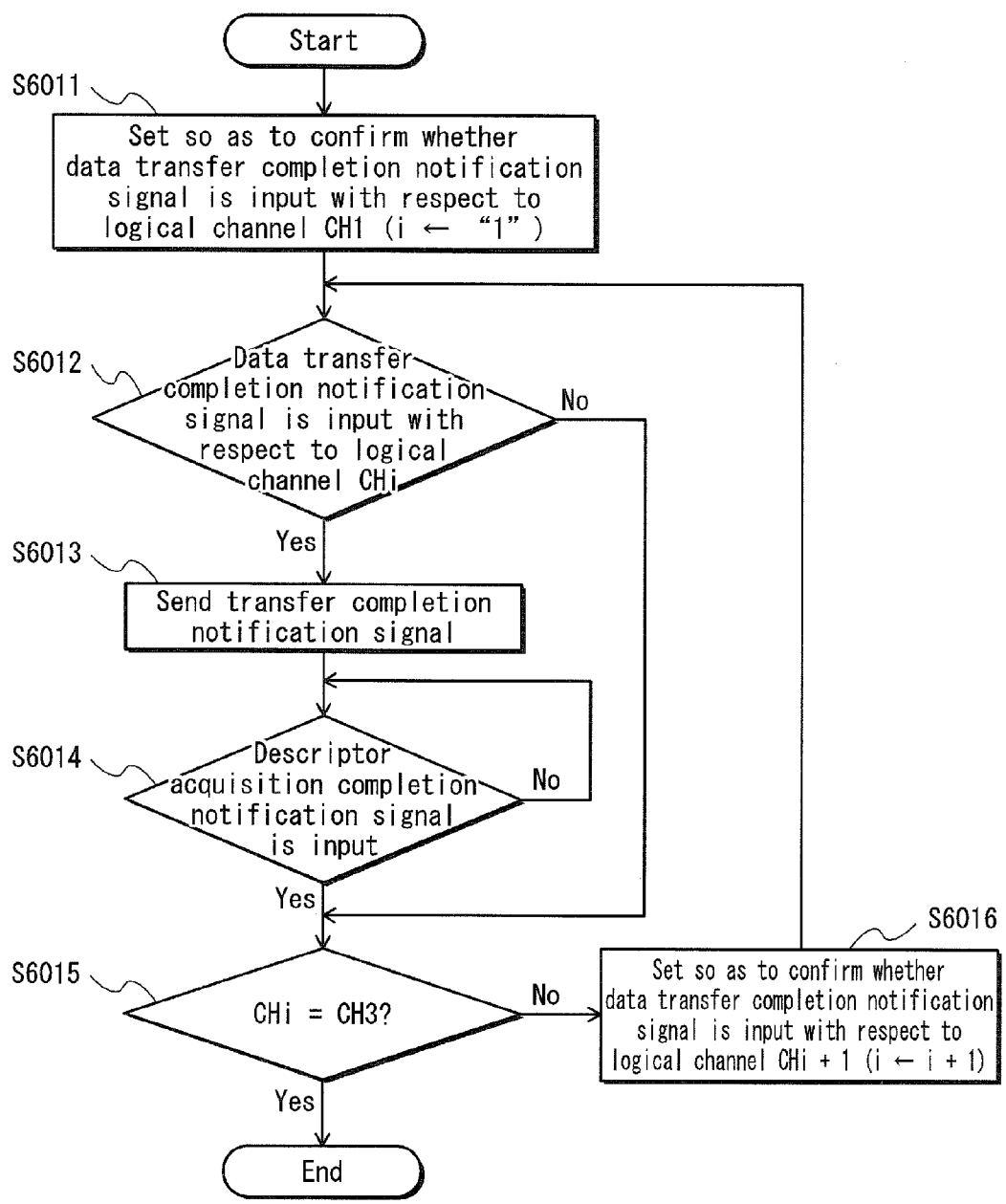
FIG. 18 is a flow chart relating to an operation of the data transfer completion notification device pertaining to Embodiment 1.

The following describes details of an operation of the data transfer completion notification device 1040 pertaining to the present embodiment, with reference to FIG. 18. Here, description is made on the assumption that the logical channel CH1 has the highest priority of all the logical channels CH1, CH2 and CH3, and the logical channel CH2 has higher priority than the logical channel CH3.

First, the priority judgment unit 4020 is set so as to confirm, with respect to the logical channel CH1, whether the data transfer completion notification signal is input (step S6011).

Next, the priority judgment unit 4020 judges whether the data transfer completion detection signal pertaining to the logical channel CH1 is input from the logical channel transfer completion detection unit 4011 (step S6012). When judging that the data transfer completion notification signal is not input from the logical channel transfer completion detection unit 4011 (step S6012: No), the priority judgment unit 4020 judges whether the judgment has been made with respect to the logical channel CH3 having the lowest priority (step S6015).

Since the judgment has been made with respect to the logical channel CH1, the priority judgment unit 4020 judges that the judgment has not been made with respect to the logical channel CH3 having the lowest priority (step S6015: No). The priority judgment unit 4020 is then set so as to confirm, with respect to the logical channel CH2 having the second highest priority after the logical channel CH1, whether the data transfer completion notification signal is input (step S6016). The priority judgment unit 4020 then judges whether the data transfer completion detection signal pertaining to the logical channel CH2 is input (step S6012).

On the other hand, when judging that the data transfer completion detection signal pertaining to the logical channel CH1 is input from the logical channel transfer completion detection unit 4011 in the step S6012 (step S6012: Yes), the priority judgment unit 4020 causes the logical channel transfer completion notification unit 4031 to send the transfer completion notification signal to the data transfer control device 1061 (step S6013).

The priority judgment unit 4020 then judges whether the descriptor acquisition completion notification signal is input from the data transfer control device 1061 via the descriptor acquisition completion notification signal reception unit 4041 (step S6014). When the descriptor acquisition completion notification signal is judged to have not been received (step S6014: No), processing transitions to a stage immediately before the step S6014 again.

On the other hand, when the descriptor acquisition completion notification signal is judged to have been received (step S6014: Yes), the priority judgment unit 4020 judges whether the logical channel corresponding to the descriptor acquisition completion notification signal is the logical channel CH3 having the lowest priority (step S6015). When judging that it is not the logical channel CH3, the priority judgment unit 4020 is set so as to confirm, with respect to the logical channel CH2 having the second highest priority, whether the data transfer completion notification signal is input (step S6016).

Thereafter, the following flow is repeated.

The priority judgment unit 4020 confirms, with respect to the logical channel CH1 (2 or 3), whether the data transfer completion notification signal is input into the logical channel transfer completion detection unit 401*i* (i=2 or 3) (step S6012). When judging that the data transfer completion notification signal is not input from the logical channel transfer completion detection unit 401*i* (step S6012: No), the priority judgment unit 4020 judges whether the logical channel CHi, with respect to which the priority judgment unit 4020 has confirmed whether the data transfer completion notification signal is input, corresponds to the logical channel CH3 having the lowest priority (step S6015). When the logical channel CHi corresponds to the logical channel CH3, processing ends and is then resumed from the step S6011.

On the other hand, when the logical channel CHi does not correspond to the logical channel CH3, the priority judgment unit 4020 is set so as to confirm, with respect to the logical channel CHi+1 having the highest priority after the logical channel CHi, whether the data transfer completion notification signal is input into the logical channel transfer completion detection unit 401 (i+1) (step S6016).

When judging that the data transfer completion detection signal pertaining to the logical channel CH1 is input from the logical channel transfer completion detection unit 4011 in the step S56012 (step S6012: Yes), the priority judgment unit 4020 causes the logical channel transfer completion notification unit 4031 to send the transfer completion notification signal to the data transfer control device 1061 (step S6013).

The priority judgment unit 4020 then judges whether the descriptor acquisition completion notification signal is input from the data transfer control device 1061 via the descriptor acquisition completion notification signal reception unit 4041 (step S6014). When the descriptor acquisition completion notification signal is judged to have not been received (step S6014: No), processing transitions to the stage immediately before the step S6014 again.

On the other hand, when the descriptor acquisition completion notification signal is judged to have been received (step S6014: Yes), the priority judgment unit 4020 judges whether the logical channel CHi, with respect to which the data transfer completion notification signal is input, corresponds to the logical channel CH3 having the lowest priority (step S6015). When judging that the logical channel CHi does not correspond to the logical channel CH3, the priority judgment unit 4020 is set so as to confirm, with respect to the logical channel CHi+1 having the highest priority after the logical channel CHi, whether the data transfer completion notification signal is input (step S6016).

Embodiment 2

The following describes Embodiment 2. Note that operation in Embodiment 2 is similar to that in Embodiment 1. Therefore, description thereof is omitted.

<1> Configuration

Figure 19:
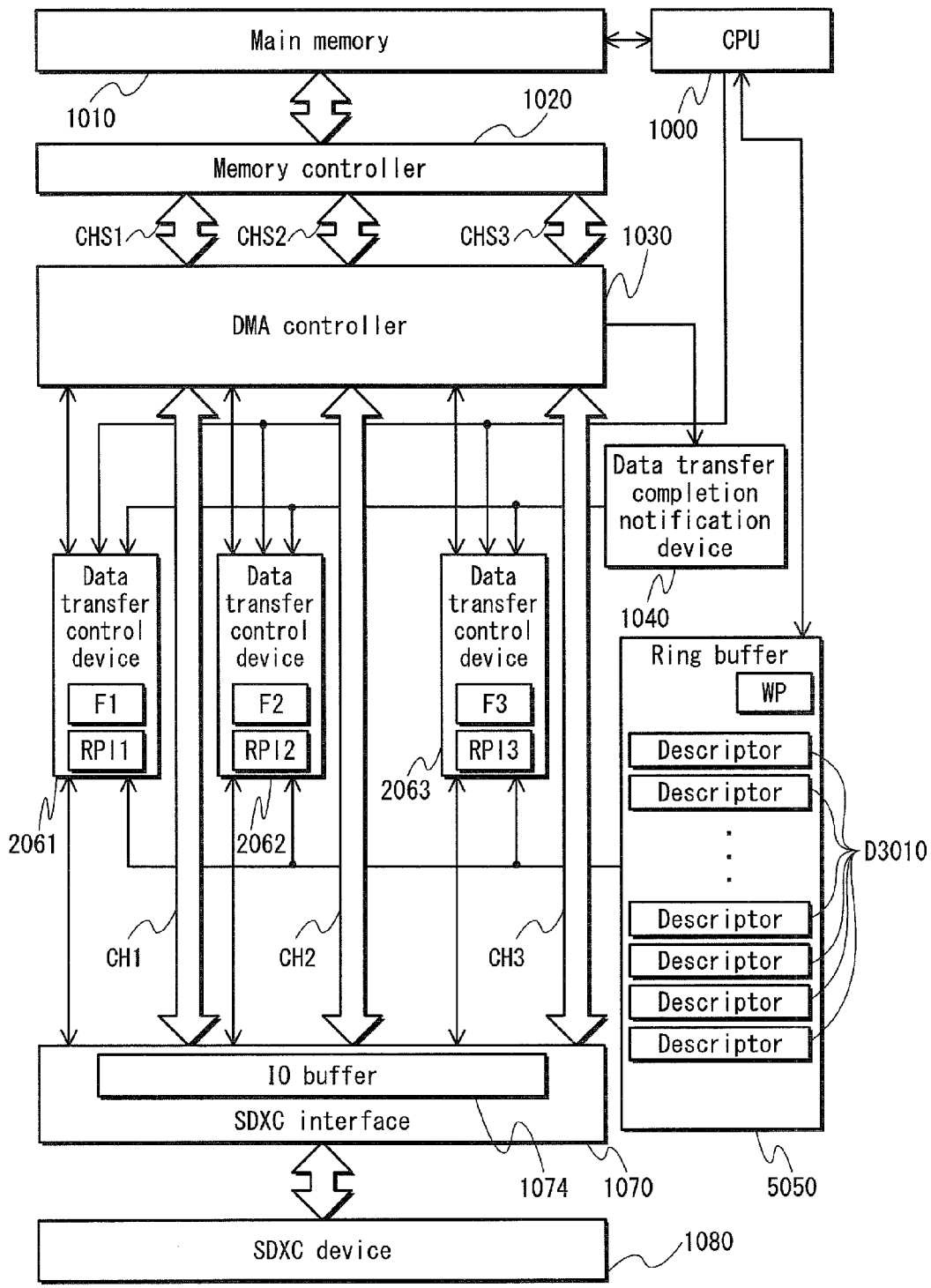
FIG. 19 is a block diagram of an information processing system pertaining to Embodiment 2.
Figure 20:
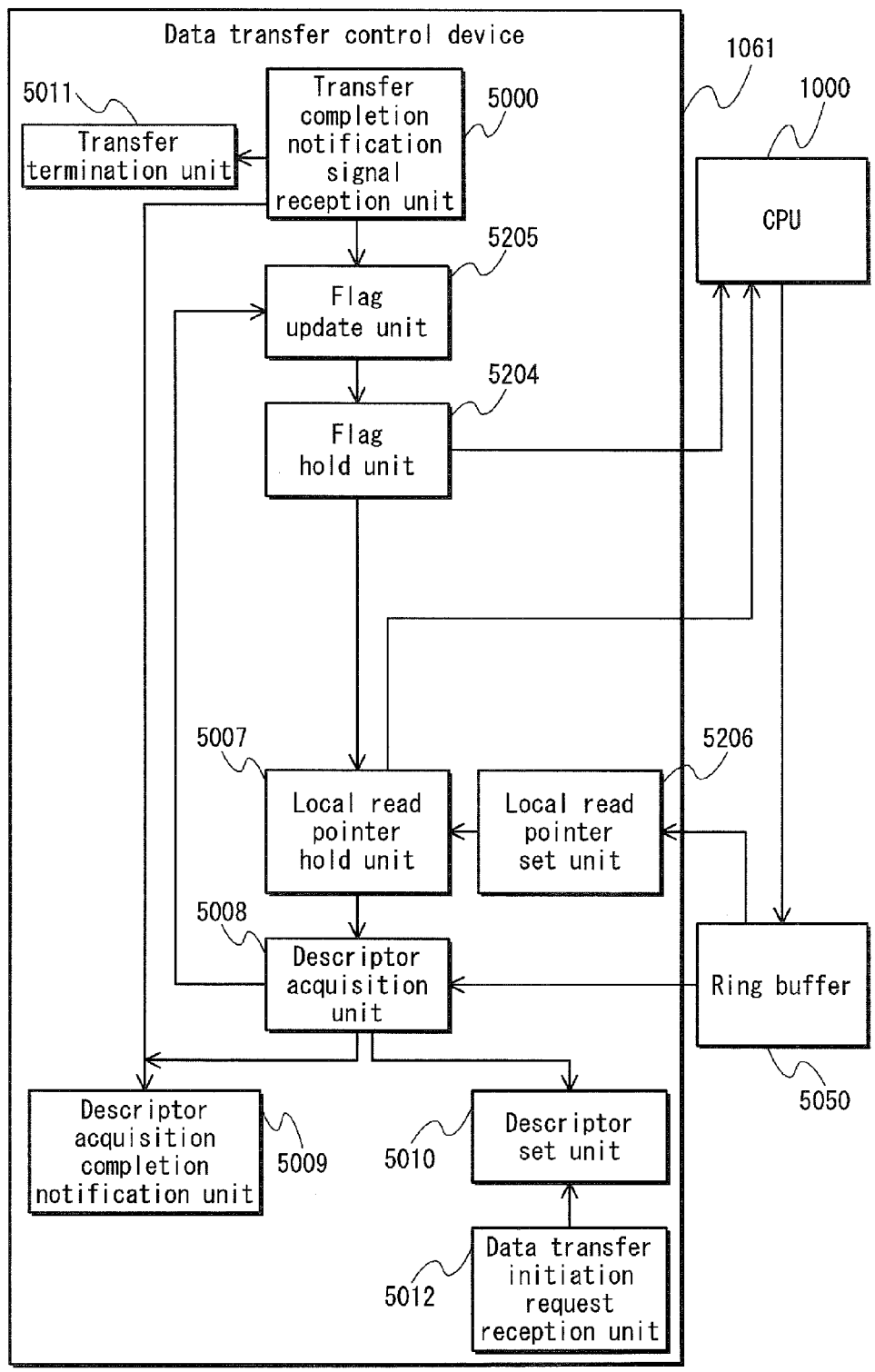
FIG. 20 is a block diagram of a data transfer control device pertaining to Embodiment 2.

FIG. 19 is a block diagram of an information processing system including data transfer control devices 2061, 2062 and 2063 pertaining to the present embodiment. The information processing system has approximately the same configuration as that illustrated in FIG. 2. As illustrated in FIG. 19, the information processing system differs from that illustrated in FIG. 2 in that the data transfer control devices 2061, 2062 and 2063 respectively hold data transfer completion flags F1, F2 and F3, and the ring buffer 5050 does not hold the global read pointer RPg as the management information. Note that components having similar configurations to those illustrated in FIG. 2 are designated by the same reference signs as those illustrated in FIG. 2, and description thereof is omitted.

The CPU 1000 accesses the data transfer control devices 2061, 2062 and 2063 to acquire the values of the local read pointers RPl1, RPl2 and RPl3 and the data transfer completion flags F1, F2 and F3 respectively held by the data transfer control devices 2061, 2062 and 2063. The CPU 1000 judges whether data transfer performed according to the descriptors D3010 stored in storage areas indicated by the local read pointers RPl1, RPl2 and RPl3 held on the ring buffer 5050 is completed, based on the values of the data transfer completion flags F1, F2 and F3.

<1-1> Data Transfer Control Device

The data transfer control device 1061 includes: the descriptor acquisition unit 5008; the local read pointer hold unit 5007; the transfer completion notification signal reception unit 5000; a data transfer completion flag hold unit 5204; a flag update unit 5205; and a local read pointer set unit 5206. Note that the descriptor acquisition unit 5008, the local read pointer hold unit 5007, the transfer completion notification signal reception unit 5000, the local read pointer acquisition unit 5001, the positional relation determination unit 5003, the latest read pointer extraction unit 5005, the write pointer acquisition unit 5002, the write pointer update confirmation unit 5006, the descriptor acquisition completion notification unit 5009, the descriptor set unit 5010 and the data transfer initiation request reception unit 5012 each have a similar configuration to those described in Embodiment 1. Therefore, description thereof is omitted.

The flag hold unit 5204 holds the data transfer completion flag F1. The data transfer completion flag F1 held by the flag hold unit 5204 is referenced by the CPU 1000.

When the transfer completion notification signal reception unit 5000 recognizes that data transfer performed according to one of the descriptors D3010 stored in a storage area indicated by the local read pointer RPl1 is completed, the flag update unit 5205 updates the data transfer completion flag F1.

The local read pointer set unit 5206 acquires an address of a storage area in which one of the descriptors D3010 on the ring buffer 5050 corresponding to data transfer having not been performed is stored, and sets the value of the local read pointer RPl1 to the acquired address.

<2> Operations

The following describes overall operations of the information processing system including the data transfer control devices pertaining to the present embodiment.

Figure 21:
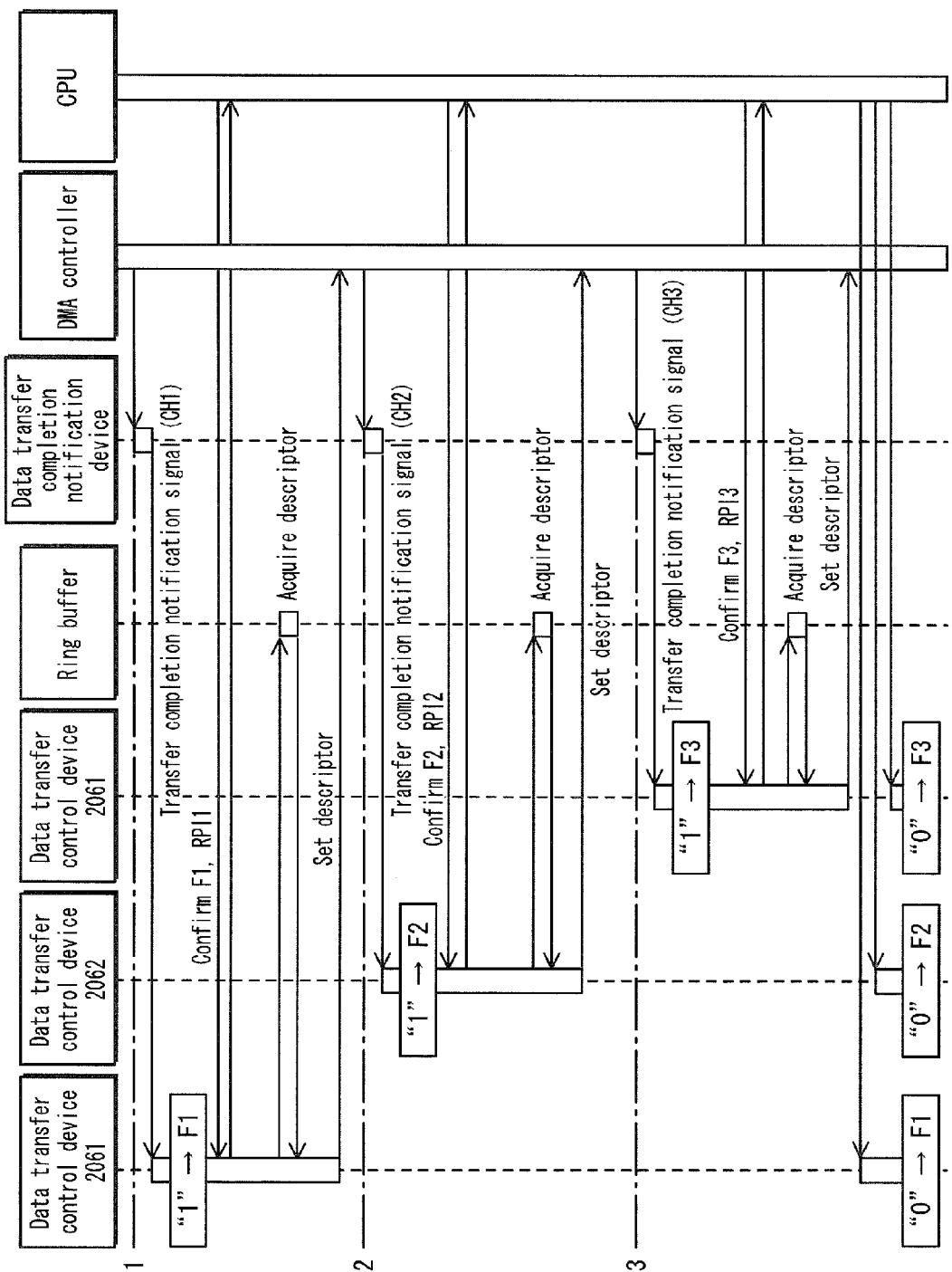
FIG. 21 is a sequence diagram illustrating an operation of the information processing system pertaining to Embodiment 2.

FIG. 21 is a sequence diagram illustrating operations of the CPU 1000, the DMA controller 1030, the data transfer completion notification device 1040, the ring buffer 1050 and the three data transfer control devices 2061, 2062 and 2063. Descriptions are made below, with reference to FIG. 21.

When the DMA controller 1030 notifies the data transfer completion notification device 1040 of completion of data transfer performed via the channel CH1 at a time T21, the data transfer completion notification device 1040 sends the transfer completion notification signal to the data transfer control device 2061.

Upon receiving the transfer completion notification signal, the data transfer control device 2061 sets the value of the data transfer completion flag F1 to "1".

The CPU 1000 acquires the values of the local read pointer RPl1 and the data transfer completion flag F1 from the data transfer control device 2061. The data transfer control device 2061 acquires, from the ring buffer 5050, one of the descriptors D3010 corresponding to data transfer having not been performed.

Then, the DMA controller 1030 is set based on the acquired one of the descriptors D3010.

When the DMA controller 1030 notifies the data transfer completion notification device 1040 of completion of data transfer performed via the channel CH2 at a time T22, the data transfer completion notification device 1040 sends the transfer completion notification signal to the data transfer control device 2062.

Upon receiving the transfer completion notification signal, the data transfer control device 2062 sets the value of the data transfer completion flag F2 to "1".

The CPU 1000 acquires the values of the local read pointer RPl1 and the data transfer completion flag F2 from the data transfer control device 2062. The data transfer control device 2062 acquires, from the ring buffer 5050, one of the descriptors D3010 corresponding to data transfer having not been performed.

Then, the DMA controller 1030 is set based on the acquired one of the descriptors D3010.

When the DMA controller 1030 notifies the data transfer completion notification device 1040 of completion of data transfer performed via the channel CH3 at a time T23, the data transfer completion notification device 1040 sends the transfer completion notification signal to the data transfer control device 2063.

Upon receiving the transfer completion notification signal, the data transfer control device 2063 sets the value of the data transfer completion flag F3 to "1".

The CPU 1000 acquires the values of the local read pointer RPl1 and the data transfer completion flag F1 from the data transfer control device 2063. The data transfer control device 2061 acquires, from the ring buffer 5050, one of the descriptors D3010 corresponding to data transfer having not been performed.

Then, the DMA controller 1030 is set based on the acquired one of the descriptors D3010.

When recognizing, based on the values of the data transfer completion flags F1, F2 and F3 and the local read pointers RPl1 RPl2 and RPl3, that necessary data transfer is completed, the CPU 1000 starts processing using a plurality of transferred data pieces. In this case, the CPU 1000 returns each of the values of the data transfer completion flags F1, F2 and F3 to "0".

Figure 22:
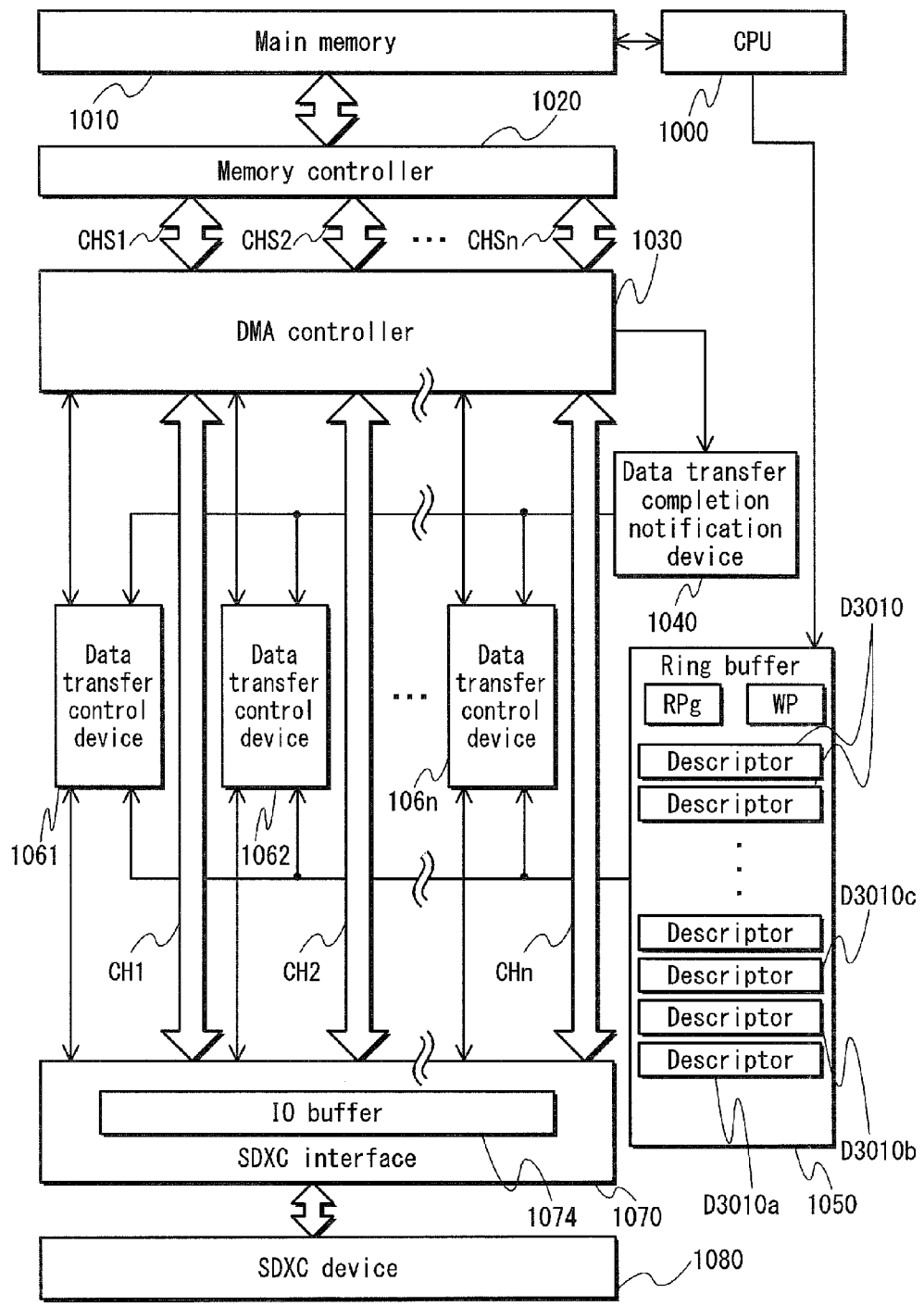
FIG. 22 is a block diagram of an information processing system pertaining to a modification.

Modifications (1) In Embodiment 1, description has been made by giving an example in which the DMA controller 1030 and the SDXC interface 1070 are connected with each other by the three logical channels CH1, CH2 and CH3, and the three data transfer control devices 1061, 1062 and 1063 are respectively provided for the logical channels CH1, CH2 and CH3. This, however, is one example. As illustrated in FIG. 22, for example, the DMA controller 1030 and the SDXC interface 1070 may be connected with each other by four or more logical channels CH1, CH2, . . . , CHn, and four or more data transfer control devices 1061, 1062, . . . , 106*n* may respectively be provided for the logical channels CH1, CH2, . . . , CHn. Also, the DMA controller 1030 and the SDXC interface 1070 may be connected with each other by two logical channels (not illustrated), and two data transfer control devices (not illustrated) may be provided for the two logical channels.

Figure 23:
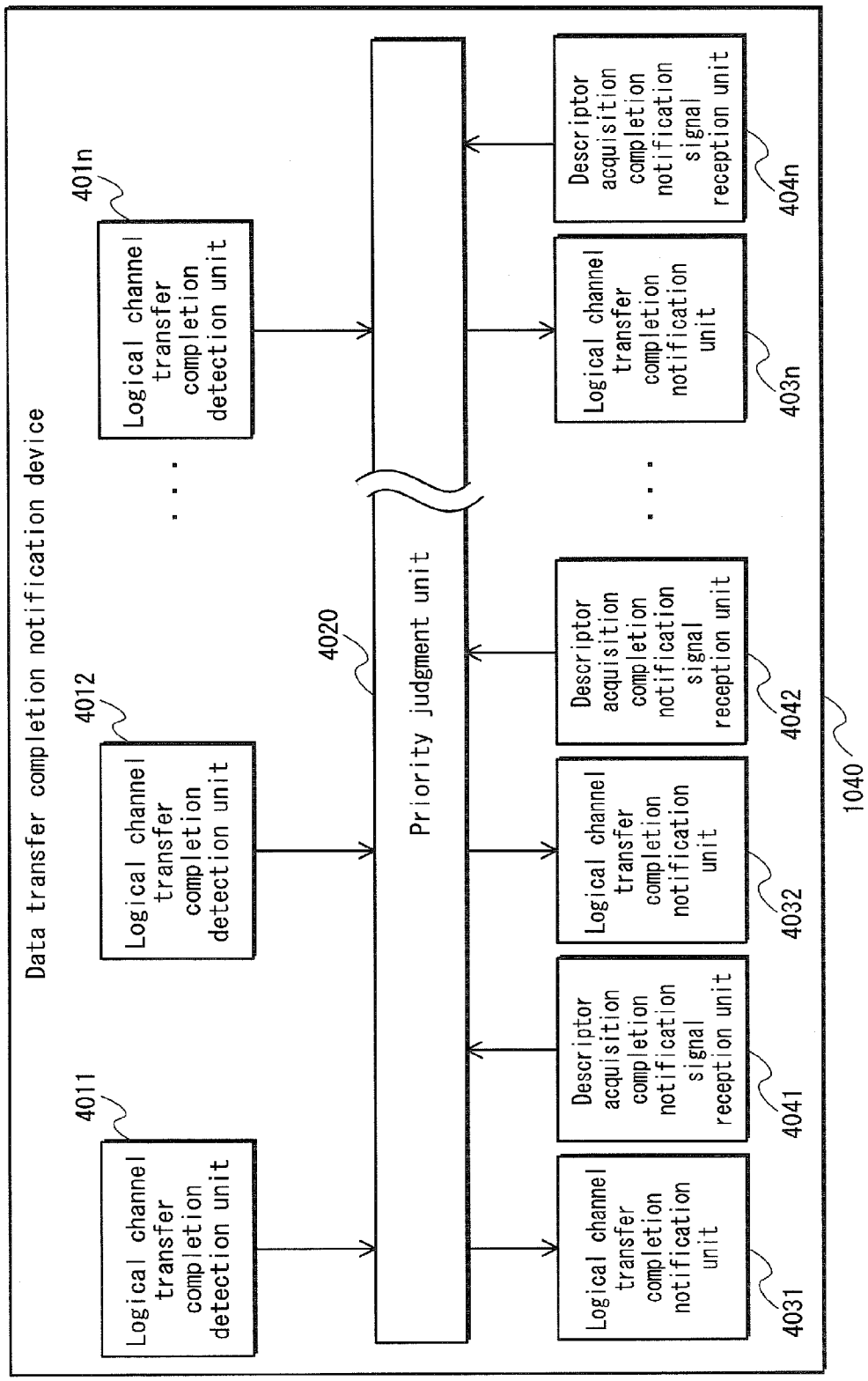
FIG. 23 is a block diagram of a data transfer completion notification device pertaining to a modification.

(2) In Embodiments 1 and 2, description has been made by giving an example in which the data transfer completion notification device 1040 is connected to each of a plurality of data transfer control devices controlling data transfer performed in parallel via the three logical channels CH1, CH2 and CH3 according to respective transfer control information pieces, and the DMA controller 1030 notifies any of the data transfer control devices 1061, 1062 and 1063*n* of completion of data transfer controlled by the any of the data transfer control devices 1061, 1062 and 1063. This, however, is one example. As illustrated in FIG. 23, for example, the DMA controller 1030 and the SDXC interface 1070 may be connected with each other by the three logical channels CH1, CH2 and CH3, the data transfer completion notification device 1040 may be connected to each of four or more data transfer control devices, and the DMA controller 1030 may notify any of the data transfer control devices 1061, 1062, . . . , 106*n* of completion of data transfer controlled by the any of the data transfer control devices 1061, 1062, . . . , 106*n*. Also, the DMA controller 1030 and the SDXC interface 1070 may be connected with each other by two logical channels (not illustrated), the data transfer completion notification device 1040 may be connected to each of two data transfer control devices (not illustrated), and the DMA controller 1030 may notify any of the two data transfer control devices of completion of data transfer controlled by the any of the data transfer control devices.

Figure 24:
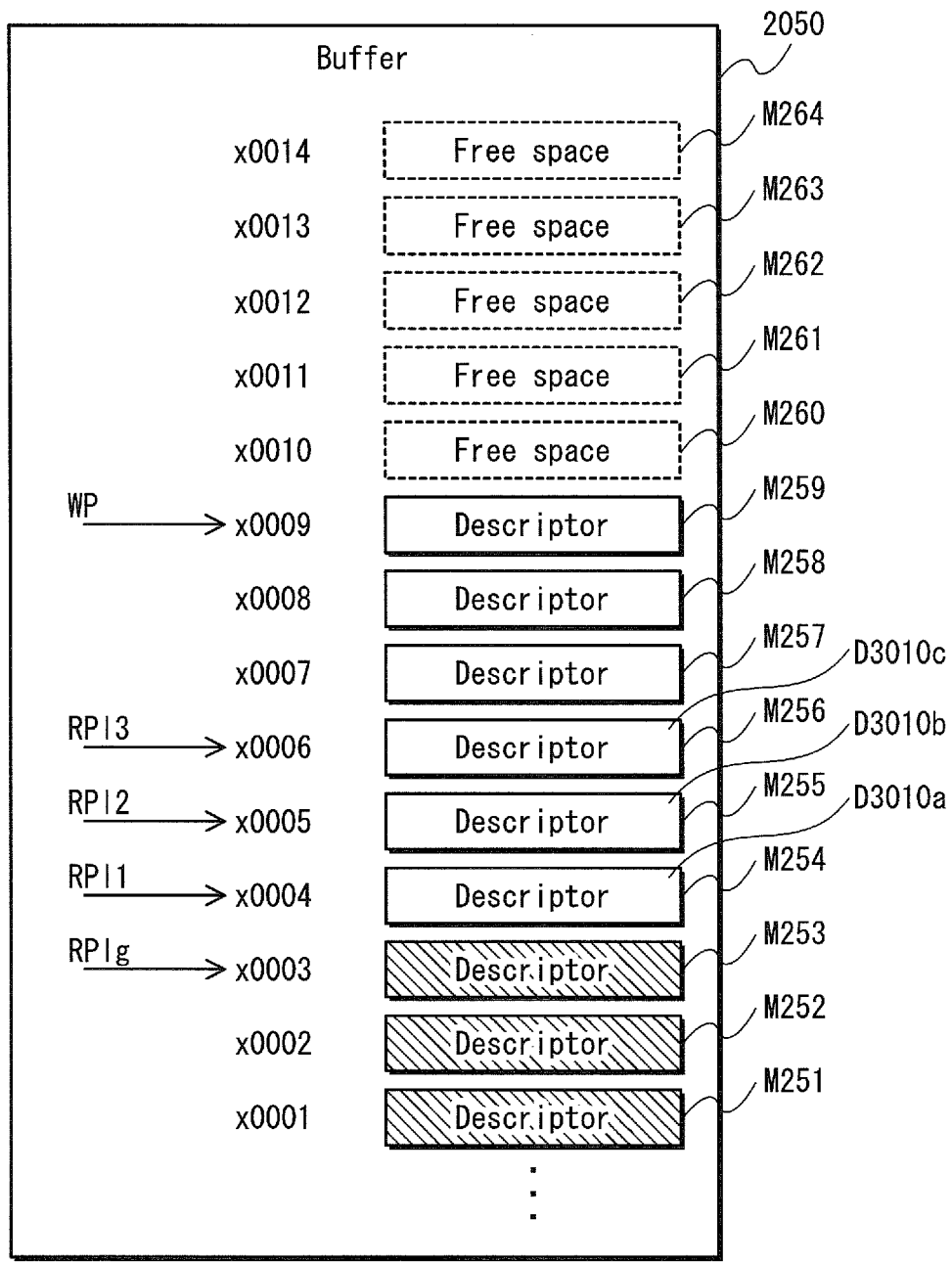
FIG. 24 is a block diagram of a buffer pertaining to a modification.

(3) In Embodiment 1, description has been made by giving an example in which the transfer control information management device includes the ring buffer 1050. This, however, is one example. As illustrated in FIG. 24, for example, the transfer control information management device may include a buffer 2050 composed of a plurality of storage areas M251, M252, . . . , M264, . . . having consecutive addresses (x0001, x0002, . . . , x0014, . . . ).

In the present modification, when the value of the local read pointer RPl1 is smaller than each of the values of the local read pointers RPl2 and RPl3, the positional relation determination unit 5003 determines that the position of the descriptor D3010*a* indicated by the local read pointer RPl1 is earlier than the positions of the descriptors D3010*b* and D3010*c* respectively indicated by the local read pointers RPl2 and RPl3.

According to the present modification, the positional relation determination unit 5003 determines a relation among positions of one of the descriptors D3010 indicated by the local read pointer RPl1, another one of the descriptors D3010 indicated by the local read pointer RPl2 and yet another one of the descriptors D3010 indicated by the local read pointer RPl3 in an order of reading the descriptors D3010 based only on the values of the local read pointers RPl1, RPl2 and RPl3.

In a case where the values of the local read pointers RPl1, RPl2 and RPl3 are incremented, when the values of the local read pointers RPl2 and RPl3 are each larger than the value of the local read pointer RPl1, the position of the one of the descriptors D3010 indicated by the local read pointer RPl1 is determined to be earlier than the positions of the descriptors D3010*b* and D3010*c* respectively indicated by the local read pointers RPl2 and RPl3.

In a case where the values of the local read pointers RPl1, RPl2 and RPl3 are decremented, when the values of the local read pointers RPl2 and RPl3 are each smaller than the value of the local read pointer RPl1, the position of the descriptor D3010*a* indicated by the local read pointer RPl1 is determined to be earlier than the positions of the descriptors D3010*b* and D3010*c* respectively indicated by the local read pointers RPl2 and RPl3.

That is to say, according to the present modification, the positional relation determination unit 5003 does not have to take the value of the write pointer WP into account to determine a relation among the positions of the descriptors D3010*a*, D3010*b* and D3010*c* respectively indicated by the local read pointers RPl1, RPl2 and RPl3 in the order of reading the descriptors D3010*a*, D3010*b* and D3010*c*.

In the present modification, description has been made by giving an example in which the buffer 2050 composed of the storage areas M251, M252 and so on having consecutive addresses is used as the transfer control information management device. This, however, is one example. The storage areas M251, M252 and so on may have inconsecutive addresses. In the present modification, each of the data transfer control devices 1061, 1062 and 1063 may include a buffer information storage unit storing therein buffer information such as a starting address and a size of the buffer 2050.

Furthermore, in the present modification, the storage areas M251, M252 and so on constituting the buffer 2050 may include one or more storage areas having inconsecutive addresses. For example, if addresses of the storage areas M251 and M252 are inconsecutive, the management information may include an address pointer having a function of indicating a location to which the write pointer WP moves when one of the descriptors D3010 is queued in the storage area M251.

(4) In Embodiment 1, description has been made by giving an example in which the descriptor acquisition unit 5008 performs processing to acquire the descriptor D3010*a* stored in a storage area indicated by the local read pointer RPl1 held on the ring buffer 1050 in accordance with the value of the local read pointer RPl1 held by the local read pointer hold unit 5007 (see FIG. 7). This, however, is one example. For example, when the descriptor acquisition unit 5008 completes acquisition of the descriptor D3010*a*, the value of the local read pointer RPl1 may be updated with an address of a storage area in which the acquired one of descriptors D3010 is stored.

In this case, the descriptor acquisition unit 5008 has only to specify the storage area included in the ring buffer 2050 in which one of the descriptors D3010 to be acquired is stored based on the value of the write pointer WP acquired by the write pointer acquisition unit 5002 and the value of the latest read pointer extracted by the latest read pointer extraction unit 5005.

(4) In Embodiment 1, description has been made by giving an example in which the latest read pointer extraction unit 5005 compares the values of the local read pointers RPl1, RPl2 and RPl3 to extract one of the local read pointers RPl1, RPl2 and RPl3 indicating a value whose difference from the value of the write pointer WP is the smallest as the latest read pointer, and, when the positional relation determination unit 5003 determines that the value of the write pointer WP is equal the value of the latest read pointer, the descriptor acquisition unit 5008 does not perform processing to newly acquire one of the descriptors D3010. This, however, is one example. For example, a threshold comparison unit (not illustrated) comparing a predetermined threshold with the value of the latest read pointer may be included, and, when the threshold comparison unit determines that the predetermined threshold is equal to the value of the latest read pointer, processing to newly acquire one of the descriptors D3010 to be read after another one of the descriptors D3010 indicated by the latest read pointer may not be performed.

In the present modification, the predetermined threshold may differ among the data transfer control devices 1061, 1062 and 1063 or may be common to all the data transfer control devices 1061, 1062 and 1063.

In the present modification, the predetermined threshold may be obtained by adding a predetermined constant value to the value of the global read pointer RPg.

Furthermore, in the present modification, the predetermined threshold may be obtained by subtracting a predetermined constant value from the value of the write pointer WP.

In the present modification, a storage request unit (not illustrated) notifying, when the threshold comparison unit detects that the value of the latest read pointer is equal to the predetermined threshold, the CPU 1000 that the value of the latest read pointer is equal to the predetermined threshold to request storage of the descriptors D3010 in the ring buffer 1050 may be included.

(5) In Embodiments 1 and 2, description has been made by giving an example in which the SDXC interface 1070 is used as the high-speed IO interface. This, however, is one example. The high-speed IO interface may be another IO interface such as USB and SATA.

(6) In Embodiments 1 and 2, description has been made by giving an example in which the plurality of data transfer control devices 1061, 1062 and 1063 control data transfer performed between the main memory 1010 and the IO buffer 1074 included in the SDXC interface 1070. This, however, is one example. The data transfer control devices 1061, 1062 and 1063 may control data transfer performed between two general storage areas (e.g. DRAM and SRAM).

(7) In Embodiments 1 and 2, description has been made by giving an example in which a plurality of data transfer operations are performed in parallel between the main memory 1010 and the IO buffer 1074 included in the SDXC interface 1070 via the plurality of logical channels CH1, CH2 and CH3. This, however, is one example. For example, a plurality of data transfer operations may be performed in parallel via a plurality of physical channels (not illustrated).

(8) In Embodiments 1 and 2, description has been made by giving an example in which each of the descriptors D3010 is composed of the transfer source address, the transfer destination address and the size of data to be transferred. Components of each of the descriptors D3010 are not limited to the transfer source address, the transfer destination address and the size of data to be transferred. For example, each of the descriptors D3010 may include no transfer source address.

(9) In Embodiments 1 and 2, each of the descriptors D3010 may further include information for specifying whether or not to perform intermittent transfer, and, in the case of performing the intermittent transfer, transfer mode information composed of information about a size of the data to be transferred per transfer, information for specifying whether or not to perform DMA transfer using the logical channel and the like.

(10) In Embodiments 1 and 2, description has been made by giving an example in which each of the descriptors D3010 is composed of the transfer source address, the transfer destination address and the size of data to be transferred. This, however, is one example. Each of the descriptors D3010 may be composed of a type of an IO command issued to the SDXC device 1080 and an argument for the command.

(11) In Embodiments 1 and 2, description has been made by giving an example in which the ring buffers 1050 and 5050 are each embodied by a memory. This, however, is one example. For example, the ring buffer 1050 may include a register file. Furthermore, in Embodiment 1, description has been made by giving an example in which the ring buffers 1050 and 5050 each store therein 12 descriptors D3010. This, however, is one example. The ring buffers 1050 and 5050 each may store therein 13 or more, or 11 or less descriptors D3010.

(12) In Embodiments 1 and 2, description has been made by giving an example in which the CPU 1000 stores the descriptors D3010 in each of the ring buffers 1050 and 5050. This, however, is one example. For example, the CPU 1000 may first store the descriptors D3010 in a predetermined buffer (not illustrated) other than the ring buffers 1050 and 5050, and may include a dedicated module (not illustrated) that transfers the descriptors D3010 stored in the predetermined buffer to the ring buffers 1050 and 5050.

(13) In Embodiment 1, description has been made by giving an example in which the write pointer WP, the global read pointer RPg and the local read pointers RPl1 and RPl2 are incremented. This, however, is one example. For example, the write pointer WP, the global read pointer RPg and the local read pointers RPl1, RPl2 and RPl3 may be decremented.

(14) In Embodiment 1, description has been made by giving an example in which the DMA controller 1030 includes a checksum computation unit (not illustrated) computing a checksum of transferred data for each of the logical channels CH1, CH2 and CH3, and, when the result of computation performed by the checksum computation unit does not match a checksum expectation value included in the transferred data (when a checksum error occurs), the abnormal completion notification signal is included in a data transfer completion signal. This, however, is one example. For example, the DMA controller 1030 may include a hash value computation unit (not illustrated) computing a hash value of the transferred data, and, when the result of the computation performed by the hash value computation unit does not match an expectation value of the hash value of the transferred data, the abnormal completion notification signal may be included in the data transfer completion signal.

Alternatively, a timer (not illustrated) counting time for data transfer may be provided for each of the data transfer control devices 1061, 1062 and 1063, and, when data transfer is not completed within a predetermined time period, the transfer completion notification signal reception unit 5000 may recognize that the data transfer is abnormally completed due to a timeout error.

(15) In Embodiments 1 and 2, description has been made by giving an example in which priorities are set in advance among the logical channels CH1, CH2 and CH3. This, however, is one example. For example, a register and the like for setting priorities among the logical channels CH1, CH2 and CH3 may be provided, and the CPU 1000 may update the register in accordance with a given timing.

(16) In Embodiments 1 and 2, description has been made by giving an example in which the data transfer completion notification device 1040 includes the logical channel transfer completion detection units 4011, 4012 and 4013 respectively corresponding to the logical channels CH1, CH2 and CH3, and the transfer completion notification signal is received for each of the logical channels CH1, CH2 and CH3. This, however, is one example. For example, the data transfer completion notification device 1040 may include a single logical channel transfer completion detection unit (not illustrated) that confirms whether data transfer is completed or is being performed for each of the logical channels CH1, CH2 and CH3 in order using a polling method.

(17) In Embodiments 1 and 2, description has been made by giving an example in which the transfer termination unit 5011 clears interrupt from each of the logical channels CH1, CH2 and CH3. This, however, is one example. For example, the transfer termination unit 5011 may notify the corresponding one of the logical channels CH1, CH2 and CH3 that completion of data transfer is confirmed.

(18) In Embodiment 1, description has been made by giving an example in which the descriptor acquisition unit 5008 does not perform processing to newly acquire one of the descriptors D3010 when the value of the latest read pointer is equal to the value of the write pointer WP. Furthermore, a storage request unit (not illustrated) notifying the CPU 1000 that the value of the latest read pointer is equal to the value of the write pointer WP to request storage of the descriptors D3010 in the ring buffer 1050 may be included.

This can shorten the latency occurring when the CPU 1000 stores the descriptors D3010 in the ring buffer 1050. Therefore, processing efficiency of the overall information processing system can be improved.

(19) Embodiment 1 described above may be embodied as an LSI produced by integrating the SDXC interface 1070, the main memory 1010, the DMA controller 1030, the memory controller 1020, the three data transfer control devices 1061, 1062 and 1063, the data transfer completion notification device 1040 and the ring buffer 1050 into a single semiconductor integrated circuit. Alternatively, the three data transfer control devices 1061, 1062 and 1063, and the data transfer completion notification device 1040 may be separately embodied by an LSI.

Figure 25:
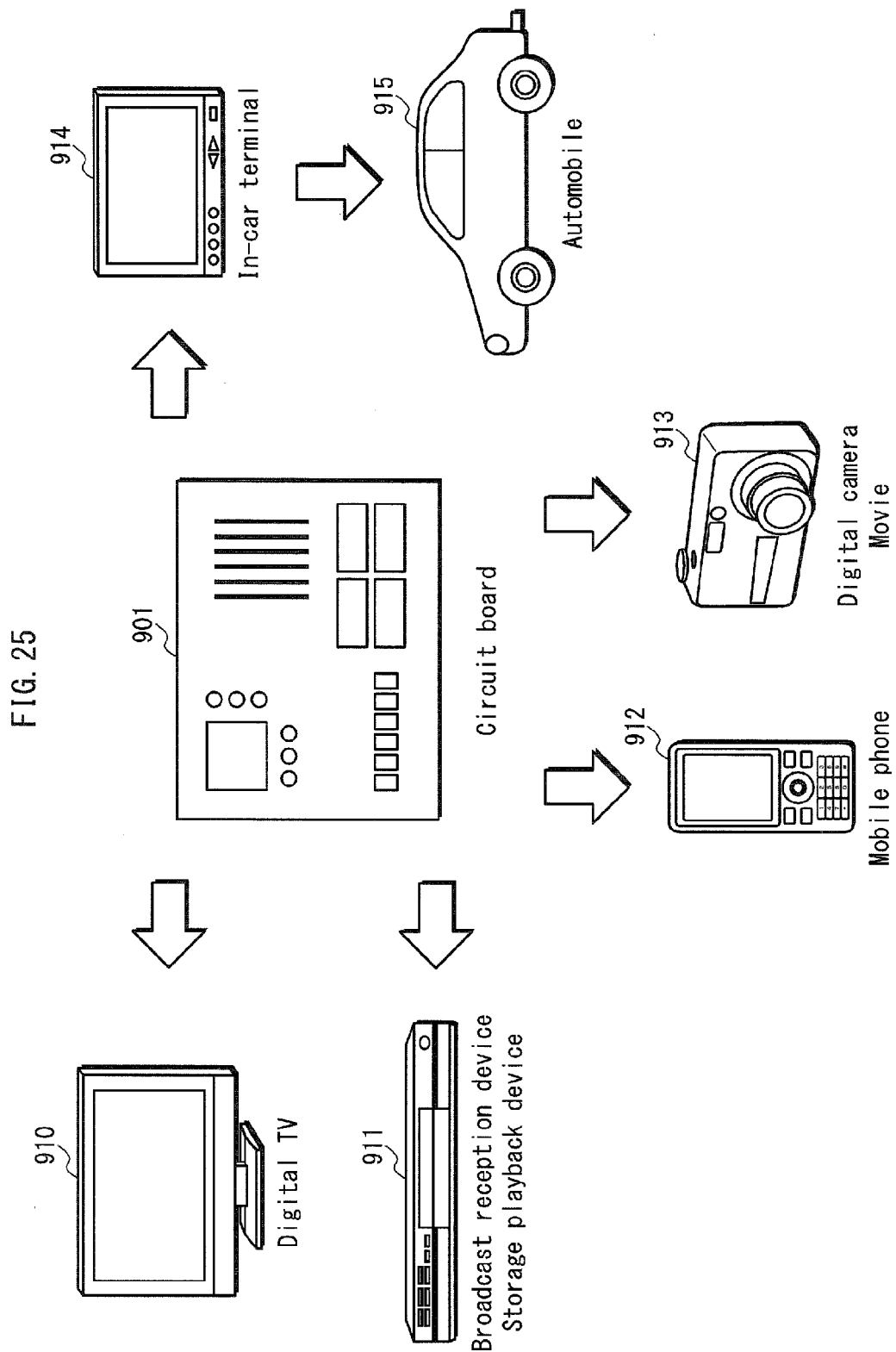
FIG. 25 is a conceptual diagram of an example in which an LSI pertaining to a modification is adapted to set products.
Figure 26:
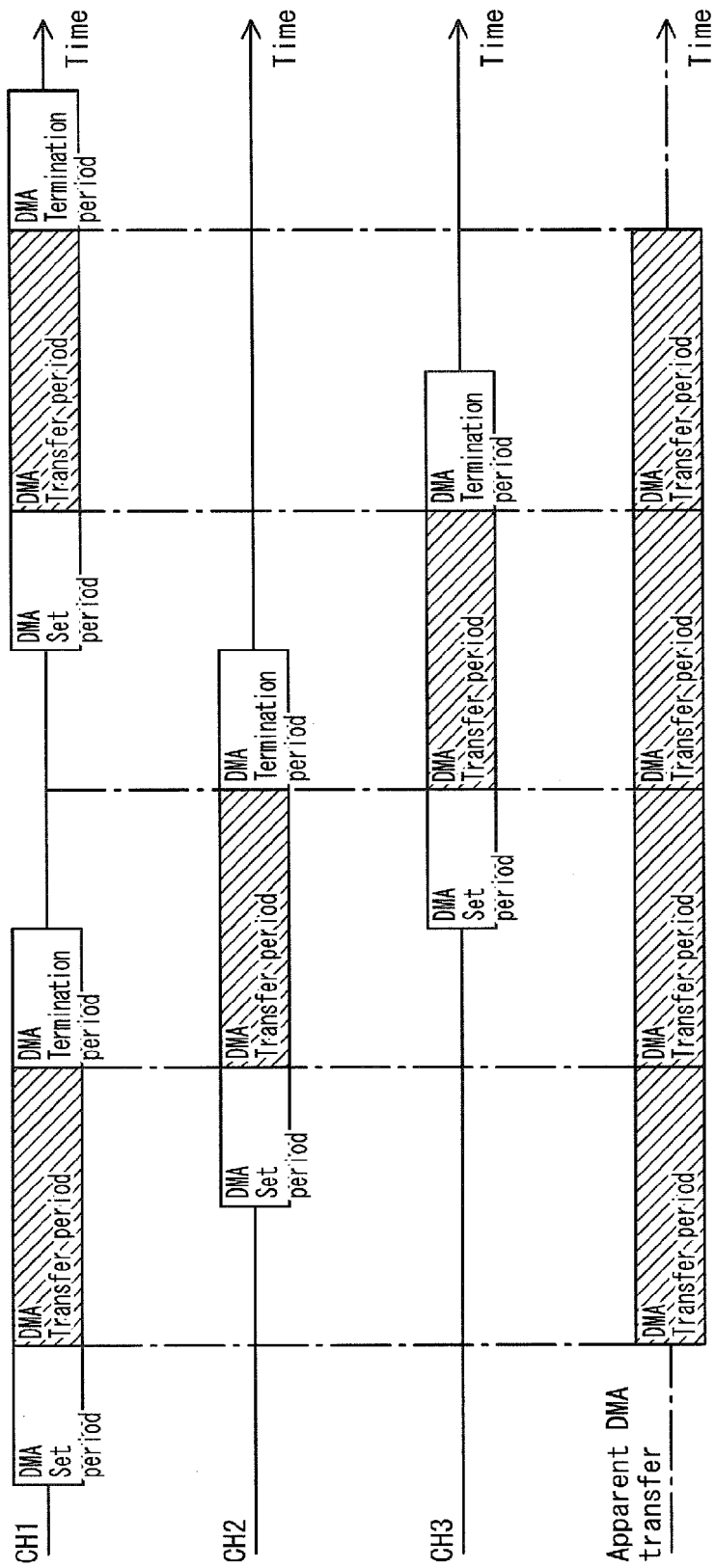
FIG. 26 is a timing diagram illustrating an example of conventional DMA transfer.
Figure 27:
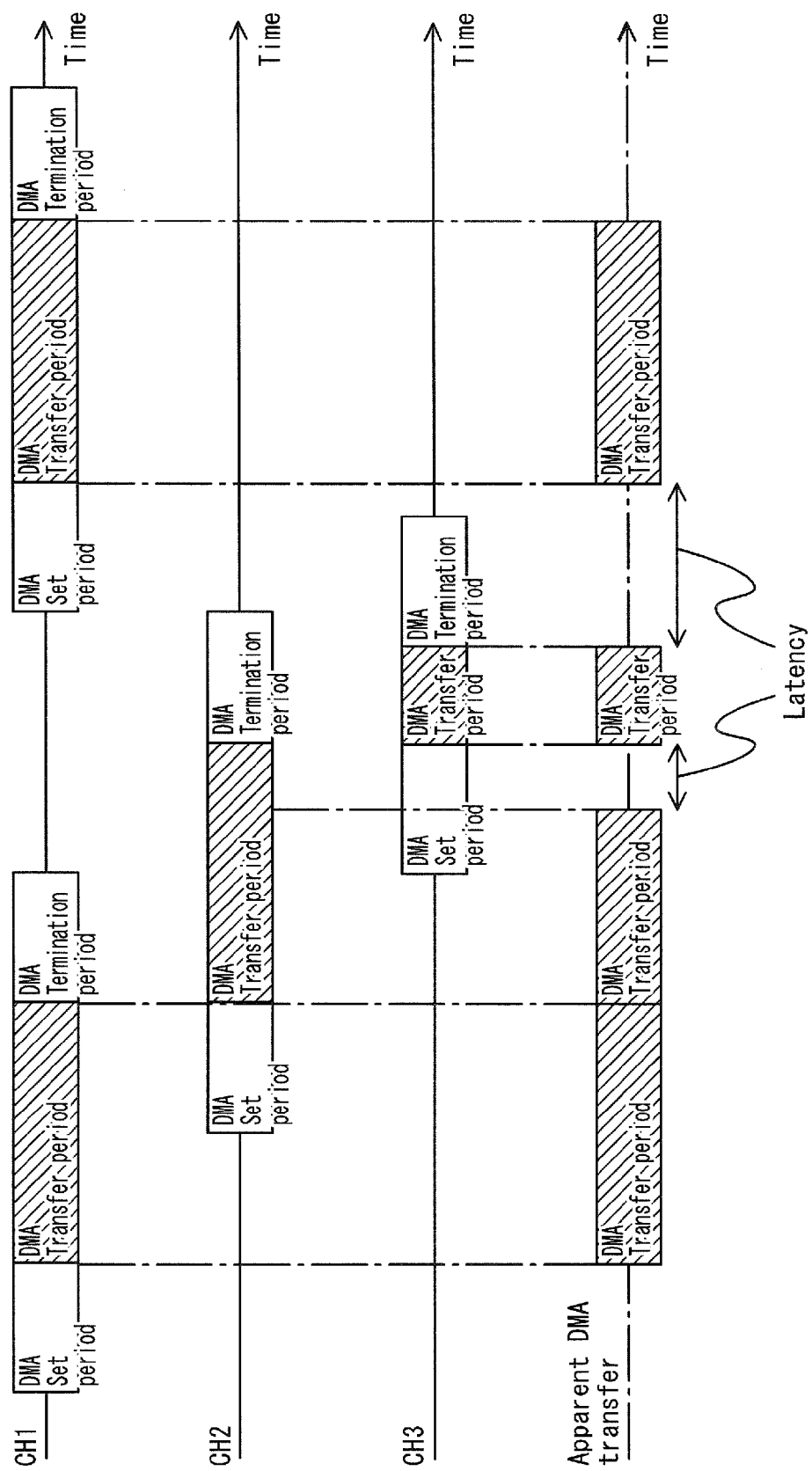
FIG. 27 is a timing diagram illustrating another example of the conventional DMA transfer.
Figure 28:
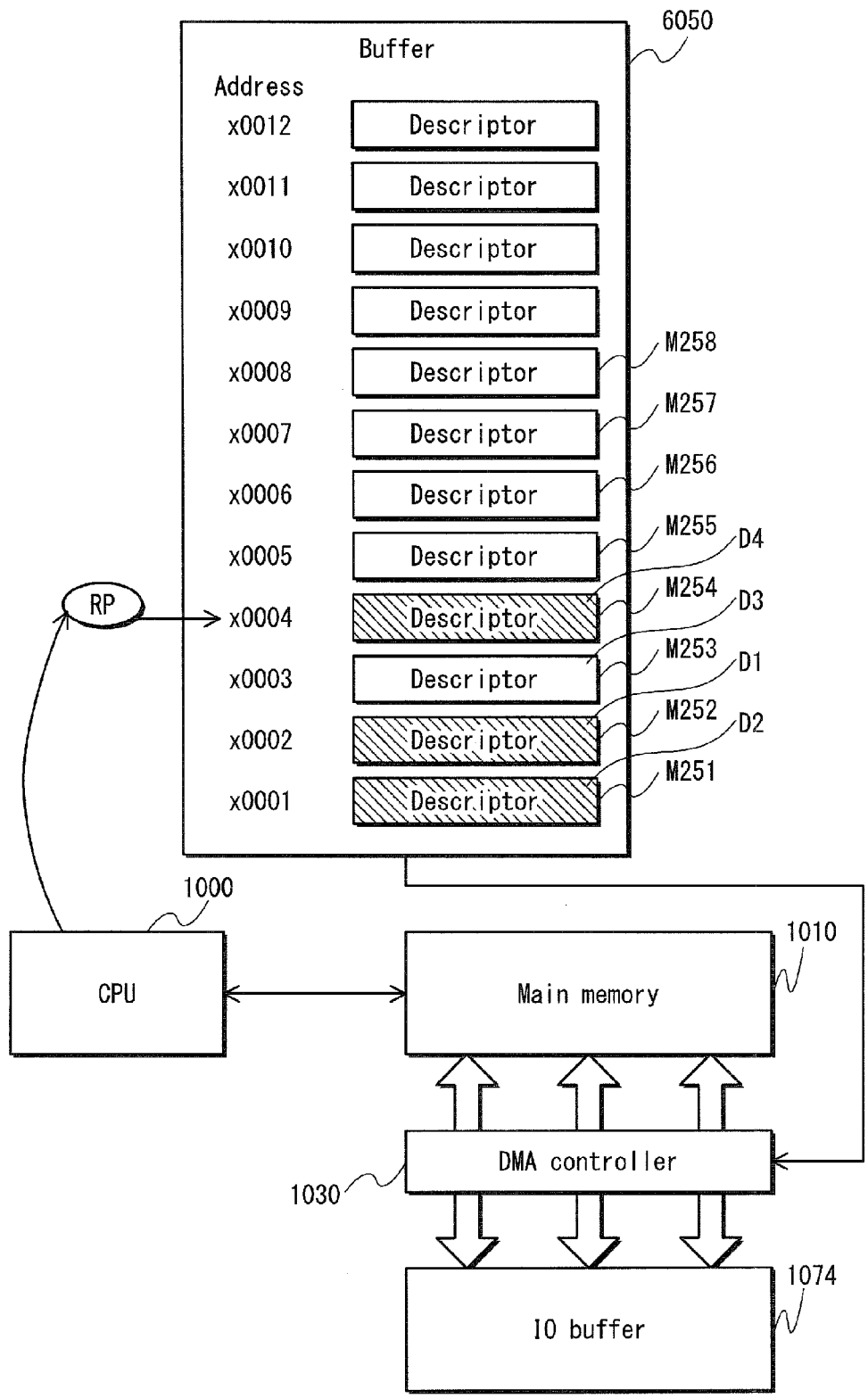
FIG. 28 is a block diagram illustrating an example of part of a conventional information processing system.
Figure 29:
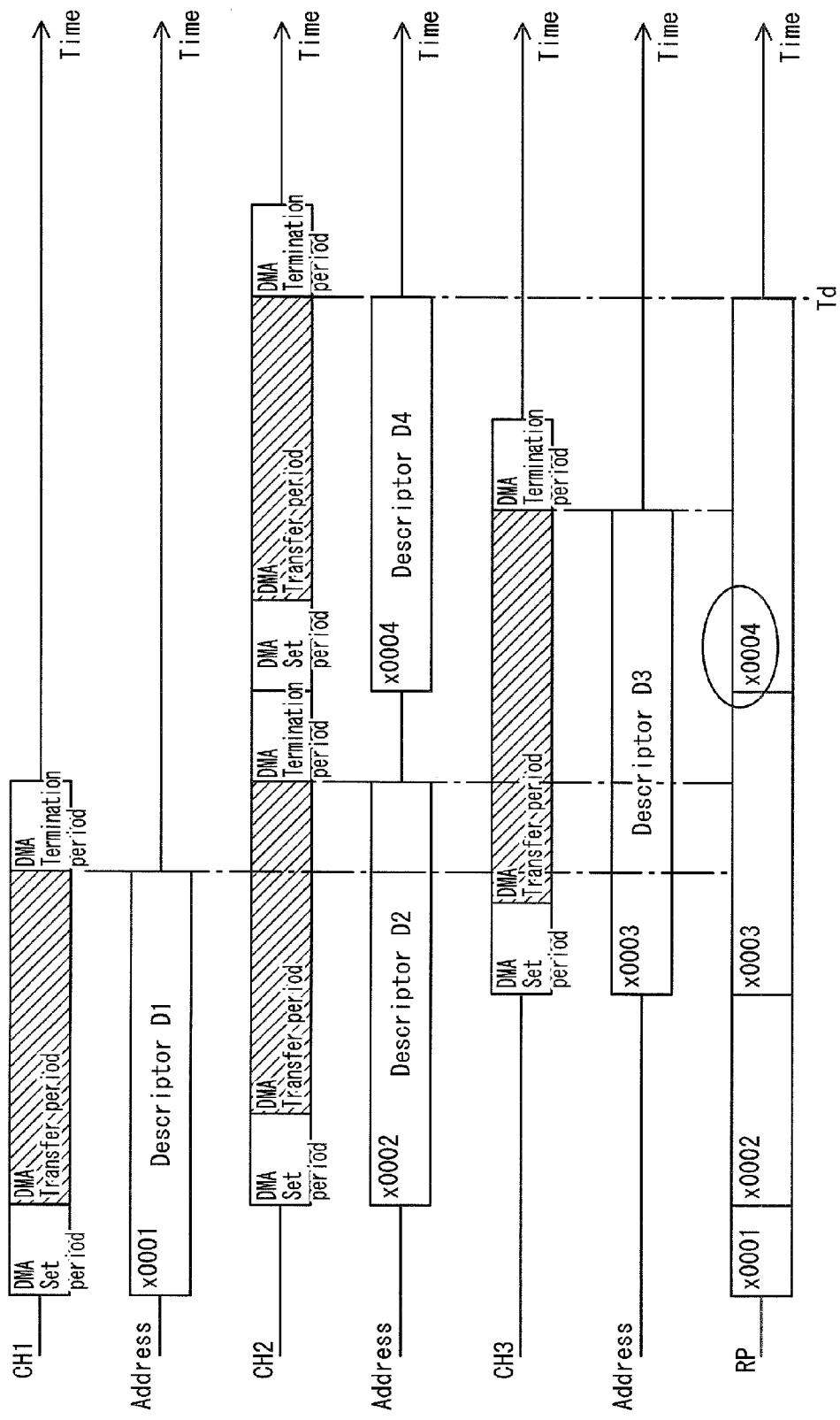
FIG. 29 is a timing diagram illustrating yet another example of the conventional DMA transfer.
Figure 30:
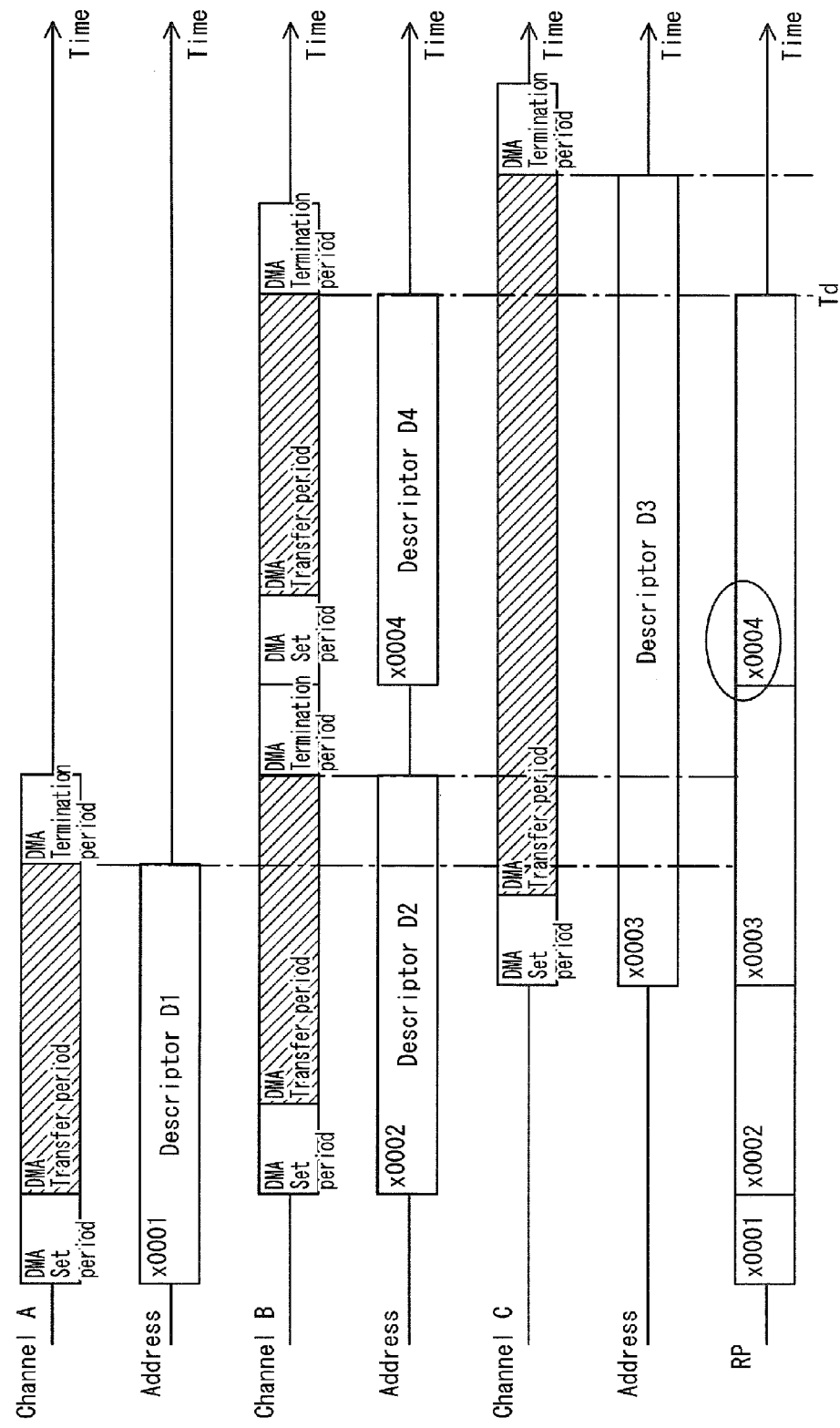
FIG. 30 is a timing diagram illustrating yet another example of the conventional DMA transfer.

As illustrated in FIG. 25, the LSI pertaining to the present modification is applicable, for example, to a digital TV 910, a broadcast reception device (storage playback device) 911, a mobile phone 912, a digital camera 913 and an in-car terminal 914 mounted on an automobile 915 by being mounted on a circuit board 901 along with the CPU 1000.

(20) Although the LSI is taken as an example in the above-mentioned description, it may be referred to as an IC, a system LSI, a super LSI, or an ultra LSI depending on the degree of integration.

Also, a method of forming integrated circuits is not limited to LSIs, and may be realized using a dedicated circuit or a general-purpose processor. It is possible to form integrated circuits with use of an FPGA (Field Programmable Gate Array) programmable after manufacturing LSIs or a reconfigurable processor in which connection and setting of the circuit cell within the LSI can be reconfigured.

Furthermore, if technology for forming integrated circuits that replaces LSIs emerges owing to advances in semiconductor technology or to another derivative technology, function blocks may be formed as integrated circuits using such technology. The application of biotechnology or the like is possible.

INDUSTRIAL APPLICABILITY

This configuration can perform efficient transfer control when a plurality of data transfer operations are performed. Especially when the size of data to be transferred differs for each opportunity to perform data transfer, or data transfer is repeated due to occurrence of a transfer error, this configuration can significantly shorten the latency occurring during the data transfer and dramatically improve the throughput of the data transfer, compared to the conventional technology. Therefore, this configuration is effective to an integrated circuit product that performs data transfer between the main memory and the high-speed JO interface typified by SDXC, USB and SATA. This configuration is also effective to an integrated circuit product performing a plurality of data transfer operations between storage areas, home electrical appliances, a personal computer, a mobile phone and the like.

REFERENCE SIGNS LIST 1040 data transfer completion notification device
1050 ring buffer
1061, 1062, 1063 data transfer control device
4011, 4012, 4013 logical channel transfer completion detection unit
4020 priority judgment unit
4031, 4032, 4033 logical channel transfer completion notification unit
4041, 4042, 4043 descriptor acquisition completion notification signal reception unit
5000 transfer completion notification signal reception unit
5001 local read pointer acquisition unit
5002 write pointer acquisition unit
5003 positional relation determination unit
5004 read pointer update unit
5005 latest read pointer extraction unit
5006 write pointer update confirmation unit
5007 local read pointer hold unit
5008 descriptor acquisition unit
5009 descriptor acquisition completion notification unit
5010 descriptor set unit
5011 transfer termination unit
5012 data transfer initiation request reception unit
D3010, D3010a, D3010b, D3010c, D3010d, D3010e descriptor
D3011 transfer source address
D3012 transfer destination address
D3014 size of data to be transferred
M51, M52, ..., M58, M251, M252, ..., M264 storage area
ORF overlap flag
RPg global read pointer
RPl1 local read pointer (first local read pointer)
RPl2, RPl3 local read pointer (second local read pointer)

The invention claimed is:

1. A transfer control system including a plurality of transfer control devices and a transfer control information management device, wherein
the transfer control devices perform data transfer independently of one another by using respective transfer channels, the transfer control information management device includes:
- a transfer control information list composed of a plurality of transfer control information pieces to be read in a predetermined reading order; and
- a first pointer pointing to a position in the reading order, each of the transfer control devices includes:
- a read unit reading one of the transfer control information pieces from the transfer control information list;
- a second pointer pointing to a position, in the reading order, of the read transfer control information piece;
- a recognition unit recognizing completion of data transfer performed according to the read transfer control information piece;
- an acquisition unit acquiring positions pointed to by other second pointers included in other one or more transfer control devices included in the system;
- a determination unit determining whether or not the position of the read transfer control information piece pointed to by the second pointer is earlier than any other positions pointed to by the other second pointers included in the other one or more transfer control devices; and
- an update unit updating the first pointer with the second pointer when the recognition unit recognizes completion of the data transfer performed according to the read transfer control information piece, and the determination unit determines affirmatively, and the position pointed to by the first pointer is a position of one of transfer control information pieces read from the transfer control information list and corresponding to data transfer having been completed, the position pointed to by the first pointer being earlier than the position of the read transfer control information piece pointed to by the second pointer and the positions pointed to by the other second pointers included in the other one or more transfer control devices.

2. The transfer control system of claim 1, wherein the update unit refrains from updating the first pointer when the determination unit determines negatively.

3. The transfer control system of claim 1, wherein each of the transfer control devices further includes
- an extraction unit extracting latest position information indicating the latest position of all of the position of the read transfer control information piece pointed to by the second pointer and the positions pointed to by the other second pointers included in the other one or more transfer control devices, and in each of the transfer control devices, the read unit reads, from the transfer control information list, one of the transfer control information pieces to be read after the transfer control information piece whose position is indicated by the latest position information when the recognition unit recognizes completion of data transfer performed according to the read transfer control information piece.

4. The transfer control system of claim 1, wherein
the transfer control information list is stored in a predetermined storage area,
the first pointer points to an address, in the storage area, of the transfer control information piece read from the transfer control information list and corresponding to data transfer having been completed, and
in each of the transfer control devices, the second pointer points to an address, in the storage area, of the read transfer control information piece.

5. The transfer control system of claim 1, wherein
each of the transfer control information pieces includes at least a transfer destination address and a size of data to be transferred.

6. The transfer control system of claim 1, wherein
each of the transfer control devices further includes
a notification unit sending a signal indicating completion of acquisition of the one of the transfer control information pieces when the read unit completes acquisition of the one of the transfer control information pieces.

7. The transfer control system of claim 1, wherein
the recognition unit recognizes that the data transfer is normally or abnormally completed, and
the read unit reads another one of the transfer control information pieces when the recognition unit recognizes that the data transfer is normally completed, and refrains from reading another one of the transfer control information pieces when the recognition unit recognizes that the data transfer is abnormally completed.

8. An integrated circuit including a plurality of transfer control devices and a transfer control information management device, wherein
the transfer control devices perform data transfer independently of one another by using respective transfer channels,
the transfer control information management device includes:
- a memory circuit holding a transfer control information list composed of a plurality of transfer control information pieces to be read in a predetermined reading order; and
- a first pointer pointing to a position in the reading order, each of the transfer control devices includes:
- a read circuit reading one of the transfer control information pieces from the transfer control information list;
- a second pointer pointing to a position, in the reading order, of the read transfer control information piece;
- a recognition circuit recognizing completion of data transfer performed according to the read transfer control information piece;
- an acquisition circuit acquiring positions pointed to by other second pointers included in other one or more transfer control devices;
- a determination circuit determining whether or not the position of the read transfer control information piece pointed to by the second pointer is earlier than any other positions pointed to by the other second pointers included in the other one or more transfer control devices; and
- an update circuit updating the first pointer with the second pointer when the recognition circuit recognizes completion of the data transfer performed according to the read transfer control information piece, and the determination circuit determines affirmatively, and the position pointed to by the first pointer is a position of one of transfer control information pieces read from the transfer control information list and corresponding to data transfer having been completed, the position pointed to by the first pointer being earlier than the position of the read transfer control information piece pointed to by the second pointer and the positions pointed to by the other second pointers included in the other one or more transfer control devices.

9. A transfer control method for use in a transfer control system including a plurality of transfer control devices and a transfer control information management device, wherein the transfer control devices perform data transfer independently of one another by using respective transfer channels, the transfer control information management device includes:

a transfer control information list composed of a plurality of transfer control information pieces to be read in a predetermined reading order; and a first pointer pointing to a position in the reading order, each of the transfer control devices includes a second pointer pointing to a position in the reading order, each of the transfer control devices performs:

reading one of the transfer control information pieces from the transfer control information list;

updating the second pointer so that the updated second pointer points to a position, in the reading order, of the read transfer control information piece;

recognizing completion of data transfer performed according to the read transfer control information piece;

acquiring positions pointed to by other second pointers included in other one or more transfer control devices;

determining whether or not the position of the read transfer control information piece pointed to by the second pointer is earlier than any other positions pointed to by the other second pointers included in the other one or more transfer control devices; and updating the first pointer with the second pointer when recognizing completion of the data transfer performed according to the read transfer control information piece, and determining affirmatively, and the position pointed to by the first pointer is a position of one of transfer control information pieces read from the transfer control information list and corresponding to data transfer having been completed, the position pointed to by the first pointer being earlier than the position of the read transfer control information piece pointed to by the second pointer and the positions pointed to by the other second pointers included in the other one or more transfer control devices.

* * * * *